(12) United States Patent
Morita

(10) Patent No.: US 7,175,195 B2
(45) Date of Patent: Feb. 13, 2007

(54) OCCUPANT PROTECTION DEVICE

(75) Inventor: Toshihiro Morita, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 290 days.

(21) Appl. No.: 10/730,142

(22) Filed: Dec. 9, 2003

(65) Prior Publication Data
US 2004/0124617 A1 Jul. 1, 2004

(30) Foreign Application Priority Data
Dec. 25, 2002 (JP) ............................ 2002-374992
Dec. 25, 2002 (JP) ............................ 2002-375032
Dec. 25, 2002 (JP) ............................ 2002-375044
Dec. 25, 2002 (JP) ............................ 2002-375059
Dec. 25, 2002 (JP) ............................ 2002-375077

(51) Int. Cl.
*B60R 21/20* (2006.01)

(52) U.S. Cl. .................................. 280/730.1; 280/752

(58) Field of Classification Search ................ 280/752, 280/730.1, 743.1, 728.2, 732; *B60R 21/045*
See application file for complete search history.

(56) References Cited

U.S. PATENT DOCUMENTS

| | | | | |
|---|---|---|---|---|
| 5,190,314 A | * | 3/1993 | Takasugi | ..................... 280/752 |
| 5,273,310 A | * | 12/1993 | Terai | ............................ 280/732 |
| 5,876,061 A | | 3/1999 | Stavermann | |
| 6,092,836 A | * | 7/2000 | Saslecov | .................. 280/730.1 |
| 6,276,713 B1 | | 8/2001 | Duletzke | |
| 6,302,437 B1 | | 10/2001 | Marriott et al. | |
| 6,536,802 B1 | * | 3/2003 | Sutherland et al. | ......... 280/752 |
| 6,752,417 B2 | * | 6/2004 | Takimoto et al. | ........ 280/730.1 |
| 2005/0116449 A1 | * | 6/2005 | Enders | .................... 280/730.1 |
| 2006/0022440 A1 | * | 2/2006 | Umehara | ................. 280/730.1 |

FOREIGN PATENT DOCUMENTS

| | | |
|---|---|---|
| DE | 197 03 430 | 8/1998 |
| DE | 19730397 C1 * | 10/1998 |
| EP | 1 262 379 | 12/2002 |
| JP | A-H08-80797 | 3/1996 |
| JP | 2004330872 A * | 11/2004 |

* cited by examiner

*Primary Examiner*—Paul N. Dickson
*Assistant Examiner*—Drew J. Brown
(74) *Attorney, Agent, or Firm*—Posz Law Group, PLC

(57) ABSTRACT

An occupant protection device of the present invention includes a knee-protecting airbag device and a container box. The airbag device includes an airbag for protecting knees of an occupant seated in front passenger's seat, an inflator, and a case opened rearward for housing the airbag and the inflator. The container box includes a box body and a lid. Before being mounted on the vehicle, the knee-protecting airbag device and the container box are integrally assembled into a mounting module. By mounting the module on the vehicle, the knee-protecting airbag device and the container box are mounted on the vehicle. The occupant protection device of the present invention contributes to reduce tact time per vehicle even if the knee-protecting airbag device and the container box are both mounted in front of front passenger's seat.

15 Claims, 36 Drawing Sheets

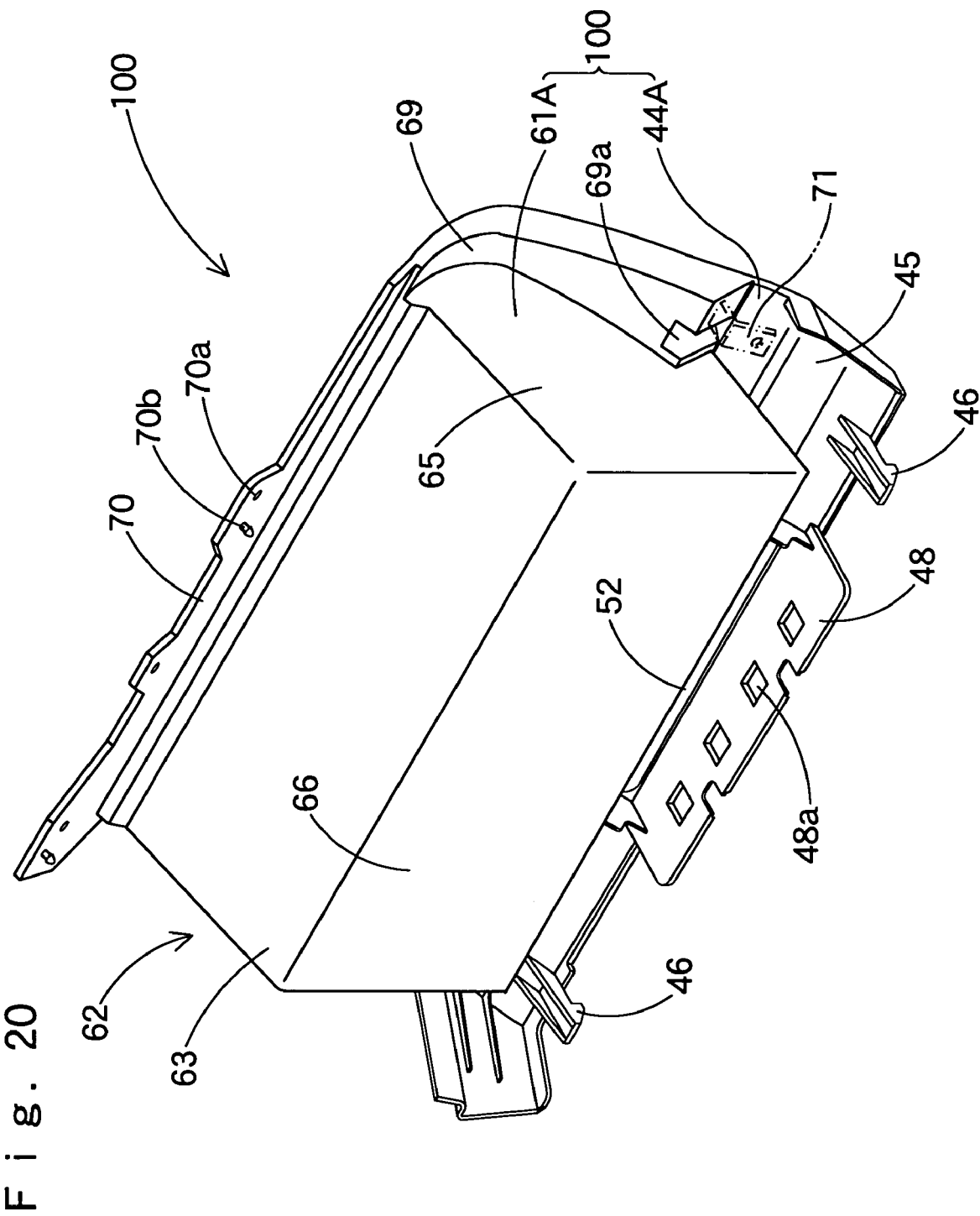

OCCUPANT PROTECTION DEVICE

The present application claims priority from Japanese Patent Applications No. 2002-374992 of Morita, No. 2002-375032 of Morita, No. 2002-375044 of Morita, No. 2002-375059 of Morita, No. 2002-375077 of Morita, all filed on Dec. 25, 2002, the entirety of each is hereby incorporated into the present application by this reference.

BACKGROUND OF THE INVENTION

1. Field of the Invention

The present invention relates to a vehicle occupant protection device located in front of front passenger's seat for protecting knees of an occupant seated in front passenger's seat.

2. Description of Related Art

In the prior art, Japanese Laid-Open Patent No. Hei 8-80797 shows a device for protecting knees of a vehicle occupant seated in front passenger's seat which inflates an airbag for protecting the occupant's knees.

However, there is conventionally disposed a container box (or glove box) for housing a map and so on in front of front passenger's seat. If the knee-protecting airbag device and the container box are both located in front of front passenger's seat, individual parts have to be mounted on the vehicle separately, which increases tact time per vehicle.

SUMMARY OF THE INVENTION

The present invention contemplates to solve above problem, and therefore, has an object to provide an occupant protection device capable of preventing tact time per vehicle from increasing even if the knee-protecting airbag device and the container box are both mounted on the vehicle.

The occupant protection device according to the present invention includes a knee-protecting airbag device located in front of a vehicle occupant seated in front passenger's seat for protecting the occupant's knees upon collision of the vehicle, and a container box located above the knee-protecting airbag device for housing goods. The knee-protecting airbag device includes an inflatable airbag for protecting the occupant's knees, an inflator for supplying inflation gas to the airbag, a case opened rearward for housing the folded airbag and the inflator, and an airbag cover attached to the case for covering the opening of the case, and openable upon inflation of the airbag. The container box includes a box body opened rearward and a lid for openably covering the opening of the box body. Before being mounted on the vehicle, the case of the knee-protecting airbag device having the airbag and the inflator housed therein and the box body of the container box are integrally assembled into a mounting module. By mounting the module on the vehicle, the case of the knee-protecting airbag device housing the airbag and the inflator, and the box body of the container box are mounted on the vehicle.

In this occupant protection device, the case of the knee-protecting airbag device housing the airbag and the inflator, and the box body of container box are assembled together in advance to form a mounting module. Accordingly, major parts of the knee-protecting airbag device and the container box can be mounted on the vehicle at one time by attaching the module to the vehicle. Consequently, mounting work processes and tact time per vehicle are reduced compared with a case of mounting the case of knee-protecting airbag device and the box body of container box separately.

Of course, if the knee-protecting airbag device is actuated, the airbag inflates with inflation gas from the inflator. The airbag then pushes open the airbag cover and protrudes from the case to protect the knees of the occupant.

Therefore, the occupant protection device of the present invention contributes to prevent tact time per vehicle from increasing even if the container box and the knee-protecting airbag device are both mounted in front of front passenger's seat.

At this time, if the airbag cover and the lid are also assembled into the mounting module, the knee-protecting airbag device and the container box can be mounted on the vehicle at one time. Consequently, mounting work processes and tact time per vehicle are further reduced compared with a case of mounting the knee-protecting airbag device and the container box separately.

Moreover, if the knee-protecting airbag device and the container box are integrally assembled before being mounted on the vehicle, there are choices of assembling direction to each other, and a simple assembling means can be employed. In addition, when the knee-protecting airbag device and the container box are mounted separately, extra space is needed in mounting direction. However, the above arrangement requires little extra space in the mounting direction, so that more interior space can be secured in front of front passenger's seat.

At this time, the box body is desirably supported at its lower surface with a support section formed in the case.

With this arrangement, since the case is secured to the vehicle body tightly and has such rigidity that inflating airbag may smoothly protrude from the opening, the box body is securely supported at the lower surface by means of the support section. Accordingly, even if heavy objects are housed in the boxy body, the box body is prevented from deforming, and thus is able to keep good appearance.

In this case, if the case includes a joint section to be joined with the vehicle body, and the box body of the container box is secured to the vehicle body by being joined to the case, the box body can be secured to the vehicle body by joining the joint section extended from the case to the vehicle body in mounting work of the mounting module on the vehicle, so that fixing work of the box body to the vehicle body can be omitted. Of course, since the case is secured to the vehicle body tightly and has such rigidity that inflating airbag may smoothly protrude from the opening, the box body of the container box is stably secured to the vehicle body by means of the case.

It is also appreciated to assemble an airbag device for front passenger's seat for protecting upper body of the occupant into the mounting module.

With this arrangement, the mounting work processes and tact time per vehicle are further reduced compared with a case of mounting the knee-protecting airbag device, the container box, and the airbag device for front passenger's seat separately on the vehicle. Moreover, mounting workability of parts arranged in front of front passenger's seat (the knee-protecting airbag device, the container box and the airbag device for front passenger's seat) is improved, too.

Furthermore, if an interior decoration member in front of front passenger's seat is also assembled into the mounting module, the mounting work processes and tact time per vehicle are further reduced compared with a case of mounting the knee-protecting airbag device, the container box, and the interior decoration member separately on the vehicle. The mounting workability of the parts arranged in front of front passenger's seat (the knee-protecting airbag device, the container box and the interior decoration member) is improved, too. Of course, since these parts (the knee-protecting airbag device, the container box and the interior decoration member) are integrally assembled before being mounted on the vehicle, little extra space is needed in mounting direction for mounting the individual parts separately, so that more interior space can be secured in front of front passenger's seat. Here, the airbag device for front passenger's seat may also be assembled into the mounting module.

Besides, it will also be appreciated to form the box body and the airbag cover of an integral molded part of synthetic resin. With this construction, number of constituent parts of the mounting module is reduced, and the assembling work of the mounting module is simplified.

When the box body and the airbag cover are formed of an integral molded part of synthetic resin, the knee-protecting airbag device and the container box may be mounted on the vehicle separately instead of forming a mounting module.

With this construction, too, the number of constituent parts can be reduced since two parts of the box body of the container box and the airbag cover are molded into a single part.

With this construction, moreover, the airbag cover is attached to the case for covering the case opening in openable manner upon inflation of the airbag, while the case itself is made so rigid and is tightly secured to the vehicle body as to protrude inflating airbag from the opening smoothly. Consequently, the airbag cover is tightly secured to the vehicle body by means of the case, and since the box body is formed integral with the airbag cover, less fixing means is needed to fix the box body to the vehicle body compared with a case of mounting the airbag cover and the box body separately. To paraphrase, if the airbag cover and the box body are formed integrally, fixing structure of the box body to the vehicle body is simplified in comparison with a case in which the airbag cover and the box body are provided separately, thereby reducing working processes in mounting the box body on the body.

Therefore, in the occupant protection device in which the box body and the airbag cover are formed of an integral molded part of synthetic resin, number of parts and fixing means of the box body to the vehicle body are reduced, and mounting workability is improved even if a container box and a knee-protecting airbag device are both mounted in front of front passenger's seat.

In this occupant protection device, furthermore, since the airbag cover and the box body of the container box disposed above the airbag cover are integral, it is prevented that the case and so on of the knee-protecting airbag device are seen by the occupant in opening/closing operation of the lid. More specifically, when the airbag cover and the box body are separate, a gap may arise between the airbag cover and the box body. In that case, the case and so on of the knee-protecting airbag device are likely to be seen from the gap in such a time as opening/closing of the lid. In this occupant protection device, however, since the airbag cover and the box body are formed of a continuous molded part, there arises no gap between the box body and the airbag cover, so that the case and so on of the knee-protecting airbag device are prevented from being seen by the occupant.

In this occupant protection device, it is appreciated that:
the case of the knee-protecting airbag device includes a circumferential wall portion located around the case opening for covering the folded airbag;
the circumferential wall portion includes a retainer protruded outward for attachment to the airbag cover;

the airbag cover includes: a door openable when pushed by an inflating airbag; a thinned breakable portion located in periphery of the door and breakable when pushed by the airbag to help open the door; a hinge line located in periphery of the door, and bended upon opening of the door; and a joint wall portion to be attached to the case circumferential wall portion by having the case retainer inserted therein; and the molded part integrating the box body and the airbag cover is a two-color part of soft material and hard material each of which is compatible to each other, and at least the door, the hinge line, and the joint wall portion of the airbag cover are soft section made from the soft material, and remaining portions are hard section made from the hard material.

With this construction, when the door of the airbag cover is pushed by the inflating airbag and opens while breaking the breakable portion disposed therearound, the door does not break although pushed, but is elastically deformed and smoothly opens since it is a part of the soft section. Moreover, the hinge line also belonging to the soft section easily bends. Consequently, the airbag is able to deploy smoothly from an opening provided by smooth opening of the door. Besides, since the joint wall portion by which the airbag cover is attached to the circumferential wall portion of the case also belongs to the soft section, the wall portion is elastically deformed and prevents peripheries of retaining holes holding the retainer of the circumferential wall portion from breaking even if subjected to strong tensile force when the door opens. Of course, since remaining portions of the two-color part are the hard section having rigidity, the two-color part as a whole is able to keep a predetermined shape easily.

Furthermore, it is appreciated that the lid is swingably supported by a pivot section formed in the case of the knee-protecting airbag device for opening and closing the box body opening.

With this construction, since the case is made so rigid and is tightly secured to the vehicle body as to protrude inflating airbag from the opening smoothly, the lid supported by the pivot section formed in the case is able to open and close smoothly.

In the occupant protection device employing a mounting module to mount individual parts on the vehicle at one time, the airbag cover and the lid may be formed of an integral molded part.

With this construction, there appears no parting line in the border of the airbag cover of the knee-protecting airbag device and the lid of the container box, so that appearance in the front of front passenger's seat is improved. Especially, since the lid opened and closed is continuous from the airbag cover located therebelow and leaves no gap, good appearance is attained.

Of course, when the knee-protecting airbag device is actuated, the airbag inflates with inflation gas from the inflator, and pushes open the airbag cover to protrude from the case for protecting the occupant's knees.

In the occupant protection device whose airbag cover and lid are formed of an integral molded part, therefore, although the container box and the knee-protecting airbag device are both mounted in front of front passenger's seat, good appearance of the front of front passenger's seat is retained.

Since two parts of the airbag cover and the lid are integral, moreover, constituent parts of the occupant protection device are reduced, and work processes and cost in mounting the occupant protection device on the vehicle are reduced.

In this occupant protection device, since the above working-effects are obtained as long as the airbag cover and lid are formed of an integral molded part, the knee-protecting airbag device and the container box may be mounted on the vehicle separately without forming a mounting module.

In an occupant protection device with this construction, it is appreciated that:

the case of the knee-protecting airbag device includes a circumferential wall portion located around the case opening for covering the folded airbag;

the circumferential wall portion includes a retainer protruded outward for attachment to the airbag cover;

the airbag cover includes: a door openable when pushed by an inflating airbag; a thinned breakable portion located in periphery of the door and breakable when pushed by the airbag to help open the door; a hinge line located in periphery of the door, and bended upon opening of the door; and a joint wall portion to be attached to the case circumferential wall portion by having the case retainer inserted therein; and the molded part integrating the airbag cover and the lid is a two-color part of soft material and hard material each of which is compatible to each other, and at least the door, the hinge line, and the joint wall portion of the airbag cover and a portion in the vicinity of borderline of upper edge of the airbag cover and lower edge of the lid are soft section made from the soft material, and remaining portions are hard section made from the hard material.

If constructed as above, when the door of the airbag cover is pushed by the inflating airbag and opens while breaking the breakable portion disposed therearound, the door does not break although pushed, but is elastically deformed and smoothly open since it is the soft section. Moreover, the hinge line belonging to the soft section easily bends, too. Consequently, the airbag is able to deploy smoothly from an opening provided by smooth opening of the door. Besides, since the joint wall portion by which the airbag cover is attached to the circumferential wall portion of the case also belongs to the soft section, the wall portion is elastically deformed and prevents peripheries of the retaining holes holding the retainer of the circumferential wall portion from breaking even if subjected to strong tensile force when the door opens. Besides, the lid is able to open and close smoothly around the vicinity of the lower edge of the lid, since the portion in the vicinity of borderline of the airbag cover and lower edge of the lid are soft section. Of course, since remaining portions are the hard section having rigidity, the two-color part as a whole is able to keep a predetermined shape easily.

In an occupant protection device employing a mounting module, it is also appreciated that the device further includes an interior decoration member located around rear side face of the container box, and that a portion of the decoration member around the container box and the airbag cover are formed of an integral molded part.

With this construction, since the interior decoration member located around the container box and the airbag cover of the knee-protecting airbag device are formed of a single molded part except the lid opened/closed when the container box is used, there appears no parting line in border of the two sections, so that appearance in the front of front passenger's seat is improved. Of course, since the lid is independent of the interior decoration member around the container box and the airbag cover, the lid is able to separate from the interior decoration member therearound and the airbag cover and swing easily in opening/closing operation of the opening of the container box body.

Of course, when the knee-protecting airbag device is actuated, the airbag inflates with inflation gas from the inflator, and pushes open the airbag cover to protrude from the case for protecting the occupant's knees.

In the occupant protection device thus constructed, therefore, although the container box and the knee-protecting airbag device for protecting the knees of the occupant seated in front passenger's seat are both mounted in front of front passenger's seat, good appearance of the front of front passenger's seat is retained.

Moreover, since the interior decoration member located around the container box and the airbag cover of the knee-protecting airbag device are formed of a single molded part, number of constituent parts is reduced, and working processes and cost in mounting the occupant protection device on the vehicle are reduced.

In this case, the knee-protecting airbag device and the container box may be mounted on the vehicle separately, instead of forming a mounting module.

In the occupant protection device thus constructed, it is appreciated that:

the case of the knee-protecting airbag device includes a circumferential wall portion located around the case opening for covering the folded airbag;

the circumferential wall portion includes a retainer protruded outward for attachment to the airbag cover;

the airbag cover includes: a door openable when pushed by an inflating airbag; a thinned breakable portion located in periphery of the door and breakable when pushed by the airbag to help open the door; a hinge line located in periphery of the door, and bended upon opening of the door; and a joint wall portion to be attached to the case circumferential wall portion by having the case retainer inserted therein; and the molded part integrating the portion of the interior decoration member around the container box and the airbag cover is a two-color part of soft material and hard material each of which is compatible to each other, and at least the door, the hinge line, and the joint wall portion of the airbag cover are soft section made from the soft material, and remaining portions are hard section made from the hard material.

As described above, if thus constructed, the airbag cover is able to deploy the airbag smoothly upon inflation of the airbag, by opening the door smoothly without breaking the joint wall portion. Since remaining portions are the hard section having rigidity, the two-color part as a whole is able to retain a predetermined shape.

Moreover in the occupant protection device thus constructed, it is appreciated that the lid of the container box is assembled with the molded part that constitutes the interior decoration member around the container box and the airbag cover to form a panel module, and that the lid is mounted on the vehicle by attaching the panel module to the vehicle.

With this arrangement, since the lid is assembled with the molded part constituting the interior decoration member located there around and the airbag cover in advance, good appearance in parting line between the lid and the interior decoration member and the airbag cover located there around is easily retained. Consequently, appearance of the front of front passenger's seat is further improved. Especially, the panel module constitutes a major part of the front side of front passenger's seat. Since a great part like this is preliminarily assembled into a single piece before being mounted on the vehicle, good appearance in the front of front passenger's seat is easily retained.

BRIEF DESCRIPTION OF DRAWINGS

FIG. 20 is a perspective view of a modification of the molded part integrating the box body and the airbag cover used in the second occupant protection device;

DESCRIPTION OF THE PREFERRED EMBODIMENTS

Preferred embodiments of the invention are now described below with reference to the accompanying drawings. However, the invention is not limited to the embodiments disclosed herein. All modifications within the appended claims and equivalents relative thereto are intended to be encompassed in the scope of the claims.

Figure 1:
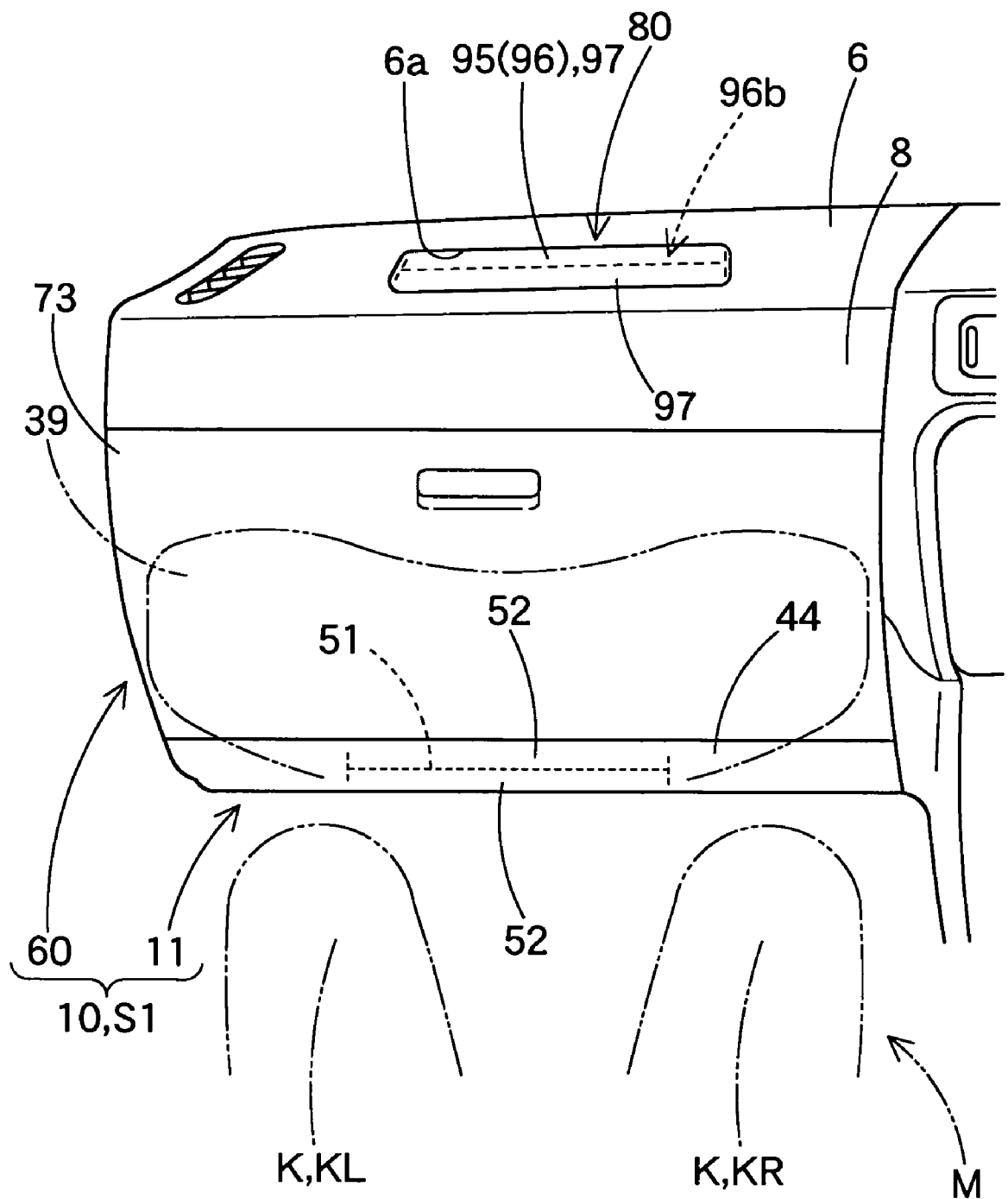
FIG. 1 is a front view of a first embodiment of the occupant protection device according to the present invention mounted on the vehicle, as viewed from rearward of the vehicle.
Figure 2:
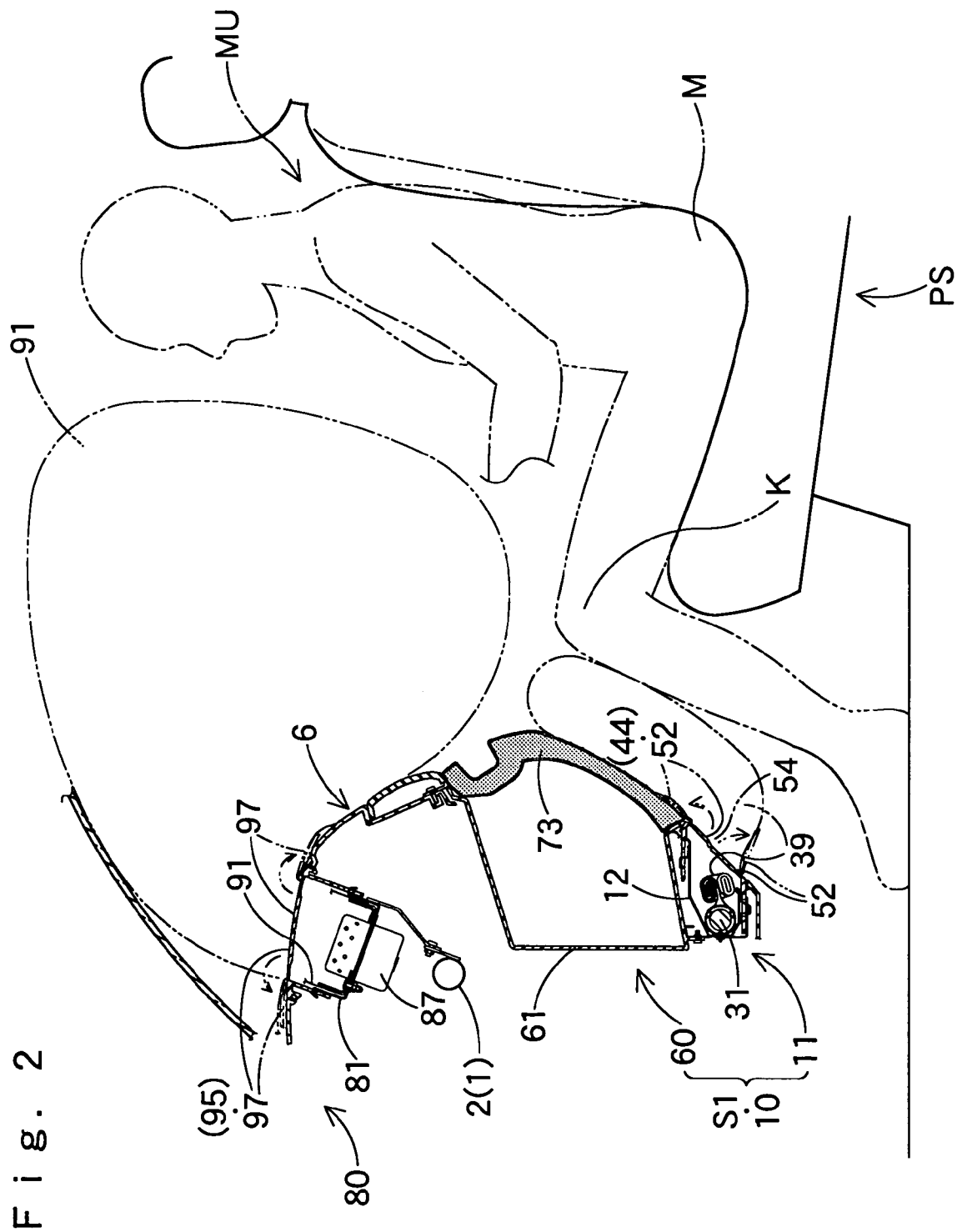
FIG. 2 is a schematic vertical section of the occupant protection device of FIG. 1 mounted on the vehicle, taken along front-rear direction of the vehicle.
Figure 3:
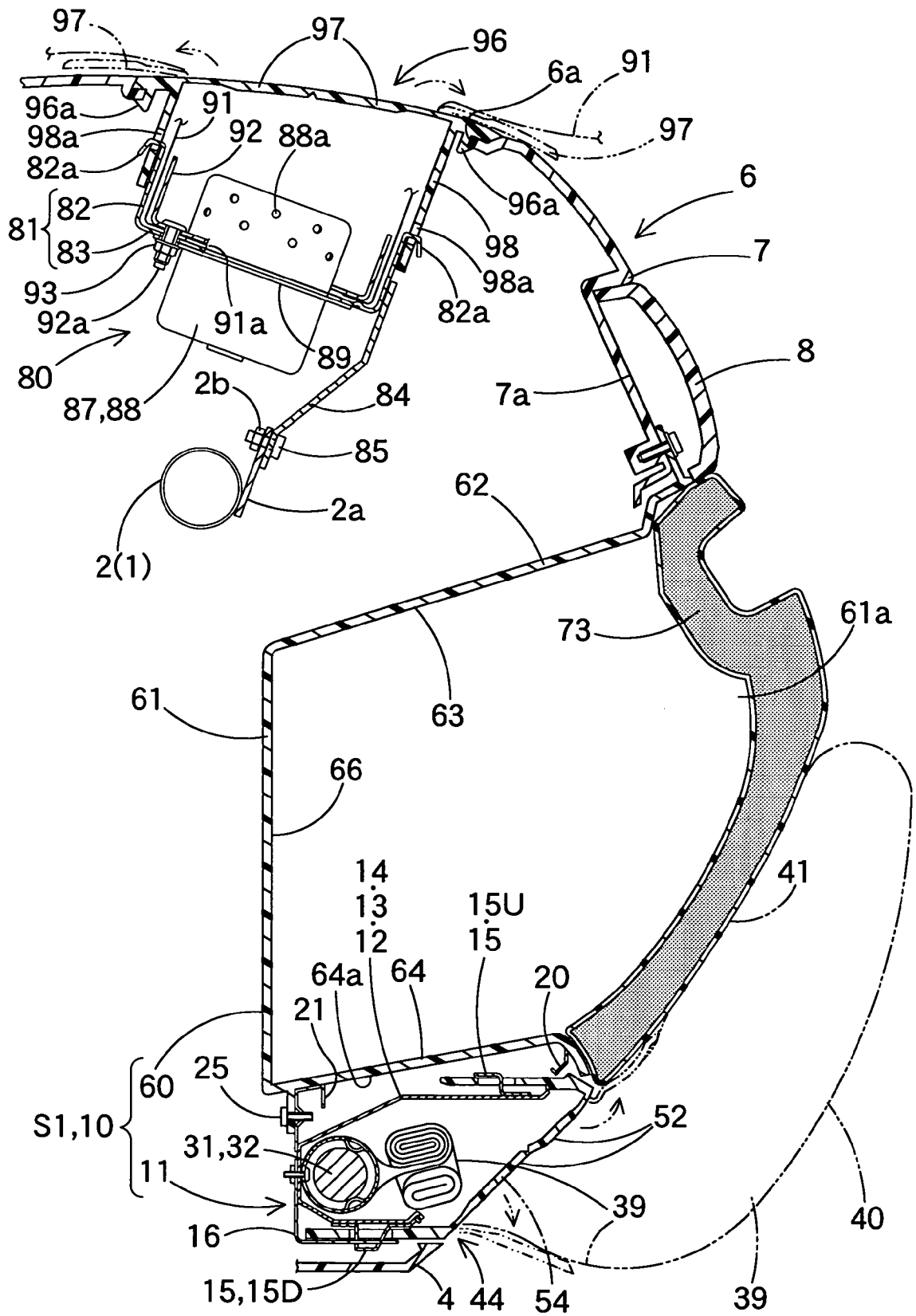
FIG. 3 is a schematic enlarged vertical section of the occupant protection device of FIG. 1 mounted on the vehicle, taken along front-rear direction of the vehicle.

Referring to FIGS. 1 to 3, a first embodiment S1 of the vehicle occupant protection device according to the present invention includes a knee-protecting airbag device 11 and a container box 60. The knee-protecting airbag device 11 is located in front of an occupant M seated in front passenger's seat PS for protecting knees K (KL and KR) of the occupant M upon collision of a vehicle. The container box 60 is located above the knee-protecting airbag device 11 for containing goods.

Front, rear, left and right in this specification are based on a condition where occupant protection device is mounted on a vehicle, and are consistent with front, rear, left and right of the vehicle.

In the occupant protection device S1, the knee-protecting airbag device 11 and the container box 60 are preliminarily assembled together to form an integral mounting module 10. The occupant protection device S1 is mounted on the vehicle by attaching the module 10 to vehicle body 1.

Located in front of the front passenger's seat PS is an instrument panel 6 as interior decoration member. Below the instrument panel 6 (as will be called dashboard below) is arranged a lid 73 of the container box 60 continued from back surface of the dashboard 6. Airbag cover 44 of the knee-protecting airbag device 11 is arranged below the lid 73 continuously from back surface of the lid 73.

In the foregoing embodiment, there is located an airbag device 80 for front passenger's seat in an upper part of the dashboard 6 for protecting breast and so on of upper body MU of the occupant M upon frontal collision of vehicle. The airbag device 80 for front passenger's seat includes an inflatable airbag 91 for protecting breast and so on of upper body MU of the occupant M, an inflator 87 for feeding the airbag 91 with inflation gas, an airbag cover 95 for covering the folded airbag 91, and a case 81 for containing the folded airbag 91 and the inflator 87 and holding the airbag cover 95.

As referred to FIG. 3, the airbag 91 is attached to bottom wall 83 of the case 81 while being held at periphery of its opening 91*a* for inletting inflation gas from the inflator 87 by a retainer 92 having generally cylindrical shape. The retainer 92 is provided at its four corners with bolts 92*a* extending downward, and the bolts 92*a* are fastened into nuts 93. The inflator 87 includes a cylindrical main body 88 having gas discharge ports 88*a* in its upper side and a flange 89 extending from outer circumference of the main body 88. The inflator 87 is attached to the case bottom wall 83 by inserting the bolts 92*a* of the retainer 92 through the opening 91*a* periphery of the airbag 91, the flange 89 and the case bottom wall 83 and fastening them into the nuts 93.

The case 81 is made of sheet metal into a generally rectangular parallelpiped box shape. The case 81 includes a bottom wall 83 for inserting the main body 88 of the inflator 87 therethrough, and a circumferential wall portion 82 extended upward from outer circumferential edge of the bottom wall 83 to have a generally square cylindrical shape. The circumferential wall portion 82 is provided with hooks 82*a* for holding the airbag cover 95. The case 81 is further provided with a bracket 84 for securing the airbag device 80 to dashboard reinforcement 2. The bracket 84 is bolt 85 fixed to a bracket 2*a* extended from the dashboard reinforcement 2. The bolt 85 is fastened with a nut 2*b* fixed to the bracket 2*a*.

The airbag cover 95 is made from synthetic resin, and includes a ceiling wall 96 and a side wall portion 98 extending downward from the ceiling wall 96. The side wall portion 98 is to be joined with the circumferential wall portion 82 of the case 81. The sidewall portion 98 is provided with retaining holes 98*a* to be hooked at the periphery by the hooks 82*a* of the circumferential wall portion 82. The ceiling wall 96 is adapted to cover over the airbag 91 folded and housed in the case 81, and includes two doors 97 to be pushed open by the airbag 91 upon deployment. As referred to FIG. 1, these two doors 97 are provided there around with a thinned breakable portion 96*b* having substantially H-shape as viewed from above. When pushed by the airbag 92, the doors 97 break the breakable portion 96*b* and open in front and rear directions, respectively. The ceiling wall 96 further includes a plurality of fastening legs 96*a* to be fastened at opening 6*a* periphery of the dashboard 6.

Referring to FIGS. 3 to 5, 7, 8 and 12, the knee-protecting airbag device 11 in the first occupant protection device S1 includes a folded airbag 39, an inflator 31 for feeding the airbag 39 with inflation gas, a case 12 opened rearward for containing the folded airbag 39 and the inflator 31, and an airbag cover 44 for covering the vehicle's rear side of the case 12.

Figure 5:
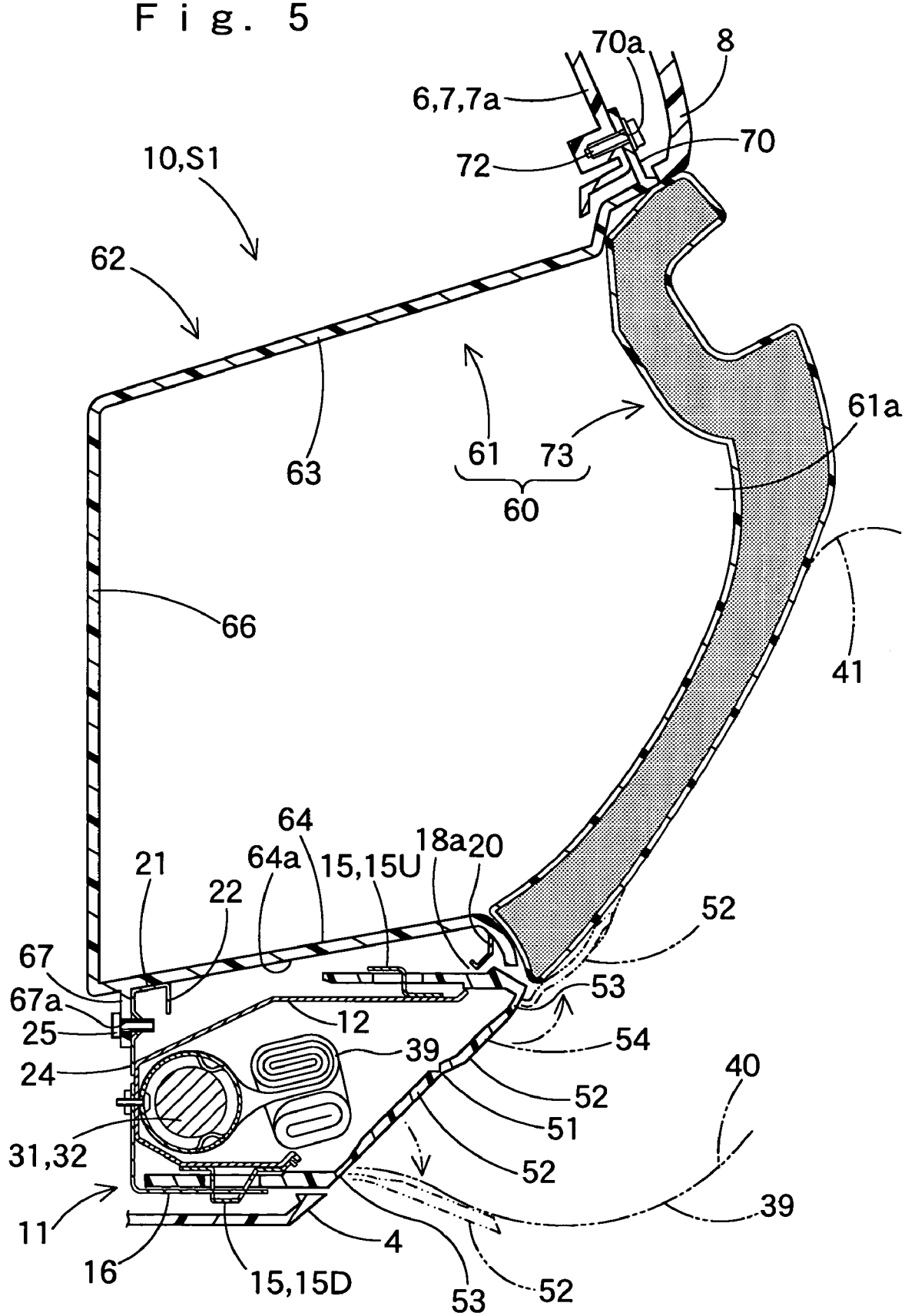
FIG. 5 is a schematic vertical section of the mounting module in FIG. 4 mounted on the vehicle.
Figure 6:
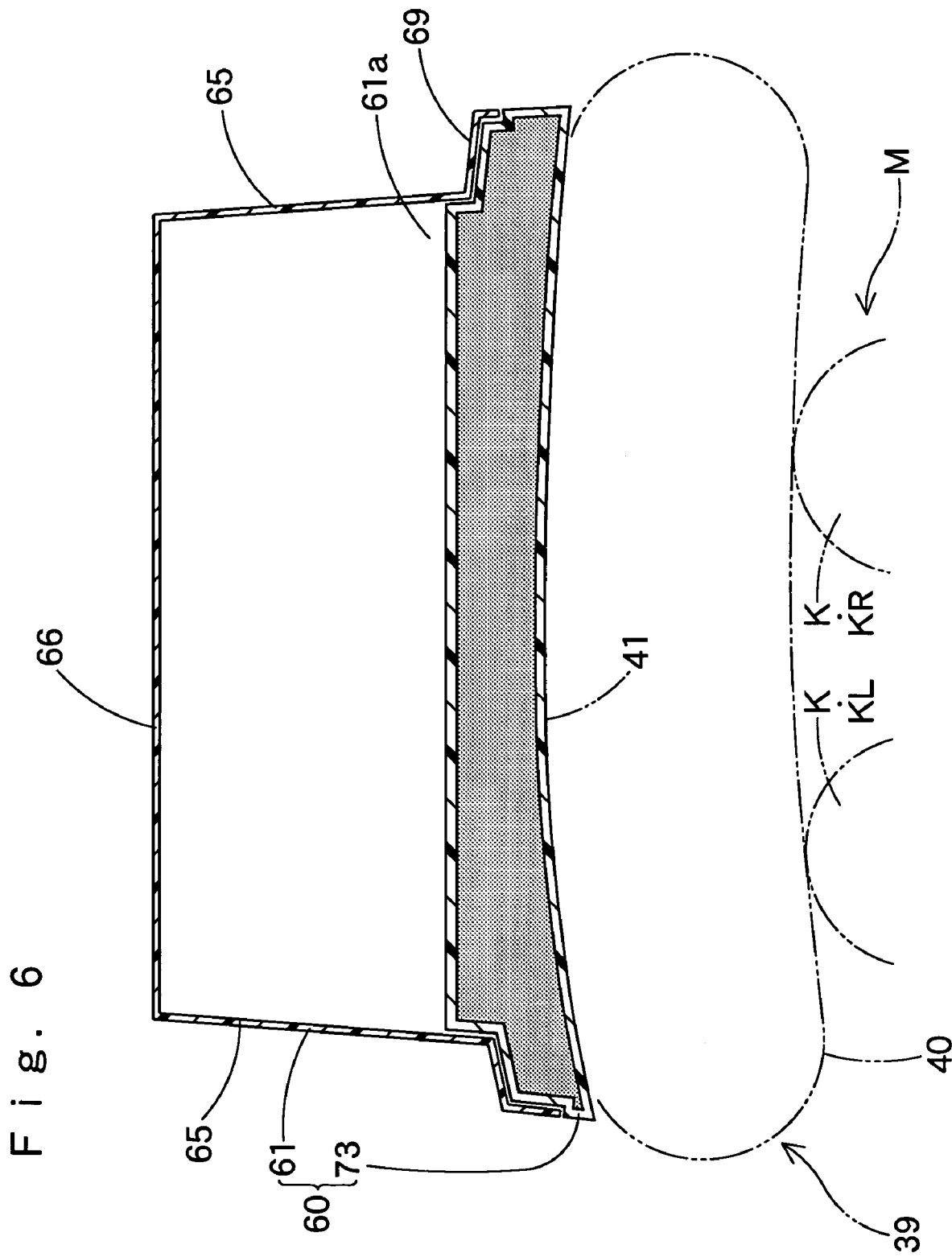
FIG. 6 is a transverse section of the mounting module in FIG. 4, taken along line VI—VI in FIG. 4.
Figure 7:
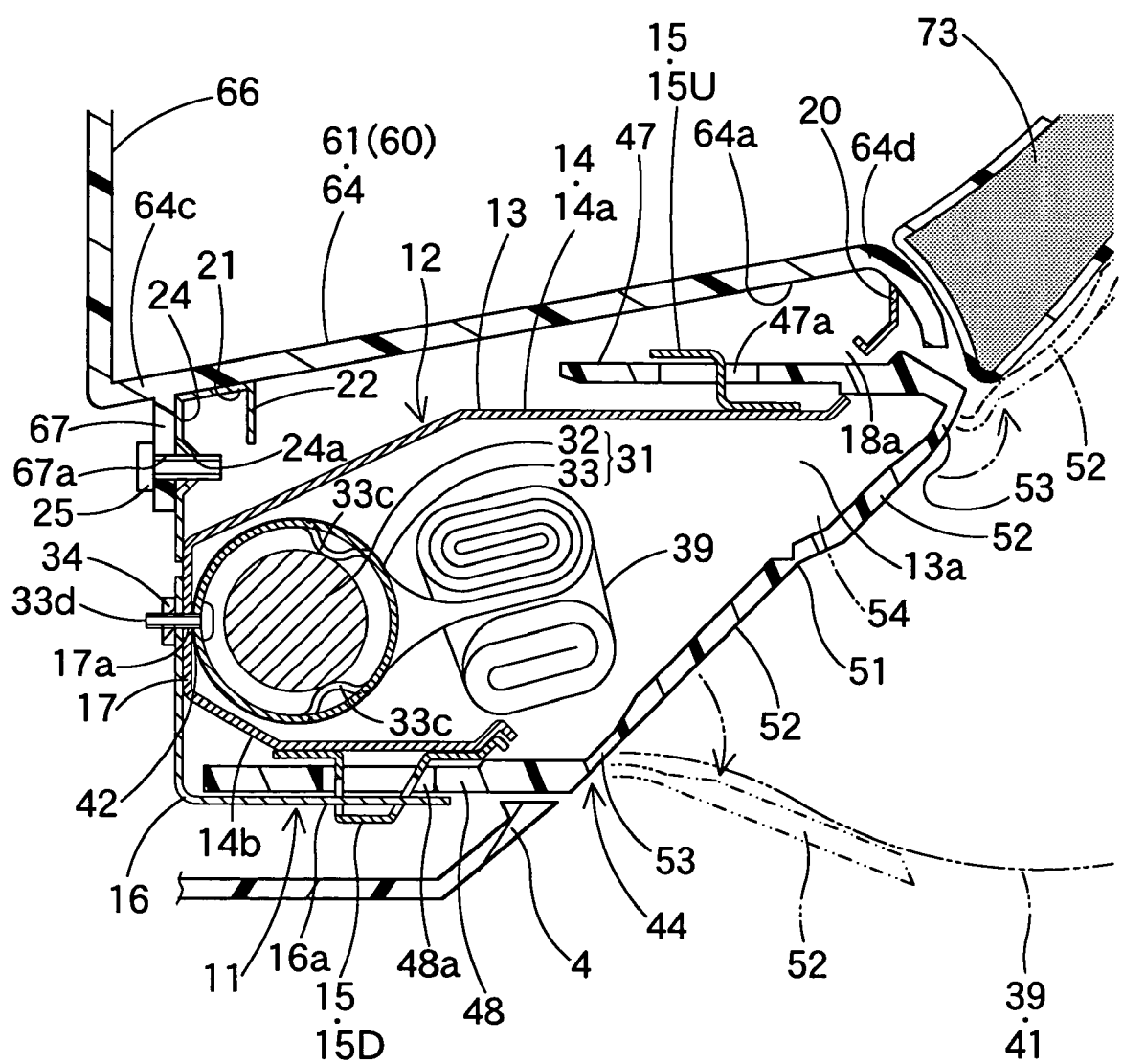
FIG. 7 is a schematic enlarged vertical section of a knee-protecting airbag device in the occupant protection device in FIG. 1.
Figure 8:
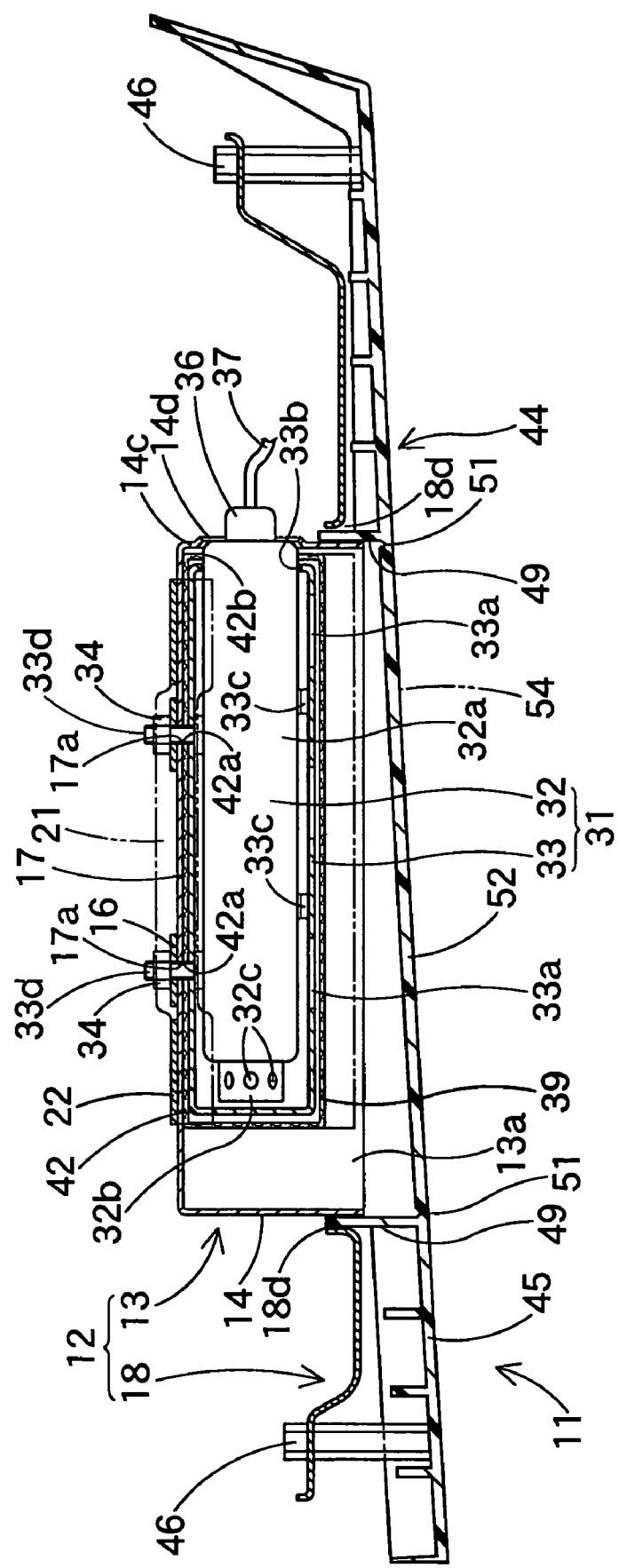
FIG. 8 is a schematic enlarged transverse section of the knee-protecting airbag in FIG. 7.

As referred to FIGS. 5, 7 and 8, the inflator 31 is a cylinder-type arranged so that its axial direction may be along the vehicle's left-right direction. The inflator 31 includes a substantially cylindrical body 32 and a diffuser 33. The body 32 includes a substantially cylindrical general portion 32*a* and a small diameter portion 32*b* projected from an end face of the general portion 32*a*. There are formed a plurality of gas discharge ports 32*c* on the outer circumference of the small diameter portion 32*b*. A connecter 36 to which a lead wire 37 is connected for inputting actuating signals is connected to the other end face of the general portion 32*a* away from the small diameter portion 32*b*. The diffuser 33 has substantially cylindrical shape for covering the inflator body 32, and is closed at one end in its length direction and opened at the other end as an insert hole 33*b*. The diffuser 33 is provided at the rear side as mounted on the vehicle with a plurality of gas outlet ports 33*a* for emitting inflation gas. The diffuser 33 further includes a plurality (two, in the foregoing embodiment) of bolts 33*d* protruded forward of the vehicle, and a plurality of clamping portions 33*c* for holding the body 32. To attach the inflator body 32 to the diffuser 33, the body 32 is inserted into the diffuser 33 through the insert hole 33*b*, from the small diameter portion 32*b*. Then each of the clamping portions 33*c* is plastically deformed and pressed onto the outer circumference of the general portion 32*a*. Thus the body 32 is secured to the diffuser 33. If each of the bolts 33*d* is inserted into through hole 17*a* of bottom wall 17 of the case 12, and then nut 34 is fastened with the bolt 33*d*, the inflator 31 is secured to the case 12.

The inflator 31 is actuated by an actuating signal inputted through the lead wire 37 when an airbag actuating circuit mounted on the vehicle detects a frontal collision of the vehicle. When the actuating circuit detects a frontal collision of the vehicle, the inflator 87 of the airbag device 80 for front passenger's seat also receives an actuating signal simultaneously.

The airbag 39 is formed of flexible woven fabric of polyester, polyamide or the like, and takes a substantially rectangular plate shape as deployed completely, as indicated by double-dotted lines in FIGS. 1 to 3. The airbag 39 is transversely wide enough to protect both knees KL and KR of the occupant M. The airbag 39 is configured to locate its occupant's side wall 40 toward the occupant M, and locate its vehicle body side wall 41 toward the container box 60 as completely deployed. The wall portions 40 and 41 have substantially the same shapes. As shown in FIG. 8, the airbag 39 is provided in a portion 42 in the vehicle body side wall 41 or at its lower end side as completely deployed with two insert holes 42*a* and an insert hole 42*b*. The insert holes 42*a* are for inserting through the individual bolts 33 of the inflator 31, and the insert hole 42*b* is for inserting through the body 32 of the inflator 31. The airbag 39 is attached to the case 12 with the body 32 of the inflator 31 protruded from the insert hole 42*b*, and with the peripheries of the individual insert holes 42*a* clamped by the diffuser 33 and the bottom wall 17 of the case 12. In other words, the airbag 39 is secured to the bottom wall 17 of the case 12 by the insert holes 42*a* peripheries functioning as a mounting portion 42.

Referring to FIGS. 4, 7, 8 and 12, the case 12 is made of sheet metal and includes a box-shaped body 13 and a panel portion 18 extending outward from rear end of the body 13. The body 13 includes a circumferential wall portion 14 having a substantially square cylindrical shape, a bottom wall 17 closing vehicle's front side of the circumferential wall portion 14, and an opening 13*a* opened in substantially rectangular shape at vehicle's rear side. The circumferential wall portion 14 is provided on the outer surfaces of its walls 14*a* and 14*b* confronting each other in the vertical direction with a plurality of retainers 15 (15U and 15D) for attaching upper and lower joint walls 47 and 48 to the case 12.

Figure 12:
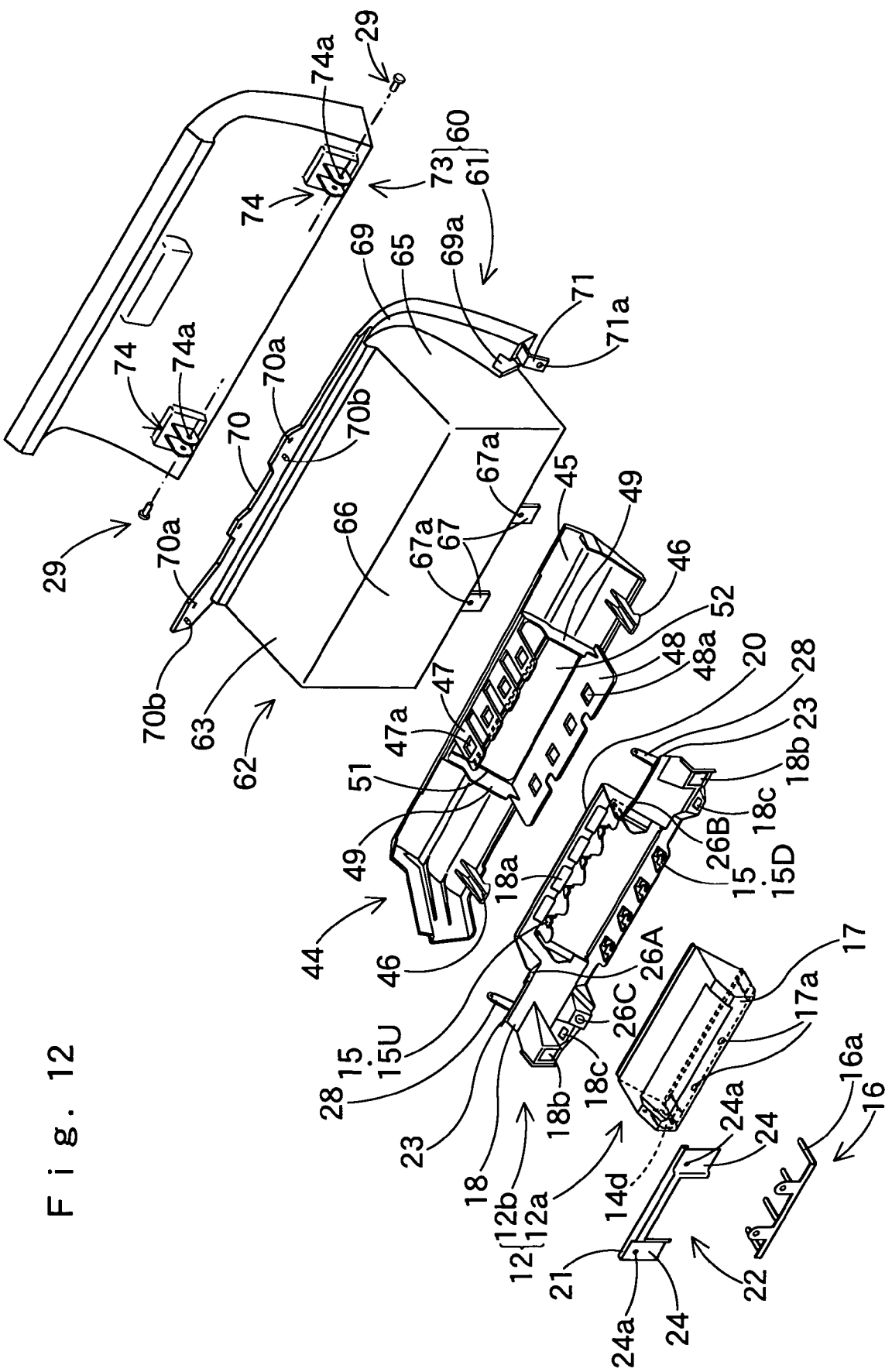
FIG. 12 is an exploded perspective view of the container box and the case of knee-protecting airbag device in the mounting module in FIG. 4.
Figure 13:
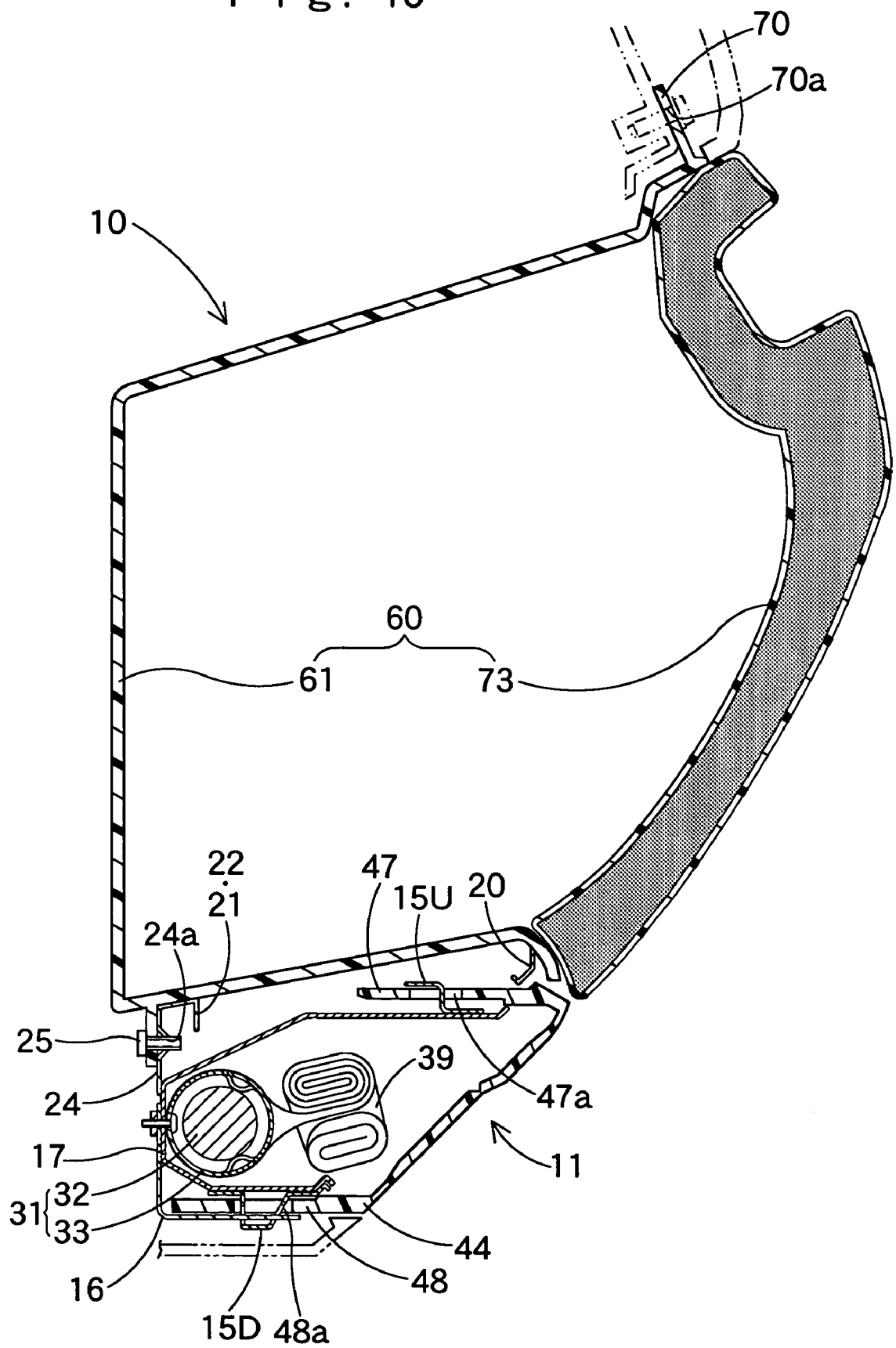
FIG. 13 is a vertical section of the mounting module in FIG. 4.
Figure 14:
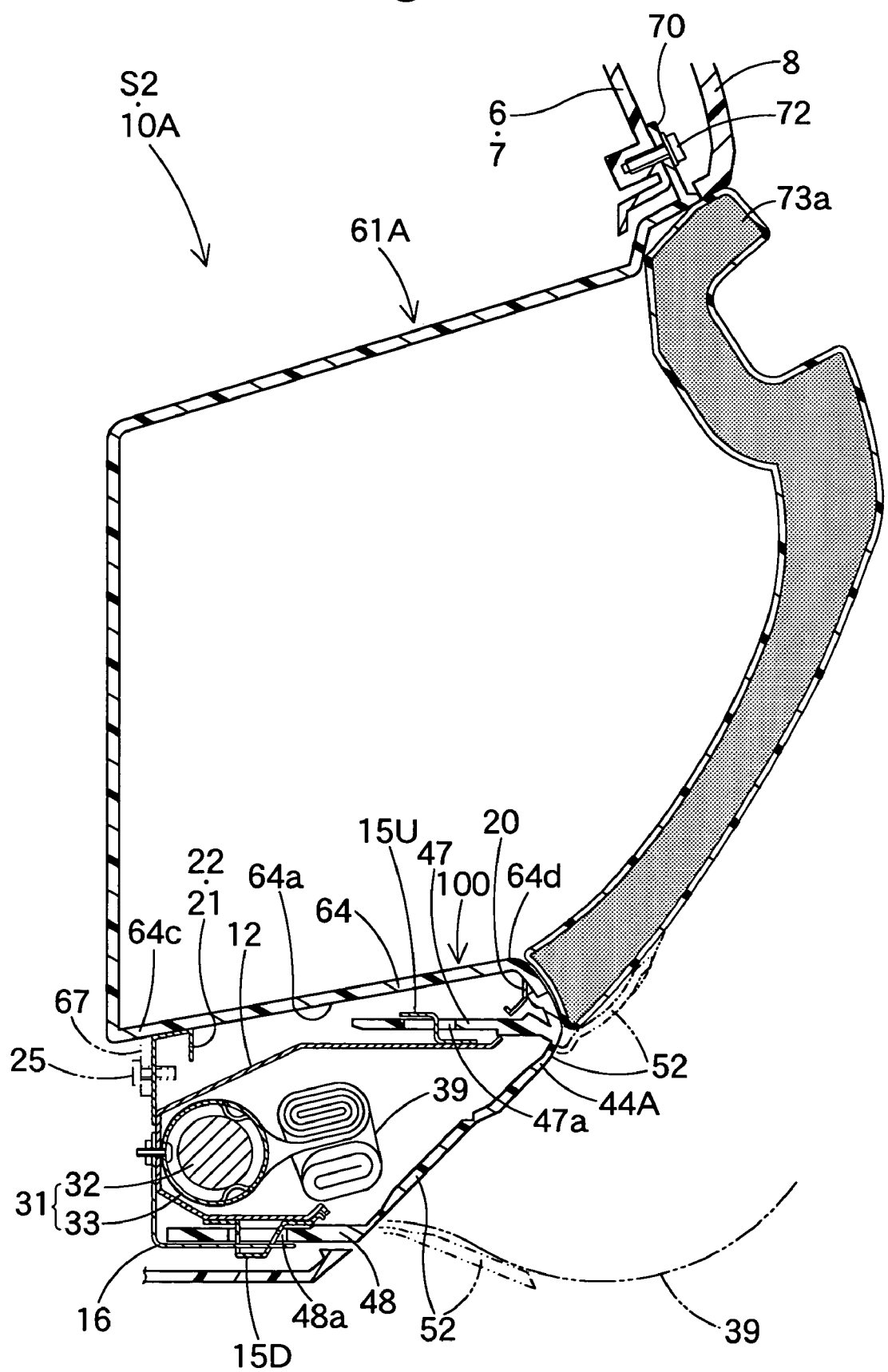
FIG. 14 is a vertical section of a mounting module of a second embodiment of the occupant protection device.
Figure 15:
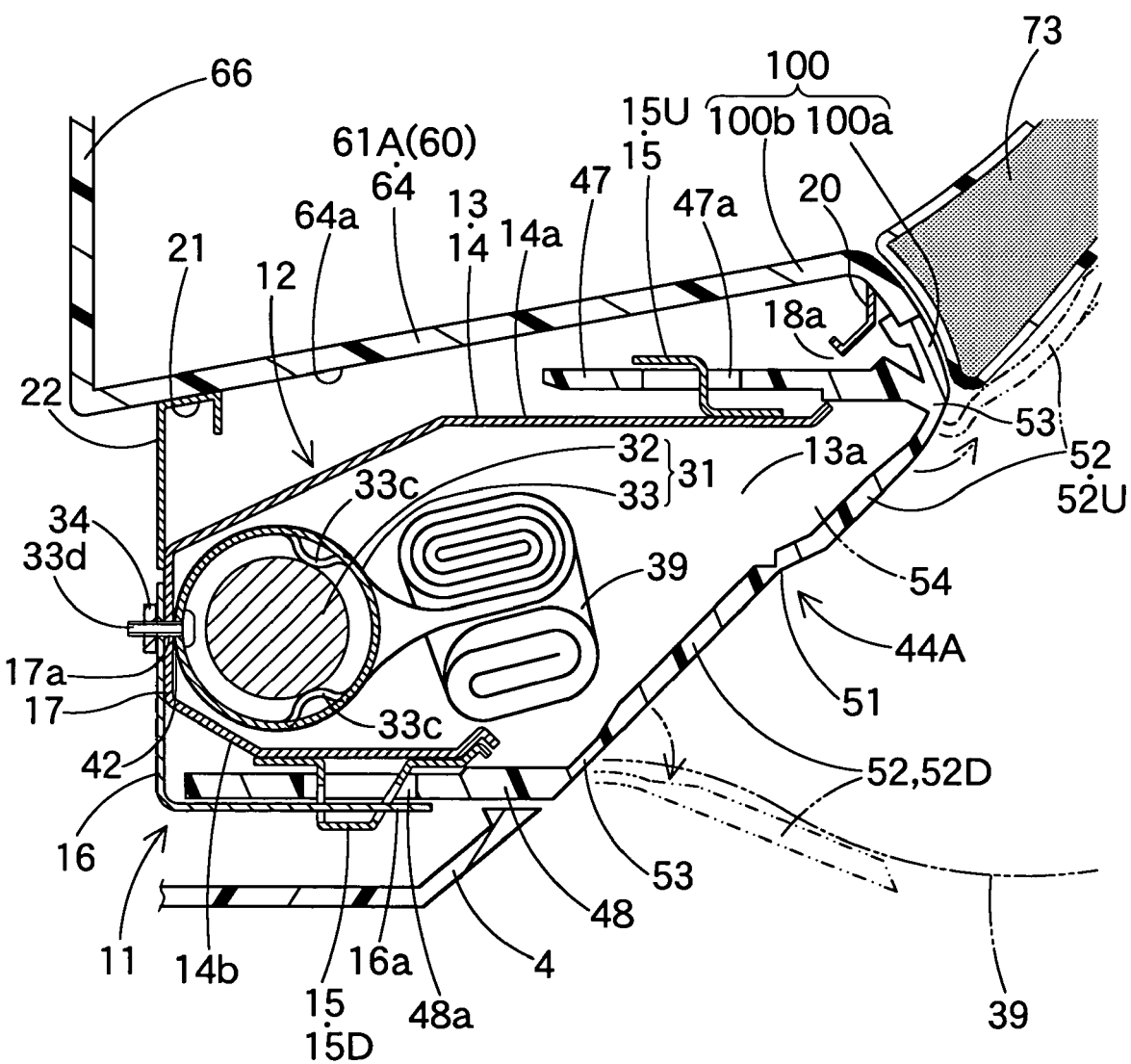
FIG. 15 is a schematic enlarged vertical section of a knee-protecting airbag device in the second occupant protection device.
Figure 16:
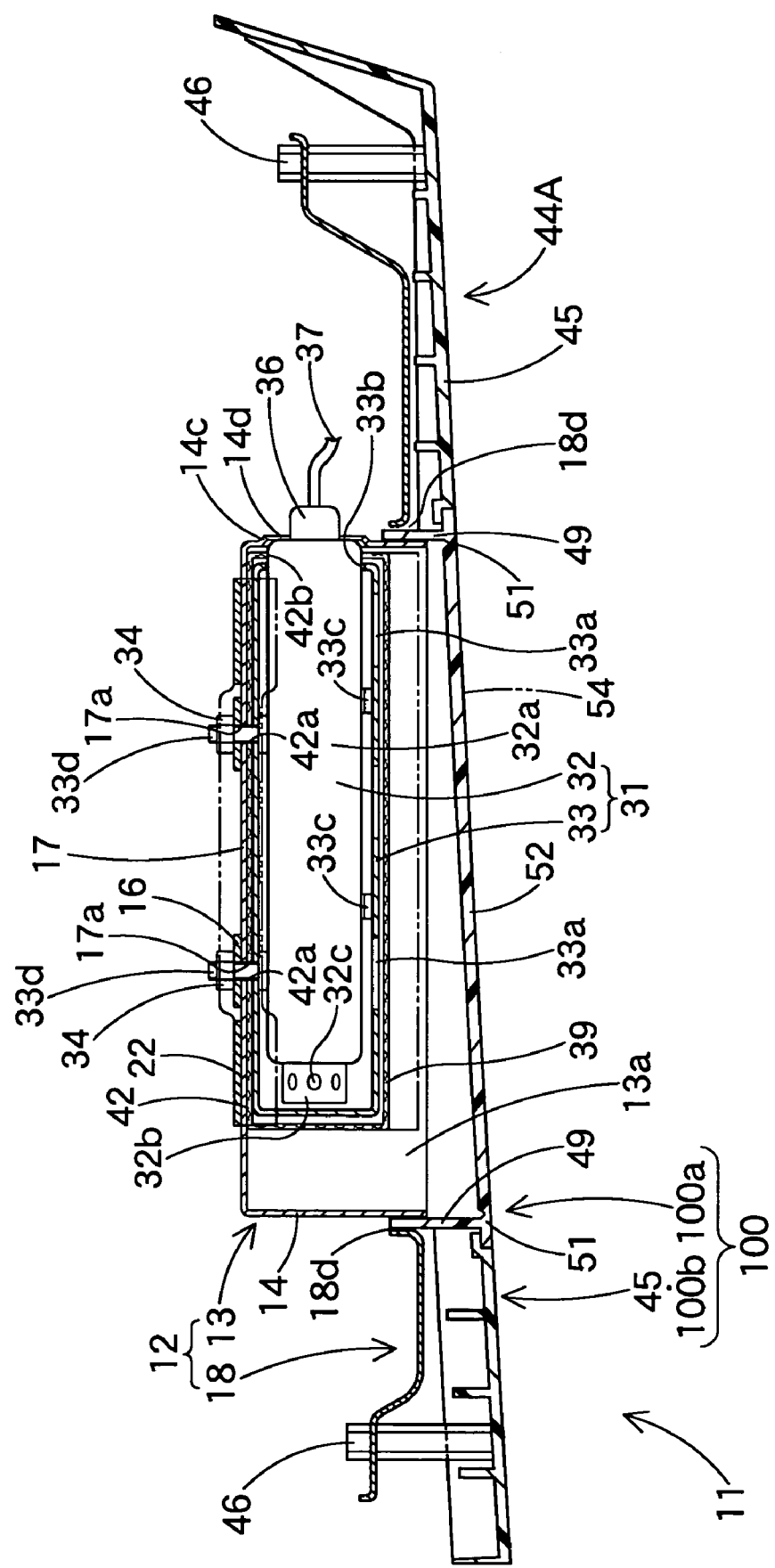
FIG. 16 is a schematic enlarged transverse section of the knee-protecting airbag device in FIG. 15.
Figure 17:
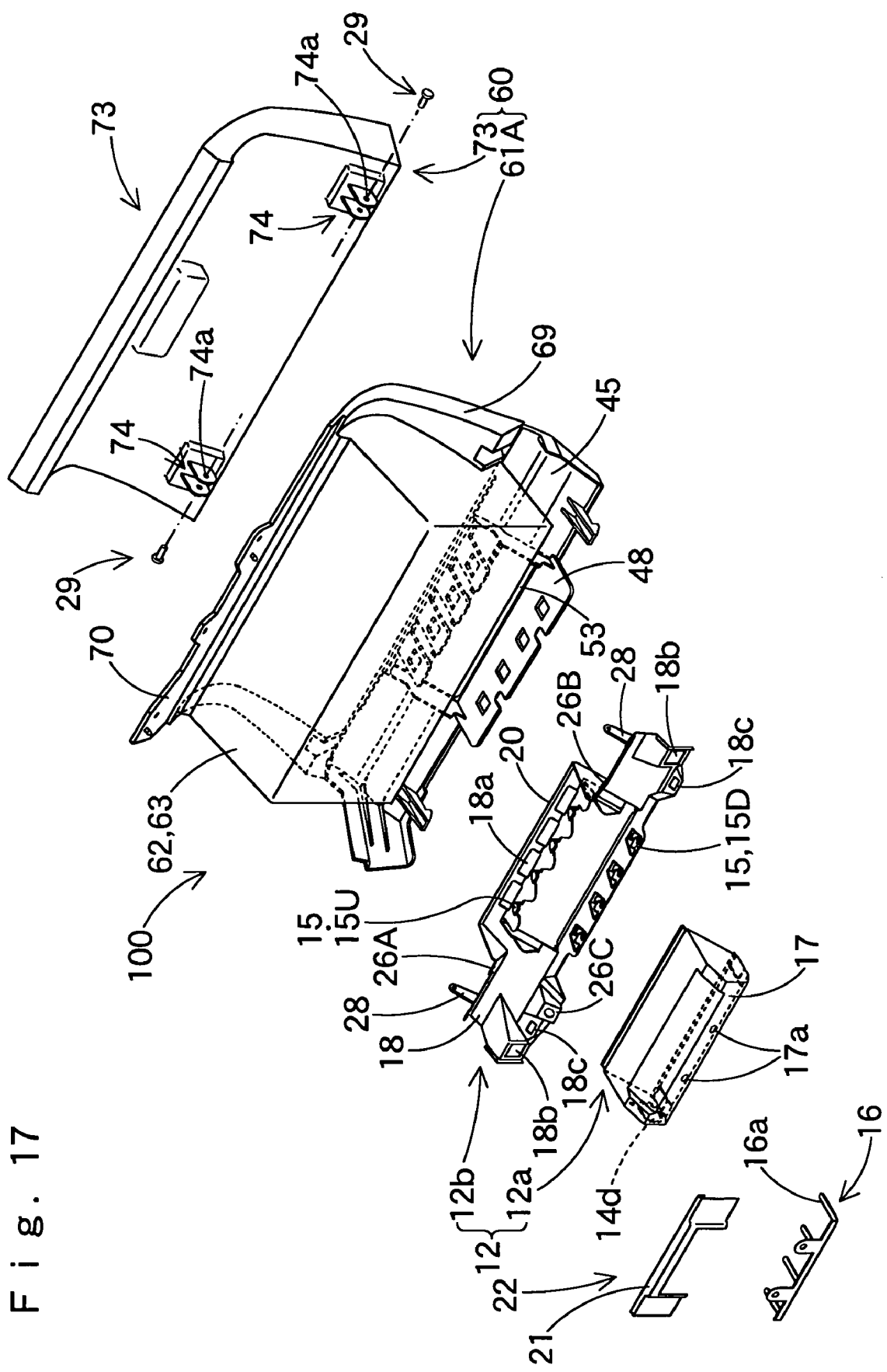
FIG. 17 is an exploded perspective view of a container box and a case of the knee-protecting airbag device in the mounting module in FIG. 14.
Figure 18:
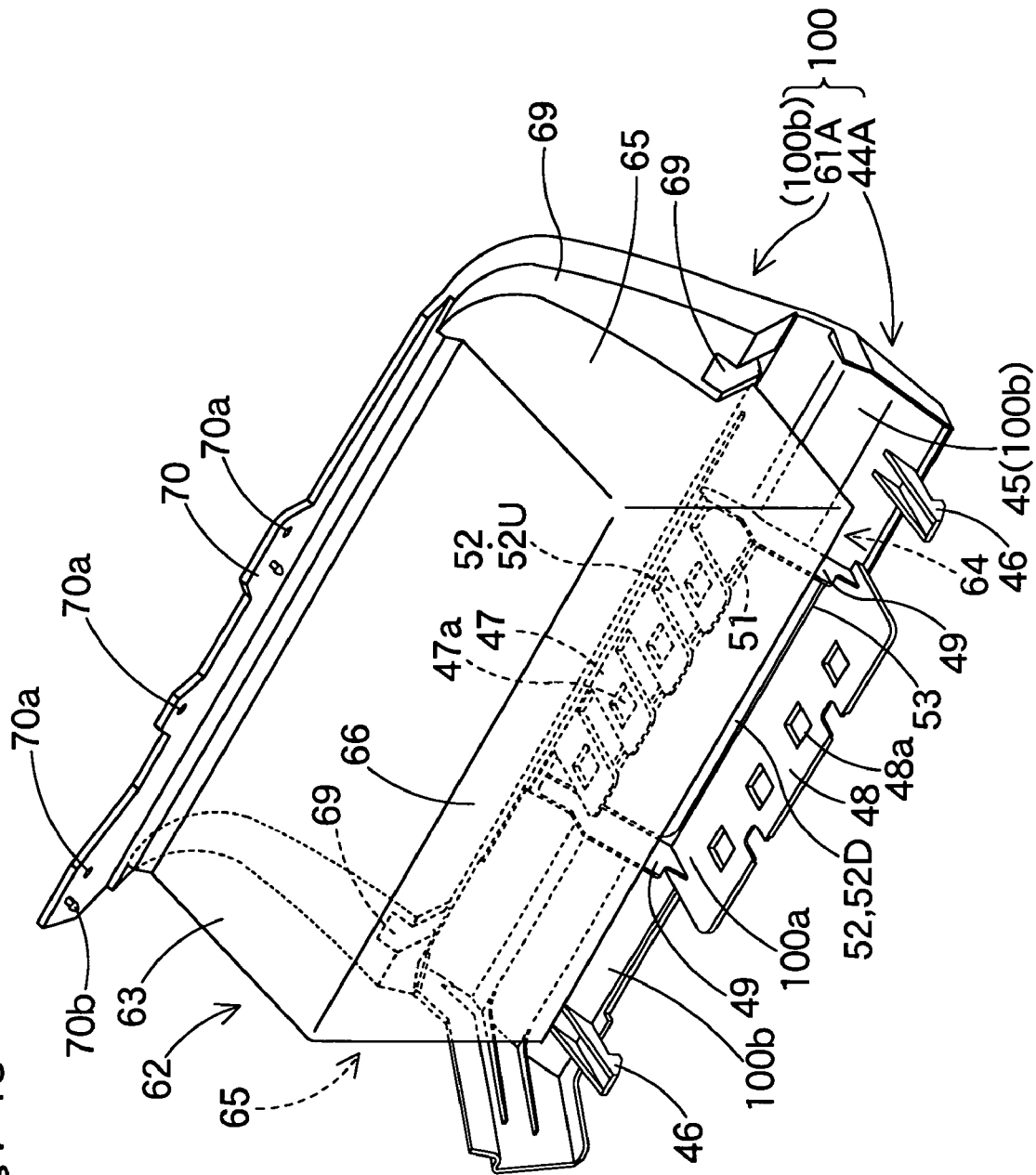
FIG. 18 is a perspective view of a molded part that integrates a box body and an airbag cover used in the second occupant protection device.

Referring to FIGS. 12 and 13, each of the retainers 15U located on the outer surface of the upper wall 14a is formed into a hook shape having substantially Z-shaped section, and is adapted to be inserted into retaining hole 47a formed on the upper joint wall 47 of the airbag cover 44 and retained thereat. The hooks 15U are located in a plurality of positions (four positions, in FIG. 12) along the transverse direction of the vehicle on the wall 14a.

Each of the retainers 15D located on the outer surface of the lower wall 14b is formed into a projection shape having substantially U-shaped section, and is adapted to be inserted into retaining hole 48a of lower joint wall 48 of the airbag cover 44. The projections 15D are located in a plurality of positions (four positions, in FIG. 12) along the transverse direction of the vehicle on the wall 14b. A locking member 16 is inserted into the projections 15D for preventing the projections 15D from coming off from the retaining holes 48a. The locking member 16 includes four bars 16a to be inserted in between the outer surface of the lower joint wall 48 and inner circumference of the individual projections 15D. The four bars are integrated as a single piece at the vehicle's front side and secured to the case 12. The locking member 16 is secured to the bottom wall 17 of the case 12 together with the inflator 31 when the inflator 31 is fixed to the case 12 by means of bolt 33d and nut 34.

As shown in FIG. 8, the sidewall 14c in the circumferential wall portion 14 has an insert hole 14c for inserting through the end of the body 32 of the inflator 31. In the bottom wall 17, there are formed two insert holes 17a for inserting through the bolts 33d of the inflator 31.

The panel portion 18 has a substantially flat plate shape elongated in transverse direction to encircle the opening 13a of the case 12. Here, the case 12 shown in FIG. 12 is constructed by welding two members of a box member 12a and a panel member 12b. The panel member 12b constitutes the panel portion 18, and includes retainers 15U and 15D to be located on the outer surface of the circumferential wall portion 14 of the body 13. The case 12 is formed of two members of the box member 12a and the panel member 12b so as to reduce kinds of constituent parts of knee protecting airbag devices for front passenger's seat and driver's seat to be mounted on a vehicle. That is, the box member 12a of the case 12 and the inflator 31 are also used for knee-protecting airbag device for driver's seat. On the other hand, the panel member 12b and the airbag cover 44 are so configured, with design changes, as to fit in arrangement positions.

The case 12 includes a support section 20 formed in upper edge side of the panel portion 18, and a support section 21 fixed to front side of the bottom wall 17 of the body 13. The support sections 20 and 21 are adapted to abut against lower surface 64a of lower wall 64 in box body 61 of the container box 60, and support the lower wall 64 of the box body 61. The support section 20 supports substantially entire area of rear end part of the lower surface 64a of the lower wall 64 except the left and right ends, and the support section 21 supports substantially entire area of front end part of the lower wall lower surface 64a except the left and right ends. The support section 20 is formed by extending transversely central part of the upper edge of the panel portion 18, and the support section 21 is composed of a bracket 22 of sheet metal having vertically inverted-J shaped section as taken along front-rear direction of the vehicle and welded to the bottom wall 17.

Figure 4:
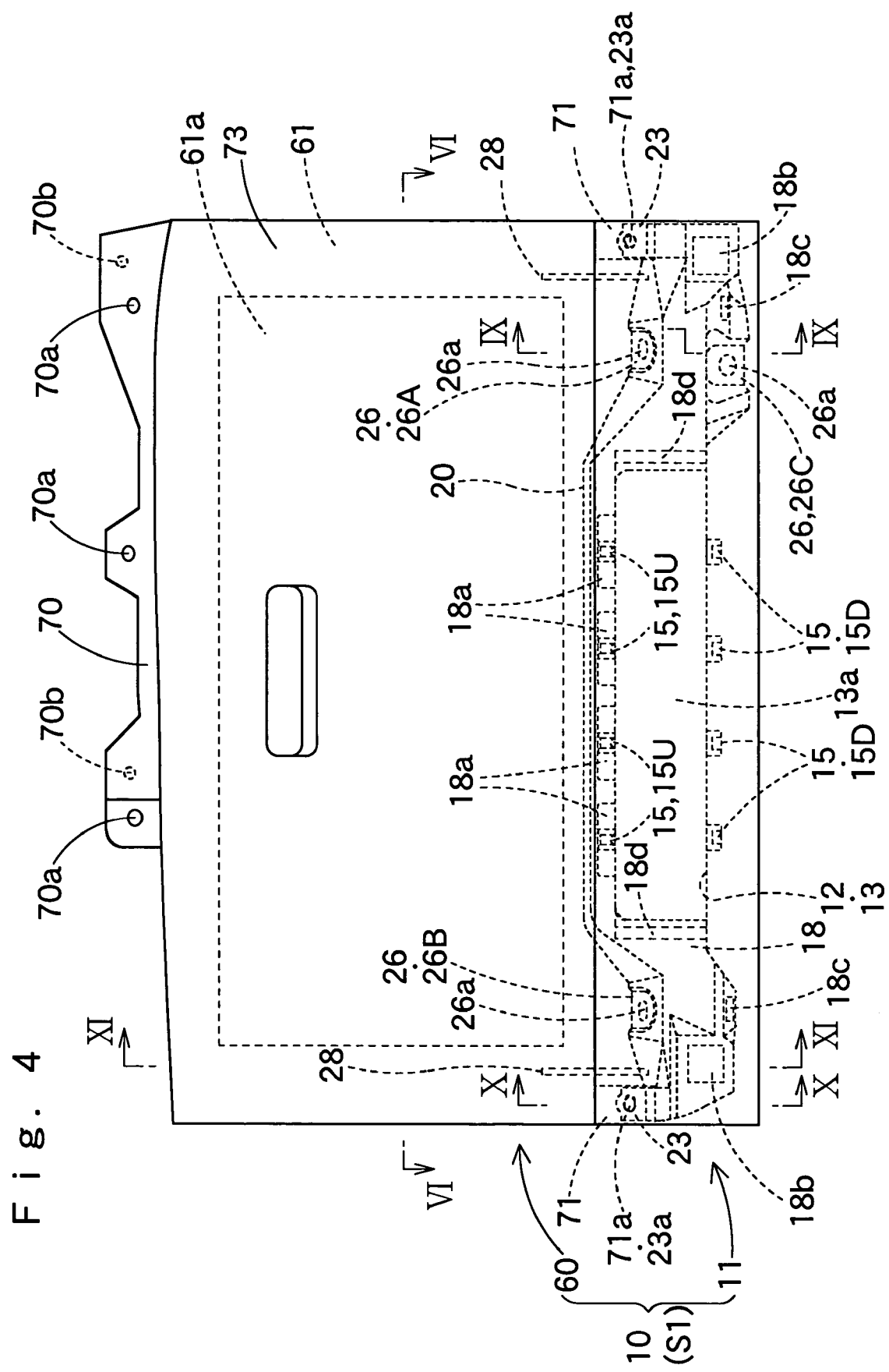
FIG. 4 is a schematic front view of a mounting module in the occupant protection device of FIG. 1.
Figure 10:
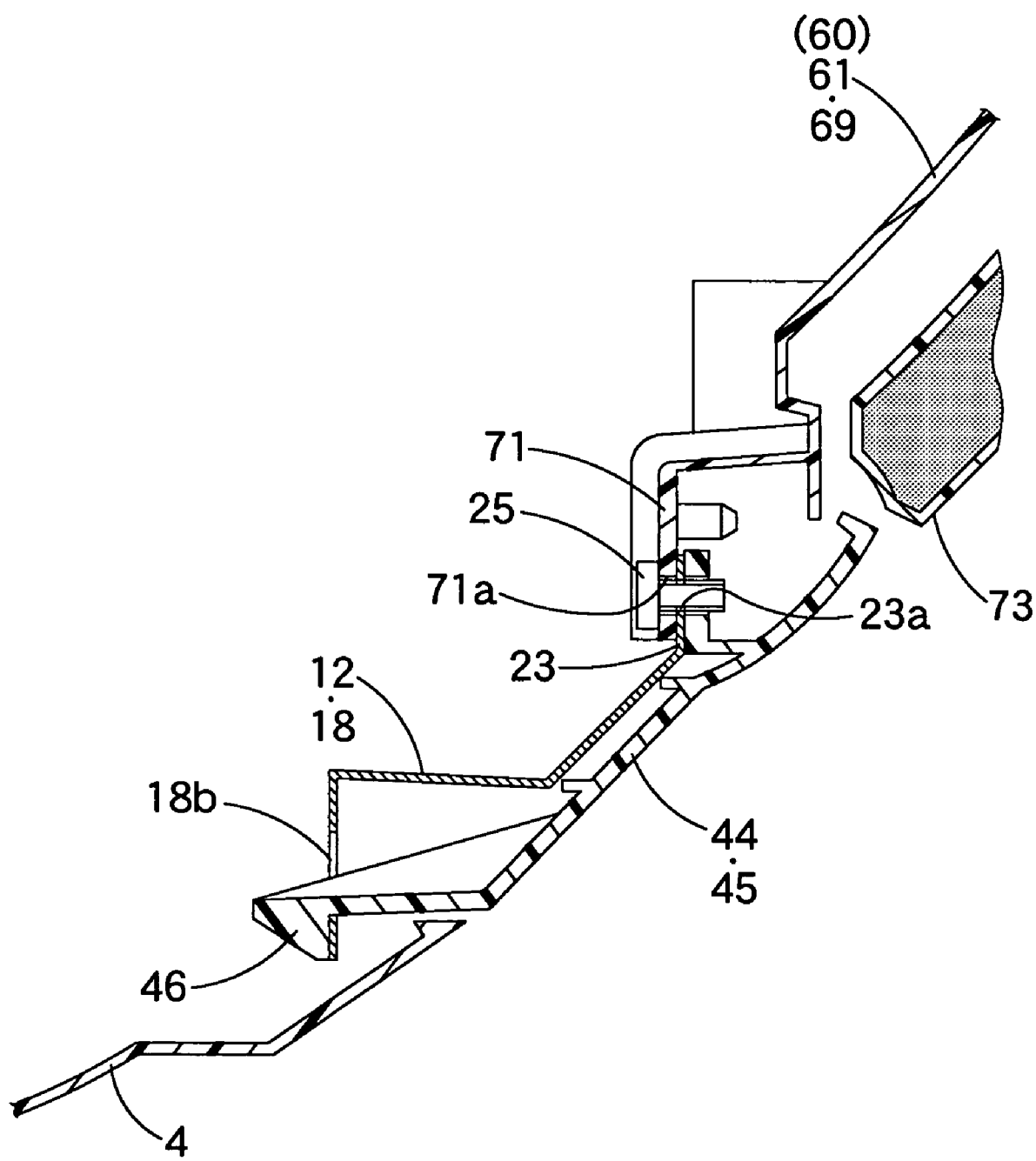
FIG. 10 is a schematic vertical section showing joined condition of a case of the knee-protecting airbag device in FIG. 7 and a box body of container box, taken along line X—X in FIG. 4.

The case 12 further includes each two fixers 23 and 24 for fixing the box body 61 of the container box 60. As shown in FIGS. 4, 10 and 12, the fixers 23 are located in the panel portion 18 to fix fixing pieces 71 disposed in left and right lower ends of a flange 69 positioned in rear end of the box body 61 by means of tapping bolts 25. Each of the fixers 23 is provided with a hole 23a for screwing the bolt 25 into. Referring to FIGS. 7 and 12, the fixers 24 are located in the bracket 22 to fix fixing pieces 67 projected downward from vicinities of left and right lower ends of the lower wall 64 of the box body 61 by means of tapping bolts 25. Each of the fixers 24 is provided with a hole 24a for screwing the bolt 25 into.

Figure 9:
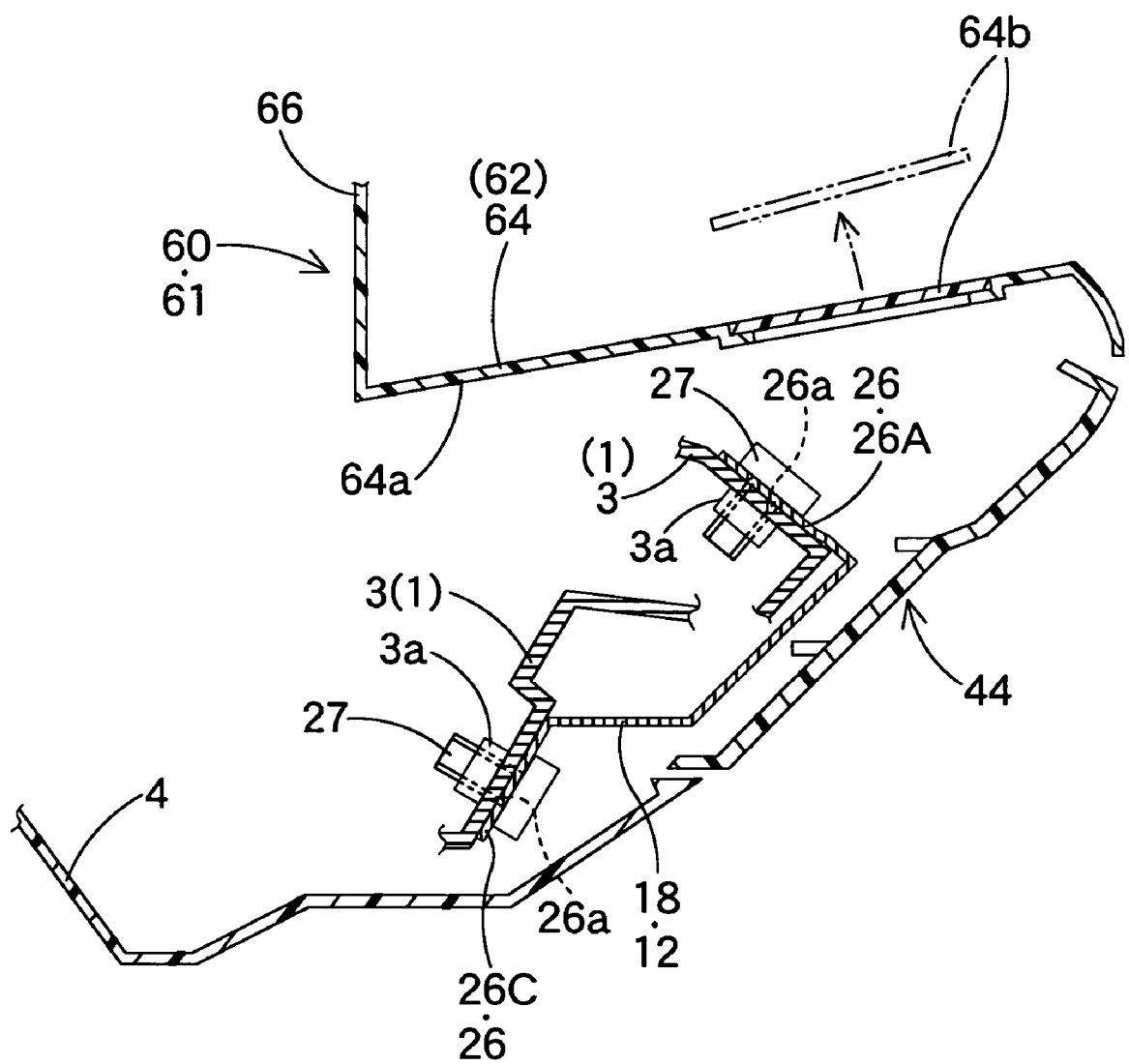
FIG. 9 is a schematic vertical section showing joined condition of the knee-protecting airbag device in FIG. 7 and vehicle body, taken along line IX—IX in FIG. 4.

As referred to FIGS. 4, 9 and 12, the case 12 includes three joint sections 26 for securing the airbag device 11 to the vehicle body 1. The joint sections 26 are located in positions away from the body 13 in the panel portion 18, and includes joint sections 26A and 26B located respectively in the vicinities of left and right upper edge, and a joint section 26C located toward right side in the lower edge. Each of the joint sections 26 (26A, 26B and 26C) has a joint hole 26a for inserting bolt 27 into. The joint sections 26 are bolt 27 fixed to brackets 3 extending from center brace or side member of the vehicle body 1, thereby helping to secure the airbag device 11 to the vehicle body 1. Each of the brackets 3 in advance has a nut 3a fixed thereto for screwing the bolt 27 into.

Figure 11:
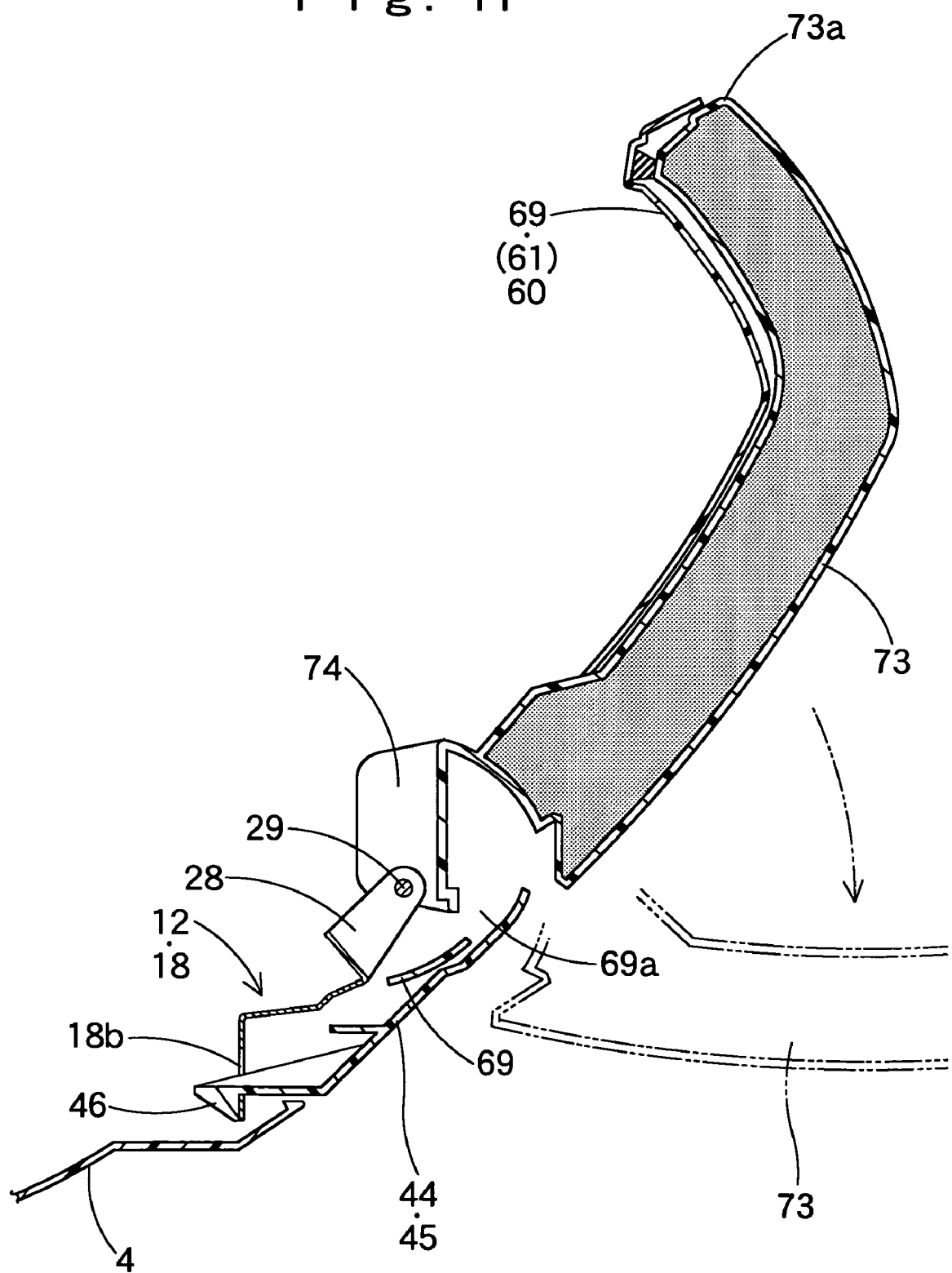
FIG. 11 is a schematic vertical section showing the container box in FIG. 10 supporting a lid, taken along line XI—XI in FIG. 4.

Referring to FIGS. 11 and 12, the panel portion 18 of the case 12 in the first occupant protection device S1 is further provided at two positions with pivot sections 28 for supporting a lid 73 of the container box 60 such that the lid 73 may pivotally rotate thereupon when opened and closed. Each of the pivot sections 28 supports each of hinge arms 74 located in left and right sides of the lid 73 lower edge in a swingable manner by means of a pin 29.

Moreover, as referred to FIGS. 4 and 12, the panel portion 18 of the case 12 is provided at four positions in the upper periphery of the opening 13a with first apertures 18a for inserting the upper joint wall 47 of the airbag cover 44, and at two positions near left and right edges with second apertures 18b for retaining retaining legs 46 of the airbag cover 44. Third apertures 18c shown in FIGS. 4 and 12 are adapted to retain not-shown retaining legs of undercover 4. Slits 18d shown in FIGS. 4 and 8 are for inserting left and right side walls 49 of the airbag cover 44 through.

The airbag cover 44 is made from thermo-plastic elastomer of polyolefin or the like, and is joined to and supported by the case 12 for covering the vehicle's rear side of the folded airbag 39 and the case 12. The airbag cover 44 includes two doors 52 for covering the opening 13a of the case 12 at rearward of the vehicle, and a general section 45 located around the doors 52.

The two doors 52 are formed in substantially rectangular plate shape, and are provided there around with a thinned breakable portion 51 of substantially H-shape as viewed from the vehicle's rear side, as shown in FIG. 1. The breakable portion 51 is so provided at the vehicle's front side face with continuous or intermittent grooves as to easily break when the doors 52 are pushed by inflating airbag 39. Thus the doors 52 are configured to open upward and downward on hinge lines 53 if the breakable portion 51 breaks when pushed by inflating airbag 39.

In the general section 45, there are formed four walls 47, 48, 49 and 49 protruded forward of the vehicle to neighbor the circumferential wall portion 14 of the case 12. The four walls are located along the doors 52 peripheries and outward of the circumferential wall portion 14 of the case 12, as shown in FIGS. 5, 7, 8 and 12. The upper joint wall 47 located above the case circumferential wall 14 and the lower joint wall 48 located below the wall 14 help join the airbag cover 44 to the case 12. The walls 47 and 48 includes retaining holes 47a and 48a, respectively, such that the retainers 15 (15U and 15D) of the circumferential wall portion 14 are inserted and retained thereat.

The general section 45 further includes retaining legs 46 at left and right sides in the lower edge. The retaining legs 46 are protruded forward of the vehicle to be inserted into the apertures 18b of the panel portion 18 and retained by the panel portion 18, as referred to FIGS. 10 and 11.

The container box 60 includes a box body 61 opened rearward of the vehicle, and an openable lid 73 for covering opening 61a of the box body 61, and is made from hard synthetic resin such as polypropylene.

Referring to FIGS. 4 to 6 and 12, the box body 61 includes a bottom wall 66 positioned at the vehicle's front side and apart from the opening 61a, a circumferential wall portion 62 extending rearward of the vehicle from the bottom wall 66 periphery in substantially square cylindrical shape, and a flange 69 extending up, left and rightwards from the periphery of the opening 61a of the circumferential wall portion 62. The circumferential wall portion 62 includes an upper wall 63 positioned in upper side, a lower wall 64 positioned in lower side, and left and right side walls 65 joining the upper and lower walls 63 and 64.

From left and right front edge of the lower wall 64 are protruded downward fixing pieces 67 to be fixed to the fixers 24 of the case 12. Each of the fixing pieces 67 is provided with a fixing hole 67a for inserting through the bolt 25. As shown in FIG. 9, the lower wall 64 is further provided with a detachable cap 64b for putting in the bolts 27 and fixtures used in the bolt 27 fixing of the joint sections 26A and 26B of the case 12 to the bracket 3 of the vehicle body 1.

As shown in FIGS. 11 and 12, the flange 69 is provided in left and right in the lower edge with through holes 69a for inserting the left and right hinge arms 74 of the lid 73. Near the hole 69a, as shown in FIGS. 10 and 12, are protruded fixing pieces 71 downward to be fixed to the fixers 23 of the case 12. Each of the fixing pieces 71 has a fixing hole 71a for inserting the bolt 25. In the upper edge of the flange 69, as shown in FIGS. 5 and 12, there is protruded upward a joint piece 70 to be joined to lower edge 7a of the dashboard body 7. The joint piece 70 includes joint holes 70a for inserting bolts 72 to be screwed into the body 7, and retaining legs 70b to be retained by the body 7.

As referred to FIGS. 11 and 12, the lid 73 is provided at its left and right lower edge in the vehicle's front side face with hinge arms 74 projected forward of the vehicle. The hinge arms 74 are inserted through the through holes 69a of the flange 69 in the box body 61 and joined with the pivot sections 28 of the case 12 in a swingable manner, such that the upper edge 73a of the lid 73 rotates in front-rear direction. The hinge arms 74 include a not-shown damper mechanism such that opening/closing action of the lid 73 may not be performed too rapidly. The lid 73 is position-restricted by a butting against the flange 69 of the box body 61 when closed, and when opened, it is position-restricted by the damper mechanism.

Assembly of the knee-protecting airbag device 11 is now described. Firstly, the inflator 31 preliminarily assembled by the body 32 and the diffuser 33 is put in the airbag 39 so that the bolts 33d are protruded from the insert holes 42a and the end of the inflator body 32 is protruded from the insert hole 42b, and then the airbag 39 is folded. Subsequently, the airbag 39 is wrapped around by not-shown breakable wrapping film for keeping the folded-up shape. At this time, the bolts 33d and the end of the body 32 of the inflator 31 protruded from the insert holes 42a and 42b are taken out from the wrapping film. Here, other than resin sheet member, cloth member such as woven fabric forming the airbag 39, tape member or string member may be employed as the wrapping film.

Thereafter, the inflator 31 is housed in the case 12 together with the folded airbag 39, so that the individual bolts 33d of the inflator 31 are protruded from the insert holes 17a, and the end of the inflator body 32 is protruded from the insert hole 14d. By further fastening not-shown spring nuts with the individual bolts 33d from front side of the bottom wall 17, the inflator 31 and the airbag 39 are housed in and attached to the case 12.

Then the airbag cover 44 is assembled with the case 12. More specifically, the walls 47, 48 and 49 of the airbag cover 44 are located around the case circumferential wall portion 14 toward the opening 13a. At this time, the individual retaining hooks 15U are so inserted into the retaining holes 47a of the upper joint wall 47 as to be retained at peripheries of the retaining holes 47a on upper surface of the upper joint wall 47. On the other hand, the individual retaining projections 15D are inserted into the retaining holes 48a of the lower joint wall 48, and the retaining legs 46 are so inserted into the apertures 18b as to be retained at the apertures 18b peripheries. Then the bars 16a of the locking member 16 are inserted between the outer surface of the lower joint wall 48 and the inner circumference of the individual projections 15D, the individual bolts 33d of the inflator 31 are inserted through the locking member 16, and the nuts 34 are fastened with the bolts 33d. Thus the knee-protecting airbag device 11 is assembled. Here, a connector 36 having the lead wire 37 connected is preliminarily joined with the inflator body 32.

Assemblage of the module 10 is started by making the lower surface 64a of the lower wall 64 of the box body 61 abut against the individual support sections 20 and 21 of the case 12 of the assembled knee-protecting airbag device 11. Then the fixing holes 23a, 24a of the individual fixers 23 and 24 are matched with corresponding fixing holes 67a and 71a of the individual fixing pieces 67 and 71. By screwing the bolts 25 into the fixing holes 23a and 24a through the fixing holes 71a and 67a, the box body 61 is secured to the case 12.

Subsequently, the holes 74a in the individual hinge arms 74 of the lid 73 are located at the pivot sections 28 of the case 12 through the through holes 69a of the box body 61, and the pins 29 are inserted into the holes 74a and pivot sections 28, so that the lid 73 is assembled with the box body 61 so as to open and close the opening 61a of the box body 61. Thus the container box 60 is assembled, and the module 10 is formed, as shown in FIG. 13. At this time, the not-shown damper mechanism is mounted on the module 10, too.

In the first occupant protection device S1, the dashboard body 7 and the airbag device 80 for front passenger's seat have been preliminarily mounted on the vehicle before the module 10 is mounted on the vehicle. To mount the module 10 on the vehicle, the individual joint sections 26A, 26B and 26C in the case 12 of the airbag device 11 are firstly located at predetermined brackets 3 of the vehicle body 1, and the joint piece 70 of the container box 60 is applied to the lower edge 7a of the dashboard body 7. At this time, the retaining legs 70b of the joint piece 70 are inserted into predetermined positions of the dashboard lower edge 7a and retained thereat.

Subsequently, the individual bolts 27 are fastened into the nuts 3a via the individual joint holes 26a. The fixing of the bolts 27 in the joint sections 26A and 26B is done with the lid 73 and the cap 64b open. After fixing the bolts 27, the cap 64b is relocated and then the lid 73 is closed. In the joint section 26C, the bolt 27 is easily fixed since under cover 4 has not yet been mounted at this point.

By then fastening the bolts 72 to the lower edge 7a of the dashboard body 7 via the joint holes 70a of the joint piece 70, attaching a decoration cover 8 to the body 7, and by mounting the under cover 4, the mounting of the module 10 on the vehicle is completed. Terminal of the lead wire 37 is connected to the airbag actuating circuit.

After mounting the module 10 on the vehicle, when an actuating signal is input to the body 32 of the inflator 31 via the lead wire 37, inflation gas is discharged from the gas discharge ports 32c of the inflator 31, and flows into the airbag 39 via the gas outlet ports 33a of the diffuser 33. Then the airbag 39 inflates and breaks the wrapping film, pushes the doors 52 of the airbag cover 44, and breaks the breakable portion 51 to open the doors 52 up and downwards. As indicated by double-dotted lines in FIGS. 1 to 3, the airbag 39 then protrudes rearward from the opening 54 provided by the opening of the doors 52, and further protrudes upward along the rear surface of the lid 73 while expanding and inflating. Accordingly, even if the occupant M seated in the front passenger's seat PS advances, the inflated airbag 39 is able to protect the knees K properly. At this time, since the airbag device 80 for front passenger's seat is actuated, too, the airbag 91 inflates, pushes open the doors 97 in front and rear directions, and protrudes from the case 81 to protect upper body MU of the occupant M, as indicated by double-dotted lines in FIGS. 2 and 3.

In the first occupant protection device S1, the knee-protecting airbag device 11 and the container box 60 are assembled together in advance to form the module 10. Accordingly, the knee-protecting airbag device 11 and the container box 60 can be mounted on the vehicle at one time by mounting the module 10 on the vehicle, thereby reducing mounting work processes, and tact time per vehicle, compared with a case of mounting the knee-protecting airbag device 11 and the container box 60 separately.

Of course, if the knee-protecting airbag device 11 is actuated, the airbag 39 inflates and protect the knees K of the occupant M.

Therefore, the first occupant protection device S1 contributes to prevent tact time per vehicle from increasing even if the container box 60 and the knee-protecting airbag device 11 are both mounted in front of front passenger's seat PS.

In the foregoing embodiment, the knee-protecting airbag device 11 and the container box 60 are integrally assembled before being mounted on the vehicle. Accordingly, there are choices of assembling direction to each other, and a simple assembling means can be employed. In the foregoing embodiment, the fixing pieces 71 and 67 of the box 60 are applied to the fixers 23 and 24 of the case 12 from the vehicle's front side, and the bolts 25 are fastened from the vehicle's front side. Thus, it is possible to adopt an assembling direction which cannot be chosen in a case of mounting the knee-protecting airbag device 11 and the container box 60 separately, while securing predetermined assembling strength. In the foregoing embodiment, moreover, instead of applying female thread cutting, the fixing holes 23a and 24a with their peripheries raised by mere burring work on sheet metal of the case 12 are fastened with the tapping bolts 25 to secure the case 12 of the airbag device 11 and the body 61 of the container box 60 together. Thus, predetermined assembling strength is secured by simple assembling means.

Since the knee-protecting airbag device 11 and the container box 60 are assembled together before being mounted on the vehicle, little extra space is needed in mounting direction for mounting the knee-protecting airbag device 11 and the container box 60 separately. Consequently, more interior space is secured in front of front passenger's seat.

In the first occupant protection device S1, moreover, the box body 61 is abutted on and supported at its lower surface 64a of the lower wall 64 by the support sections 20 and 21 protruded upward from the case 12. Here, since the case 12 is made of rigid sheet metal, and is secured to the vehicle body 1 tightly so that inflating airbag 39 may smoothly protrude from the opening 13a, the lower wall lower surface 64a of the box body 61 is securely supported by the support sections 20 and 21. Accordingly, even if heavy objects are housed in the boxy body 61, the box body 61 is prevented from deforming, and thus is able to keep good appearance. Especially, since the support sections 20 and 21 support the lower surface 64a of the lower wall 64 in the box body 61 widely in transverse direction at the front edge 64c side and the rear edge 64d side, the box body 61 is stably supported.

In the first occupant protection device S1, furthermore, the box body 61 is secured to the case 12 by means of the fixers 23, 24 and the fixing means 67 and 71, and then the case 12 includes the joint section 26 for joint to the vehicle body 1. In other words, the box body 61 is joined to the vehicle body 1 by means of the case 12. In mounting work of the module 10 on the vehicle, accordingly, the container box 60 is secured to the body 1 by joining the individual joint sections 26 extending from the case 12 to the body 1, thus omitting fixing work of the box 60 to the body 1. Here, since the case 12 is made of rigid sheet metal and is tightly secured to the body 1 so that expanding airbag 39 may smoothly protrude from the opening 13a, the container box 60 is stably secured to the body 1 via the case 12.

Besides, since the lid 73 of the container box 60 is swingably supported by the pivot sections 28 formed in the rigid case 12 of the knee-protecting airbag device 11, stable opening/closing actions are secured. Without considering this point, it will also be appreciated to form pivot sections in the box body 61 to support the hinge arms 74 of the lid 73 for opening and closing the opening 61a.

Although the box body 61 and the airbag cover 44 are formed separately in the first occupant protection device S1, box body and airbag cover may be made of an integrally molded synthetic resin part 100, as in box body 61A and airbag cover 44A of a second embodiment of the occupant protection device S2 shown in FIGS. 14 to 18. In the molded part 100, upper edge part of general section 45 of the airbag cover 44A is continuously, and integrally formed with rear edge part of lower wall 64 and lower edge part of flange 69 of the box body 61A. The molded part 100 is two-color part consisting of soft section 100a made of soft synthetic resin and hard section 100b made of hard synthetic resin each of which is compatible to each other. The soft section 100a includes doors 52 (52U and 52D), walls 47, 48, 49 and hinge lines 53 of the airbag cover 44A, and the hard section 100b includes the box body 61A. The cover 44A is made of soft material such that the doors 52 may turn smoothly around flexible hinge lines 53. In the second occupant protection device S2, the soft section 100a of the two-color part 100 is made from thermoplastic elastomer of olefin, while the hard section 100b is made from hard polypropylene which is compatible to the soft section 100a and has shape retaining property.

Since the general section 45 of the airbag cover 44A apart from the doors 52 in transverse direction had better be rigid rather than be soft, the general section 45 in the molded part 100 is made as the hard section made from the same material as the box body 61A. Of course, the general section 45 may be included in the soft section 100a together with other parts of the airbag cover 44A.

The second occupant protection device S2 has similar construction to the first device S1 except that the airbag cover 44A and the box body 61A are formed integral as the single two-color part 100. Therefore, similar portions and parts to the first occupant protection device S1 will be designated common reference numerals, and their descriptions will be omitted.

Figure 19A:
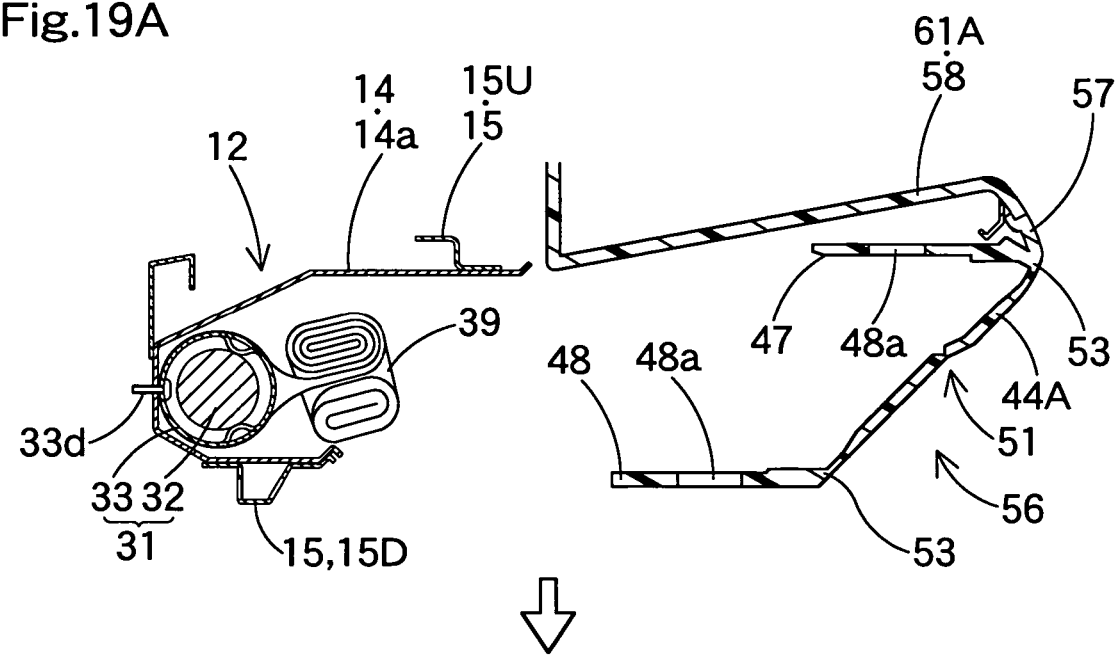
FIG. 19 illustrates assembling processes of the airbag cover in FIG. 18 to a case in the second occupant protection device.
Figure 19B:
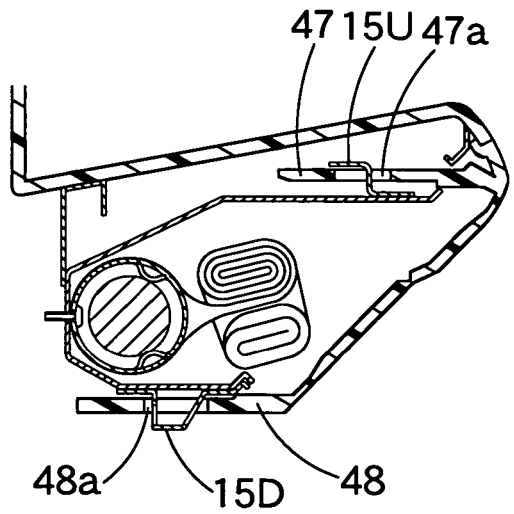
Figure 19C:
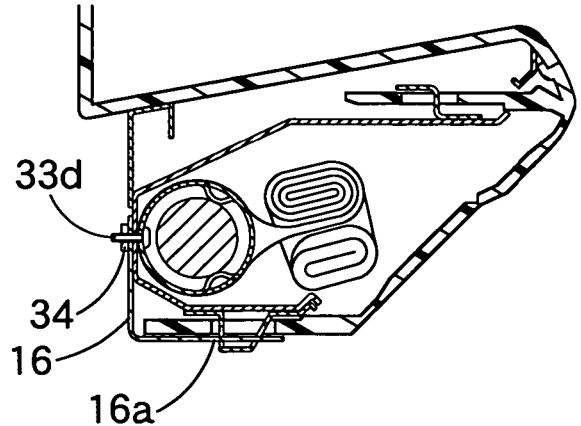

Assemblage of module 10A in the second occupant protection device S2 is started by housing the folded airbag 39 and the inflator 31 in the case 12, as in the first occupant protection device S1. Then the airbag cover 44A made integral with the box body 61A is assembled with the case 12. More specifically, walls 47, 48 and 49 of the airbag cover 44A are located around case circumferential wall portion 14 toward the opening 13a. Then as shown in FIGS. 19A and 19B, individual retaining hooks 15U are so inserted into retaining holes 47a of the upper joint wall 47 as to be retained at peripheries of the retaining holes 47a on upper surface of the upper joint wall 47. On the other hand, individual retaining projections 15D are inserted into retaining holes 48a of the lower joint wall 48, and retaining legs 46 are so inserted into apertures 18b as to be retained at the apertures 18b peripheries. Then as shown in FIGS. 19C, bars 16a of the locking member 16 are inserted between outer surface of the lower joint wall 48 and inner circumference of the individual projections 15D, individual bolts 33d of the inflator 31 are inserted through the locking member 16, and nuts 34 are fastened with the bolts 33d. Thus the airbag cover 44A made integral with the box body 61A is assembled with the case 12, and the knee-protecting airbag device 11 is formed.

Subsequently, to assemble container box 60, holes 74a in individual hinge arms 74 of the lid 73 is located at pivot sections 28 of the case 12 through holes 69a of the box body 61A, and pins 29 are inserted into the holes 74a and the pivot sections 28 such that the pivot sections 28 support the hinge arms 74. Thus the lid 73 is assembled with the box body 61A so as to open and close the opening 61a of the box body 61A, and the container box 60 and the module 10A are formed. At this time, not-shown damper mechanism is mounted on the module 10A, too. Thereafter, the module 10A will be mounted on the vehicle as the module 10 in the first occupant protection device S1.

Since the box body 61A of the container box 60 and the airbag cover 44A are made of a single molded part 100 of synthetic resin, number of parts to be mounted on the vehicle is reduced in the second occupant protection device S2.

The airbag cover 44A is attached to the case 12 for covering the opening 13a of the case 12 in openable manner upon inflation of the airbag 39. The case 12 itself is so made of rigid sheet metal as to protrude inflating airbag 39 from the opening 13a smoothly, and is tightly secured to the vehicle body 1. Consequently, the airbag cover 44A is tightly secured to the body 1 by means of the case 12, and since the box body 61A is integral with the airbag cover 44A, less fixing means is needed to fix the box body 61A to the vehicle body 1 compared with case of mounting the airbag cover 44A and the box body 61A separately. To paraphrase, if the airbag cover 44A and the box body 61A are formed in a single part, fixing structure of the box body 61A to the vehicle body 1 is simplified in comparison with case in which the airbag cover 44A and the box body 61A are provided separately, thereby reducing working processes in mounting the box body 61A on the body 1. In the second occupant protection device S2, the box body 61A is not directly joined to the vehicle body 1 but merely bolt 72 fixed to a part 7 of the dashboard 6 so that good appearance may be kept in parting line with the dashboard 6. Thus the fixing structure of the box body 61A to the body 1 is simplified as much as possible. Here, the box body 61A may be joined to the dashboard 6 only by means of the retaining legs 70b or the like and bolt-fixing may be omitted, on condition that the parting line of the box body 61A and the dashboard 6 looks good.

In the second occupant protection device S2, therefore, although the container box 60 and the knee-protecting airbag device 11 for protecting the knees K of the occupant M seated in front passenger's seat are both mounted in front of front passenger's seat, number of parts are reduced, and so are number of fixing means of the box body 61A to the vehicle body 1, thereby improving workability in mounting the container box 60 and the knee-protecting airbag device 11 on the vehicle.

Moreover in the second occupant protection device S2, since the airbag cover 44A and the box body 61A of the container box 60 disposed above the airbag cover 44A are integral, it is prevented that the case 12 and so on of the knee-protecting airbag device 11 are seen by the occupant M in opening/closing operation of the lid 73. More specifically, when the airbag cover 44A and the box body 61A are separate, a gap may arise between them. In that case, the case 12 and so on of the knee-protecting airbag device 11 are likely to be seen from the gap in such a time as opening/closing of the lid 73. In the second occupant protection device S2, however, since the rear edge part of the lower wall 64 and the lower edge part of the flange 69 of the box body 61A are continuous with the upper edge part of the airbag cover 44A, there arises no gap between the box body 61A and the airbag cover 44A, so that the case 12 and so on of the knee-protecting airbag device 11 are prevented from being seen by the occupant M.

In the second occupant protection device S2, the case 12 includes a circumferential wall portion 14 disposed along the circumference of the opening 13a for covering the folded airbag 39, and the circumferential wall portion 14 includes retainers 15 (15U and 15D) protruded outward for joinder with the airbag cover 44A. The airbag cover 44A includes: doors 52U and 52D openable when pushed by the inflating airbag 39; a thinned breakable portion 51 breakable when pushed by the inflating airbag 39 for allowing the doors 52U and 52D to open; hinge lines 53 disposed around the doors 52U and 52D to be bended upon opening of the doors 52U and 52D; and the joint walls 47 and 48 attached to the circumferential wall portion 14 of the case 12 by having the retainers 15 (15U and 15D) inserted therein and being held by the retainers 15 (15U and 15D).

Moreover, the box body 61A and the airbag cover 44A are integrally molded as the molded part 100 that is a two-color part of soft material and hard material compatible to each other. The soft section 100a includes the doors 52, the hinge lines 53, the breakable portion 51, and the joint walls 47, 48 of the airbag cover 44A, and the hard section 100b includes remaining portions.

In the molded part 100, when the doors 52 of the airbag cover 44A are pushed by the inflating airbag 39 and open while breaking the breakable portion 51 disposed therearound, the doors 52 do not break although pushed, but are elastically deformed and smoothly open since they are part of the soft section 100a. Moreover, the hinge lines 53a also belonging to the soft section 100a easily bend. Consequently, the airbag 39 is able to deploy smoothly from an opening provided by smooth opening of the doors 52. Besides, since the joint walls 47 and 48 by which the airbag cover 44A is attached to the circumferential wall portion 14 of the case 12 also belong to the soft section 100*a*, the walls 47 and 48 are elastically deformed and prevent peripheries of the retaining holes 47*a* and 48*a* holding the retainers 15U and 15D of the circumferential wall portion 14 from breaking even if subjected to strong tensile force when the doors 52 open. Of course, since remaining portions such as the general section 45 of the airbag cover 44A apart from the doors 52 and the box body 61A belong to the hard section 100*b* having rigidity, the two-color part 100 as a whole is able to keep a predetermined shape easily.

Furthermore, in the second occupant protection device S2, too, the knee-protecting airbag device 11 and the container box 60 are assembled together to form the mounting module 10A in advance, and the module 10A is attached to the vehicle to mount the knee-protecting airbag device 11 and the container box 60 at one time. Therefore, less working processes are needed compared with a case of mounting the knee-protecting airbag device 11 and the container box 60 separately, thereby reducing tact time per vehicle.

Without considering above working-effects, the individual parts of the airbag device 11 and the container box 60 may be sequentially mounted on the vehicle.

In the second occupant protection device S2, too, the box body 61A is abutted on and supported at its lower surface 64*a* of the lower wall 64 by support sections 20 and 21 protruded upward from the case 12. Here, since the case 12 is made of rigid sheet metal and secured to the vehicle body 1 tightly so that the inflating airbag 39 may smoothly protrude from the opening 13*a*, the lower wall lower surface 64*a* of the box body 61A is securely supported by the support sections 20 and 21. Accordingly, even if heavy objects are housed in the boxy body 61A, the box body 61A is prevented from deforming, and thus is able to keep good appearance. Especially, since the support sections 20 and 21 support the lower surface 64*a* of the lower wall 64 in the box body 61A widely in transverse direction at front edge 64*c* side and rear edge 64*d* side in the foregoing embodiment, too, the box body 61A is stably supported.

The box body 61A does not include fixing pieces 67 and 71 as in the box body 61 in the first occupant protection device S1 since it is joined to the case 12 by means of the joint walls 47 and 48 of the airbag cover 44A. However, the box body 61A may also be provided with fixing pieces 67 and 71 which will be fixed to fixers 24 and 23 of the case 12, as indicated by double-dotted lines in FIGS. 14 and 20, if there is no problem in attachment of the airbag cover 44A integral with the box body 61A to the case 12.

Figure 21:
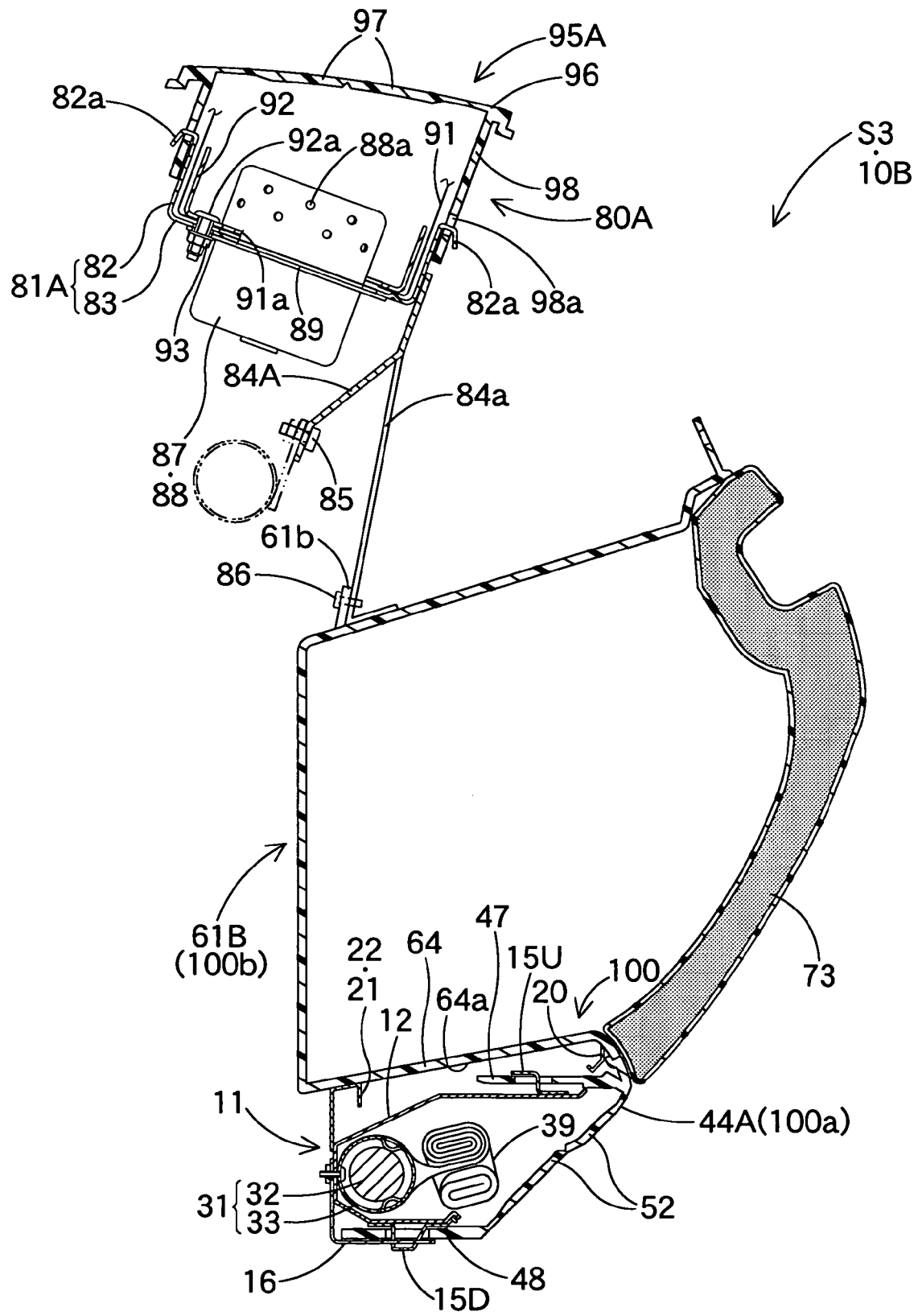
FIG. 21 is a schematic vertical section of a mounting module in a third embodiment of the occupant protection device.
Figure 22:
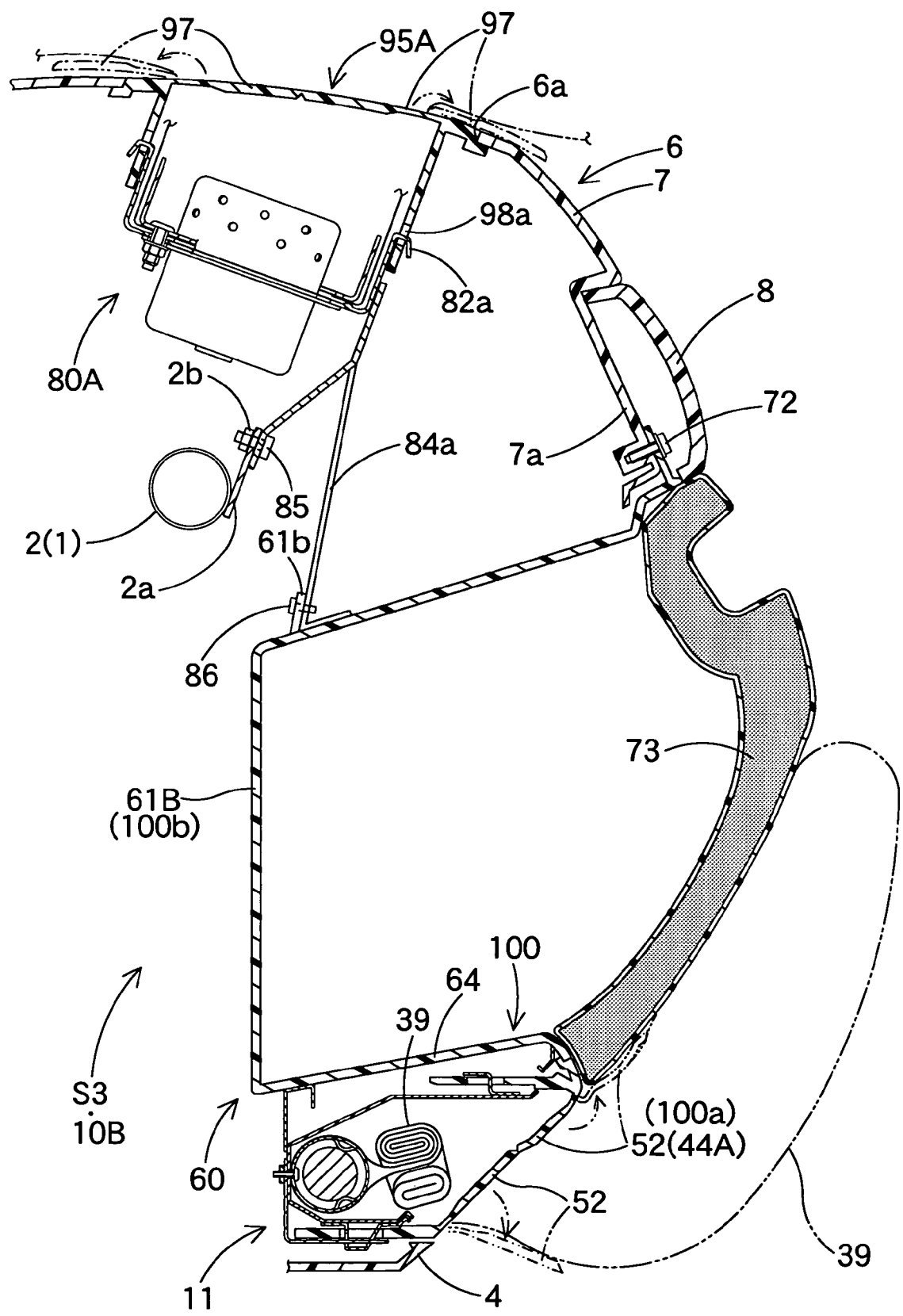
FIG. 22 is a schematic vertical section of the third occupant protection device mounted on the vehicle.

FIGS. 21 and 22 illustrate a third embodiment S3 of the occupant protection device according to the present invention. In the third embodiment, an airbag device 80A for front passenger's seat having an airbag 91 for protecting upper body MU of the occupant M is also assembled together with container box and knee-protecting airbag device to form a module 10B. In the airbag device 80A for front passenger's seat, bracket 84A of case 81A to be secured to dashboard reinforcement 2 includes joint pieces 84*a* to be coupled with a plurality of joint pieces 61*b* of the box body 61B by means of bolts 86. The airbag device 80A for front passenger's seat is connected with the knee-protecting airbag device 11 by means of the joint pieces 84*a*, and thus the module 10B is formed. The airbag cover 95A differs from the airbag cover 95 of the first embodiment in not having fastening legs 96*a*.

In the third occupant protection device S3, remaining parts and portions are similarly arranged to those in the second embodiment.

To assemble the module 10B of the third embodiment, folded airbag 39 and inflator 31 are housed in case 12 firstly as in the second embodiment, and then not-shown retaining legs 46 of airbag cover 44A integral with the box body 61B are inserted in and held at not-shown apertures 18*b* of the case 12, while upper and lower joint walls 47 and 48 of the airbag cover 44A are joined with retainers 15U and 15D of the case 12 by means of locking member 16. Subsequently, not-shown pins 29 are used to pivotally hold lid 73 at not-shown pivot sections 28 of the case 12. Thereafter, by bolt 86 fixing of the joint pieces 84*a* of the already assembled airbag device 80A for front passenger's seat to the joint pieces 61*b*, the module 10B is completed.

The module 10B thus assembled is mounted on the vehicle through processes of not-shown bolt 27 fixing of not-shown joint sections 26 of the case 12 of the knee-protecting airbag device 11 to not-shown bracket 3 of the vehicle body 1, and bolt 85 fixing of the bracket 84 of the airbag device 80A for front passenger's seat to bracket 2*a* of the vehicle body 1. Thereafter, as shown in FIG. 22, the dashboard 6 is mounted on the vehicle by bolt 72 fixing of the dashboard body 7 and attaching a decoration cover 8, and an undercover 4 is fitted in a predetermined position. Thus, the occupant protection device S3 is mounted on the vehicle.

In the occupant protection device S3, further less working processes are required and tact time per vehicle is reduced in comparison with a case of mounting the knee-protecting airbag device 11, the container box 60 and the airbag device 80A for front passenger's seat separately. Moreover, mounting workability of parts arranged in front of front passenger's seat PS (the knee-protecting airbag device 11, the container box 60 and the airbag device 80A) is improved, too.

If the airbag cover 95 of the airbag device 80A for front passenger's seat is configured in the same way as the airbag cover 95 of the first embodiment, following arrangement may be adopted. More specifically, the module 10B as not equipped with the airbag cover 95 is mounted on the vehicle firstly. Then the dashboard 6 is attached to the vehicle, and the airbag cover 95 is pushed into opening 6*a* of the dashboard 6 from upper side, while having the legs 96*a* retained at the opening 6*a* periphery, so as to be attached to circumferential wall portion 82 of case 81A such that hooks 82*a* retain holes 98*a*. Of course, the airbag cover 95 in the airbag device for front passenger's seat in this case may be formed integral with the dashboard 6 utilizing two-color molding or the like.

Figure 23:
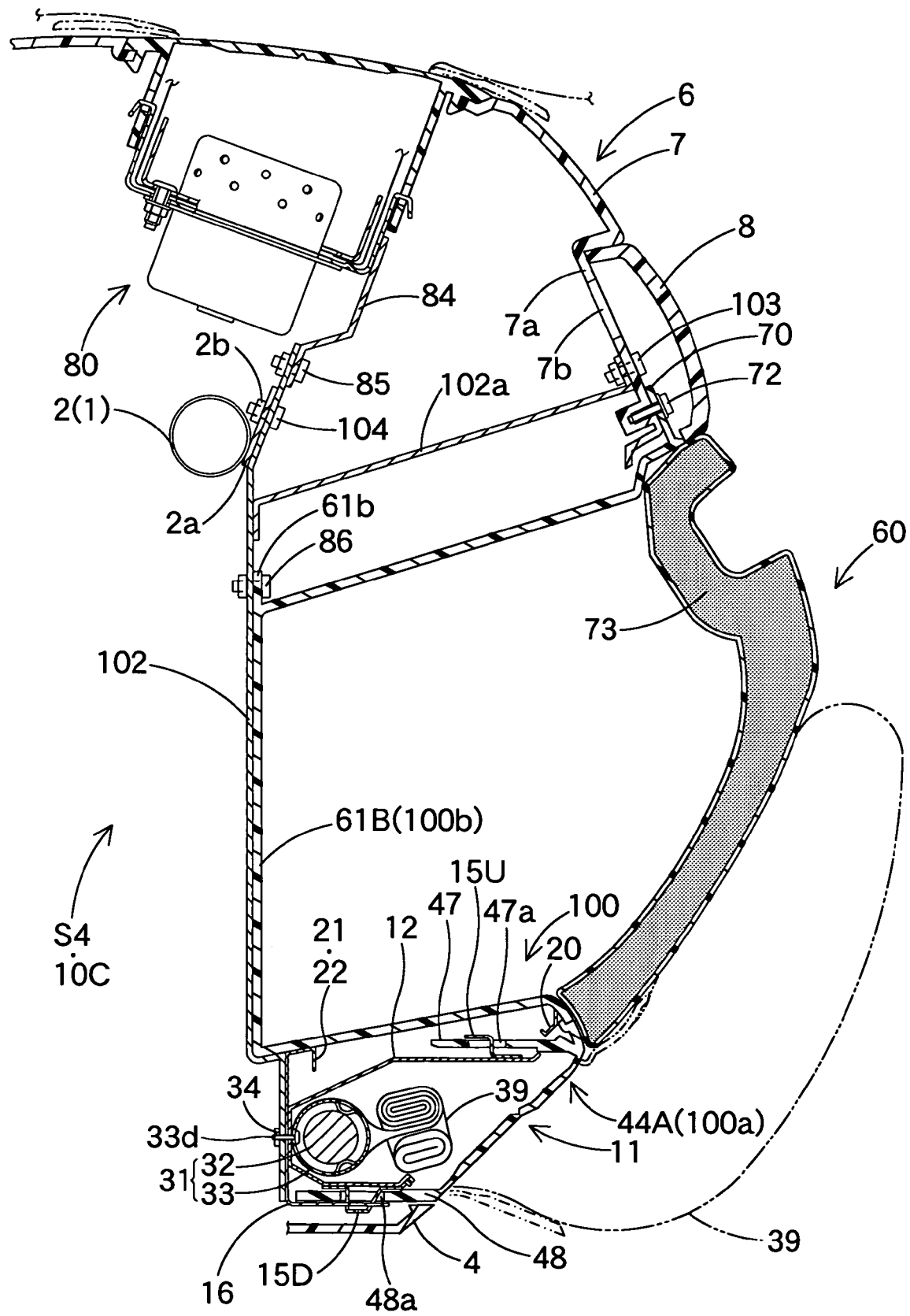
FIG. 23 is a schematic vertical section of a fourth embodiment of the occupant protection device mounted on the vehicle.

Alternatively, the module may include the dashboard 6 as a decoration member disposed in front of front passenger's seat, like a mounting module 10C of a fourth embodiment S4 of the occupant protection device shown in FIG. 23.

The module 10C of the fourth embodiment utilizes a single bracket 102 to assemble a knee-protecting airbag device 11, a container box 60, and an airbag device 80 for front passenger's seat into a single piece. The bracket 102 has bolts 33*d* of the inflator 31 in the knee-protecting airbag device 11 inserted into itself and fastened with nuts 34 to support the airbag device 11. Joint pieces 61*b* of the box body 61B are bolt 86 fixed to the bracket 102, and bracket 84 of the airbag device 80 for front passenger's seat is bolt 85 fixed to the bracket 102. Moreover, the bracket 102 includes a support piece 102*a* to which the body 7 of the dashboard 6 is bolt 103 fixed.

To assemble the module 10C, folded airbag 39 and the inflator 31 are housed in case 12 firstly as in the second and third embodiments, and then not-shown retaining legs 46 of airbag cover 44A integral with the box body 61B are inserted in and held at not-shown apertures 18b of the case 12, while upper and lower joint walls 47 and 48 of the airbag cover 44A are joined with retainers 15U and 15D of the case 12 by means of locking member 16. Subsequently, not-shown pins 29 are used to pivotally hold lid 73 at not-shown pivot sections 28 of the case 12. Thereafter, the case 12 is nut 34 fixed to the bracket 102, and the box body 61B is bolt 86 fixed to the bracket 102. By attaching the bracket 84 of the assembled airbag device for front passenger's seat to the bracket 102 by the bolt 85 and bolt 103 fixing the dashboard body 7 thereto, the module 10C is completed. To mount the module 10C thus assembled on the vehicle, not-shown joint sections 26 of the case 12 is secured to not-shown bracket 3 of the vehicle body 1 as in the first embodiment, and the bracket 102 itself is secured to bracket 2a of the vehicle body 1 by means of bolt 104. If an undercover 4 then is fitted in a predetermined position, the occupant protection device S4 is mounted on the vehicle. Here, fixing work of the bolt 104 is performed through an opening 7b which is still not covered by the cover 8 of the dashboard body 7, and the cover 8 will be located therein after the fixing work.

With this construction, working processes and tact time per vehicle are further reduced in comparison with a case of mounting the knee-protecting airbag device 11, the container box 60, the airbag device 80 for front passenger's seat, and the dashboard 6 as an interior decoration member separately. Moreover, mounting workability of parts arranged in front of front passenger's seat PS (the knee-protecting airbag device 11, the container box 60, the airbag device 80 and the dashboard 6) is further improved, too. In addition, these parts (the knee-protecting airbag device 11, the container box 60, the airbag device 80 and the dashboard 6) are assembled into a single piece of module C before being mounted on the vehicle, little extra space is needed in mounting direction for mounting individual parts separately. Consequently, more interior space is secured in front of front passenger's seat PS.

Figure 24:
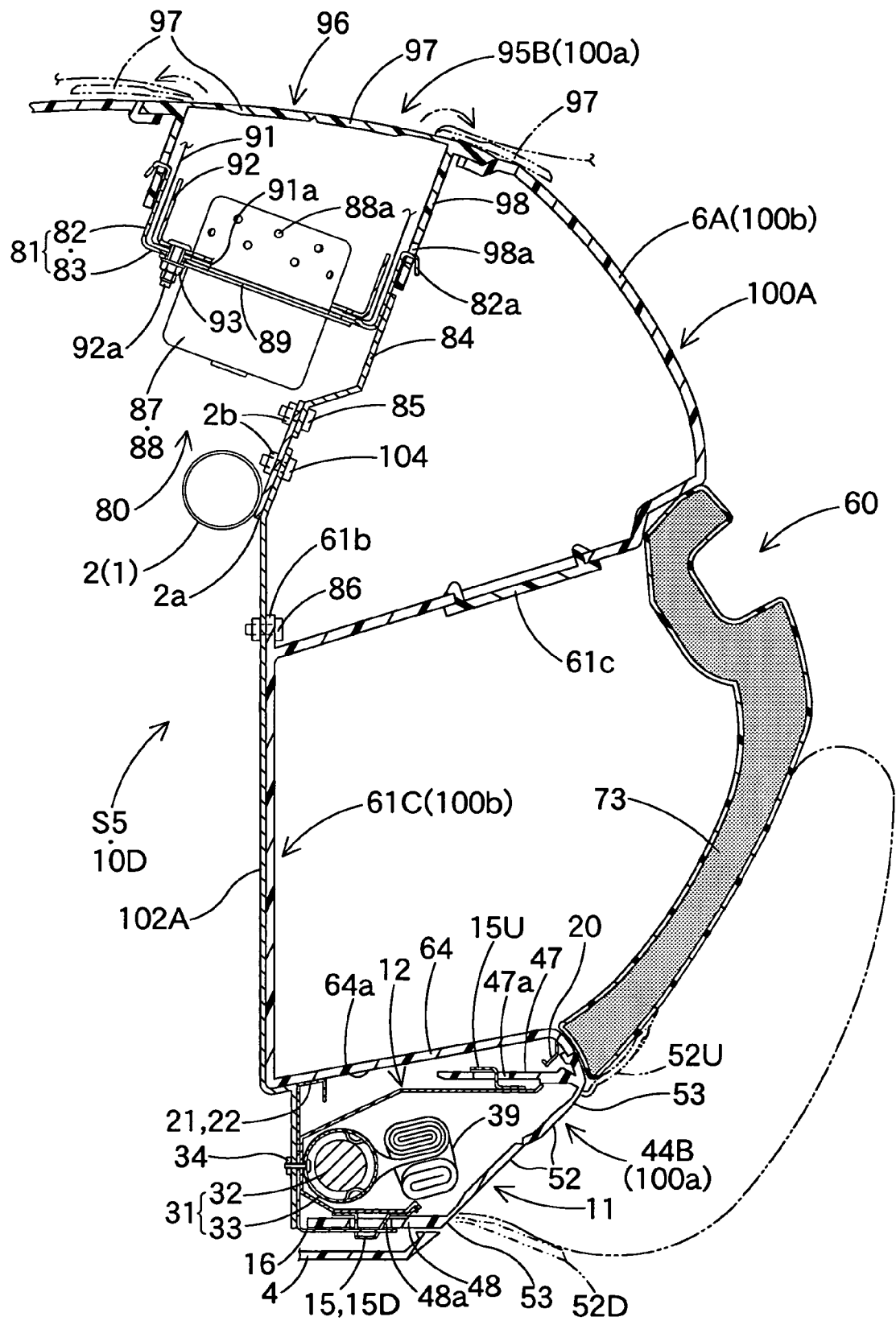
FIG. 24 is a schematic vertical section of a fifth embodiment of the occupant protection device mounted on the vehicle.

When a module includes dashboard, a dashboard as an interior decoration member, a box body, an airbag cover of knee-protecting airbag device and an airbag cover of airbag device for front passenger's seat may be integrally molded into a two-color part 100A made of synthetic resin, as in a mounting module 10D shown in FIG. 24 that constitutes a fifth embodiment S5 of the occupant protection device. The two-color part 100A includes a soft section 100a and a hard section 100b each of which is compatible to each other. The soft section 100a is made from soft synthetic resin such as thermoplastic elastomer of olefin, and includes airbag covers 44B and 95B. The hard section 100b is made from hard synthetic resin such as polypropylene and includes remaining portions, or a dashboard 6A and a box body 61C. In this embodiment, too, since not-shown general section 45 of the airbag cover 44B apart from doors 52 in transverse direction should have rigidity, it is made from the same material as the box body 61C. Without considering this point, the general section 45 may be of soft section 100a.

To assemble the module 10D, folded airbag 39 and inflator 31 are housed in case 12 firstly, and not-shown retaining legs 46 of the airbag cover 44B are inserted in and held at not-shown apertures 18b of the case 12, while upper and lower joint walls 47 and 48 of the airbag cover 44B are joined with retainers 15U and 15D of the case 12 by means of locking member 16. Subsequently, not-shown pins 29 are used to pivotally hold lid 73 at not-shown pivot sections 28 of the case 12. Thereafter, the case 12 is nut 34 fixed to bracket 102A, and the box body 61C is bolt 86 fixed to the bracket 102A. By attaching a case 81 housing a folded airbag 91 and an inflator 87 to the airbag cover 95B integral with the dashboard 6 by means of hooks 82a and retaining holes 98a, the module 10D is completed.

To mount the module 10D thus assembled on the vehicle, not-shown joint sections 26 of the case 12 is secured to not-shown bracket 3 of the vehicle body 1 as in the first embodiment. Then the bracket 102A itself is secured to bracket 2a of the vehicle body 1 by means of bolt 104, and bracket 84 of the airbag device 80 for front passenger's seat is bolt 85 fixed to the bracket 2a. If an undercover 4 then is fitted in a predetermined position, the occupant protection device S5 is mounted on the vehicle. Here, fixing work of the bolts 85 and 104 is performed with the lid 73 open, through an opening provided by removing a cap 61C formed in the box body 61C. The cap 61C is relocated therein after the fixing work.

Although the fifth embodiment employs the bracket 102A, the bracket 102A may be omitted since the bracket 84 of the airbag device 80 for front passenger's seat and the case 12 of the knee-protecting airbag device 11 are secured to the vehicle body 1 in mounting the module 10D on the vehicle, and mounting strength to the body 1 is retained.

To form a module including a knee-protecting airbag device 11 and a container box 60, it will also be appreciated that an airbag cover and a lid of the container box are composed of a single molded part 56, like a knee-protecting airbag device 11 in a sixth embodiment S6 of the occupant protection device shown in FIGS. 25 to 28.

Figure 25:
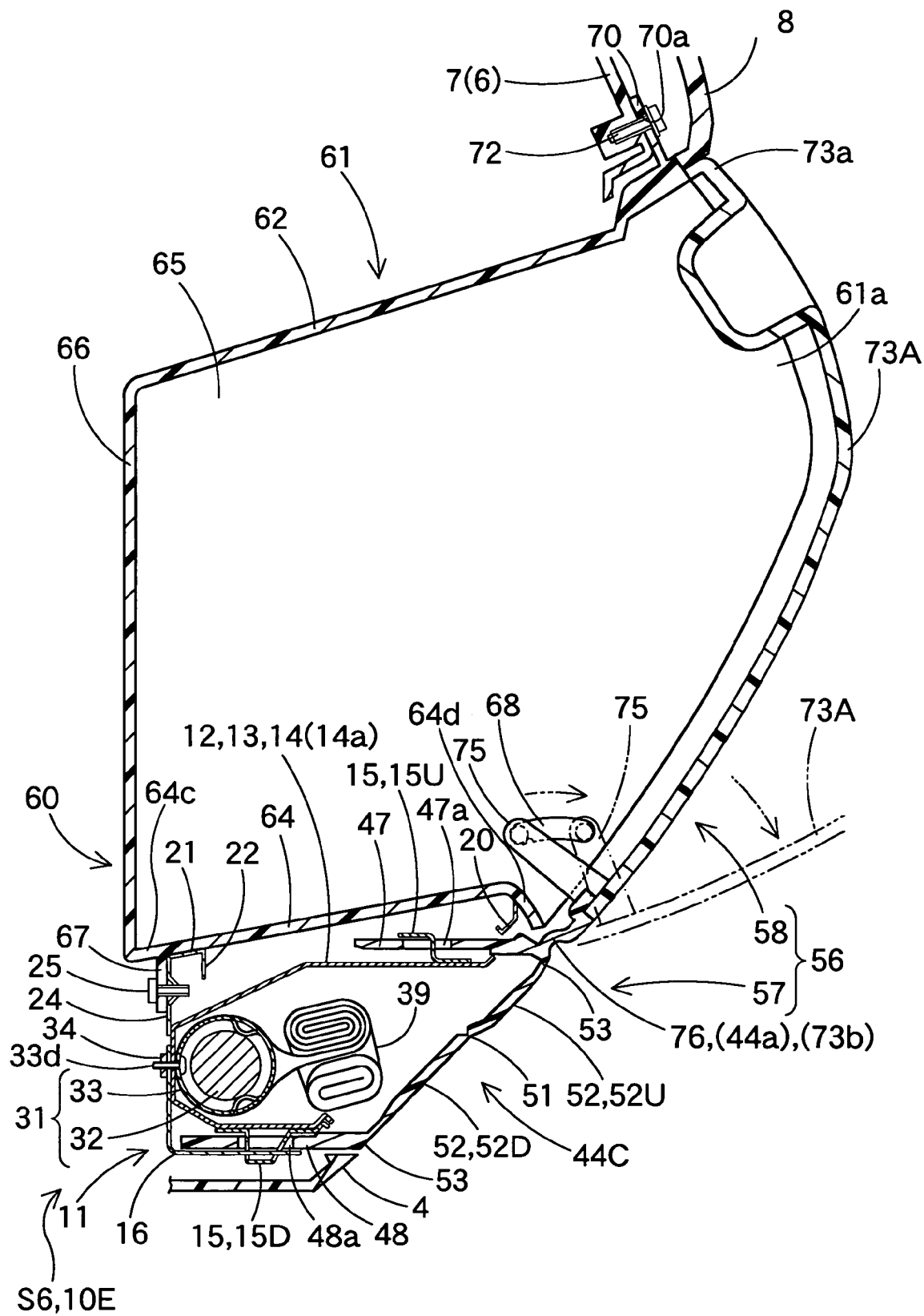
FIG. 25 is a schematic vertical section of a sixth embodiment of the occupant protection device mounted on the vehicle.
Figure 26:
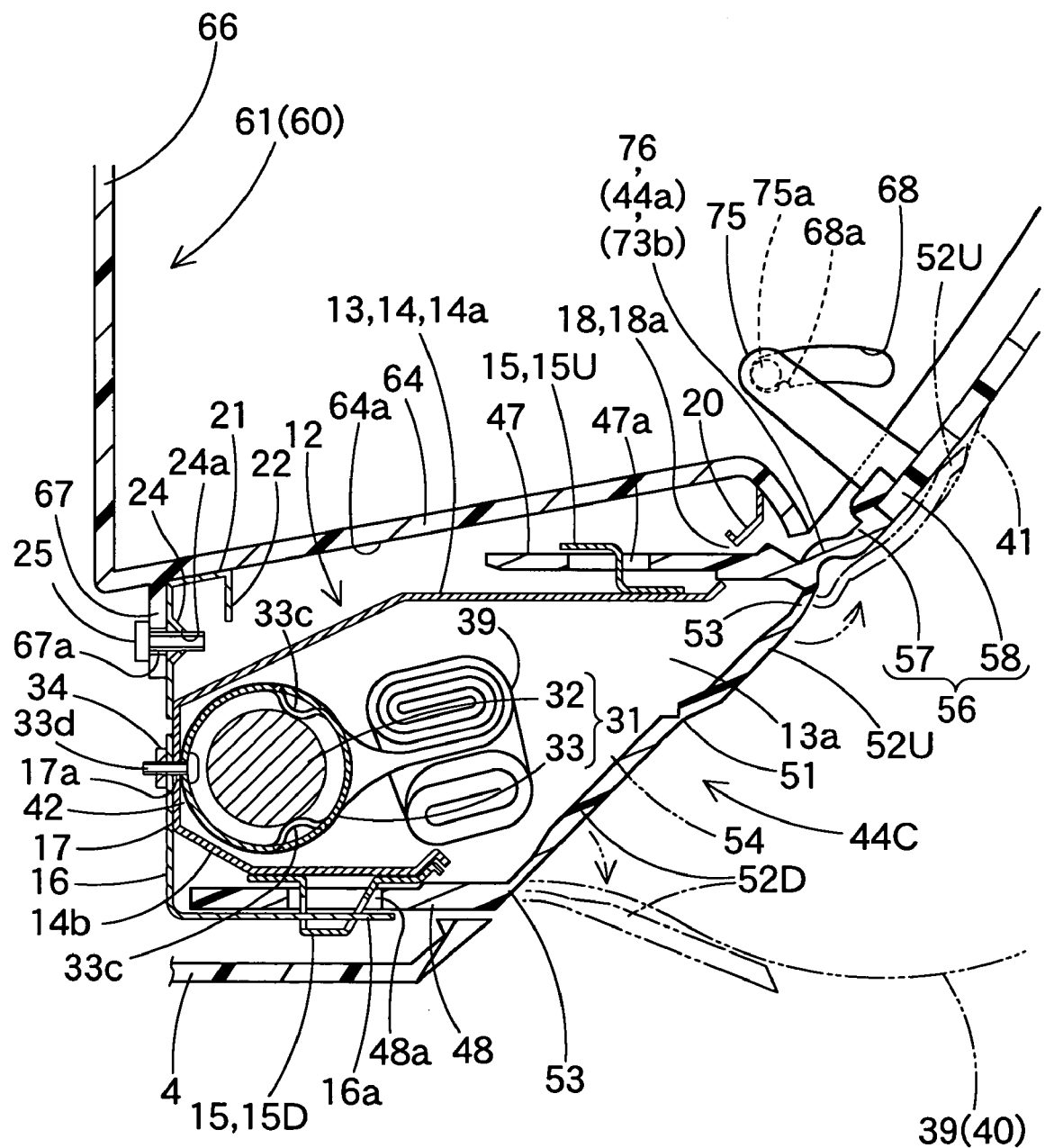
FIG. 26 is a schematic enlarged vertical section of a knee-protecting airbag device in the occupant protection device in FIG. 25.
Figure 27:
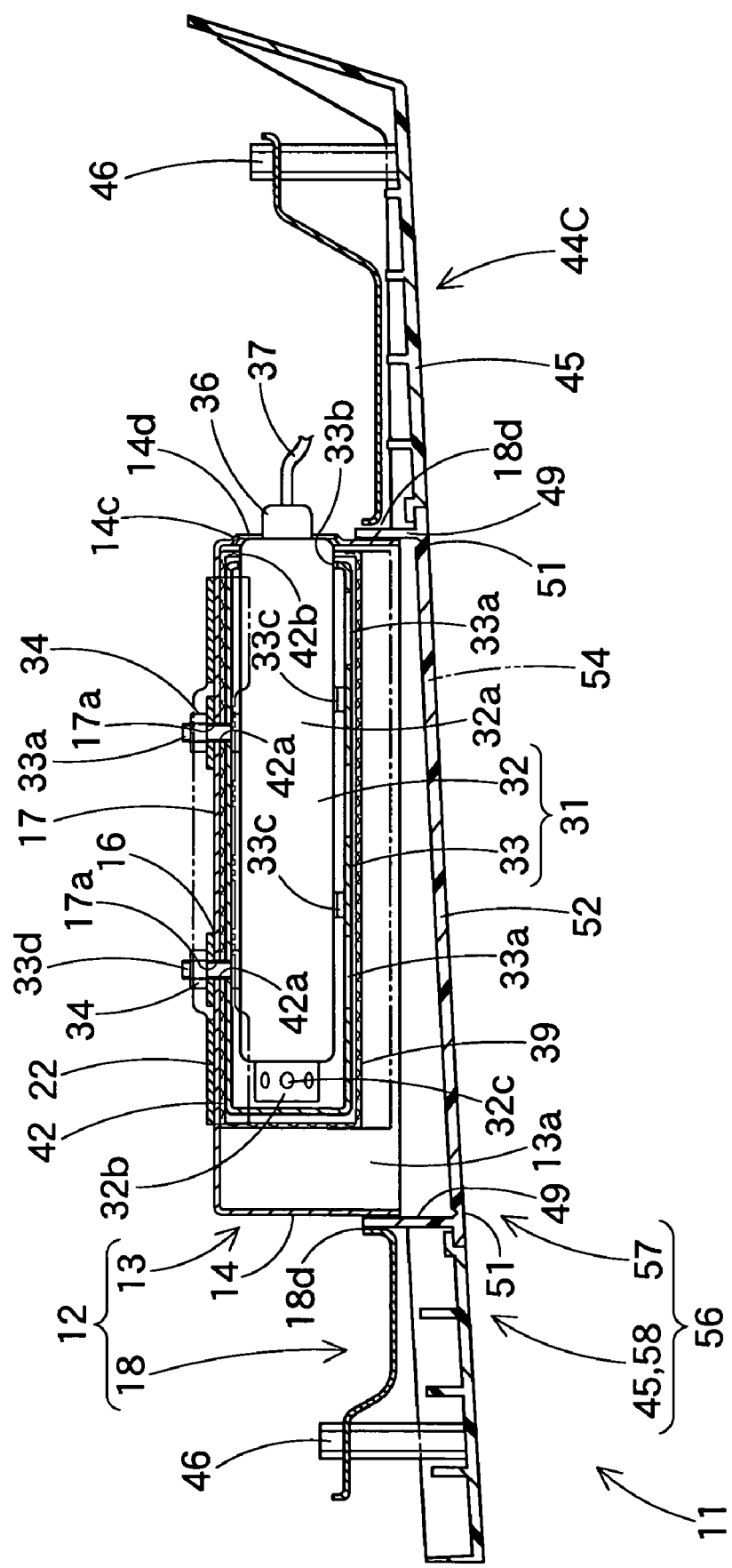
FIG. 27 is a schematic enlarged transverse section of the knee-protecting airbag device in FIG. 26.
Figure 28:
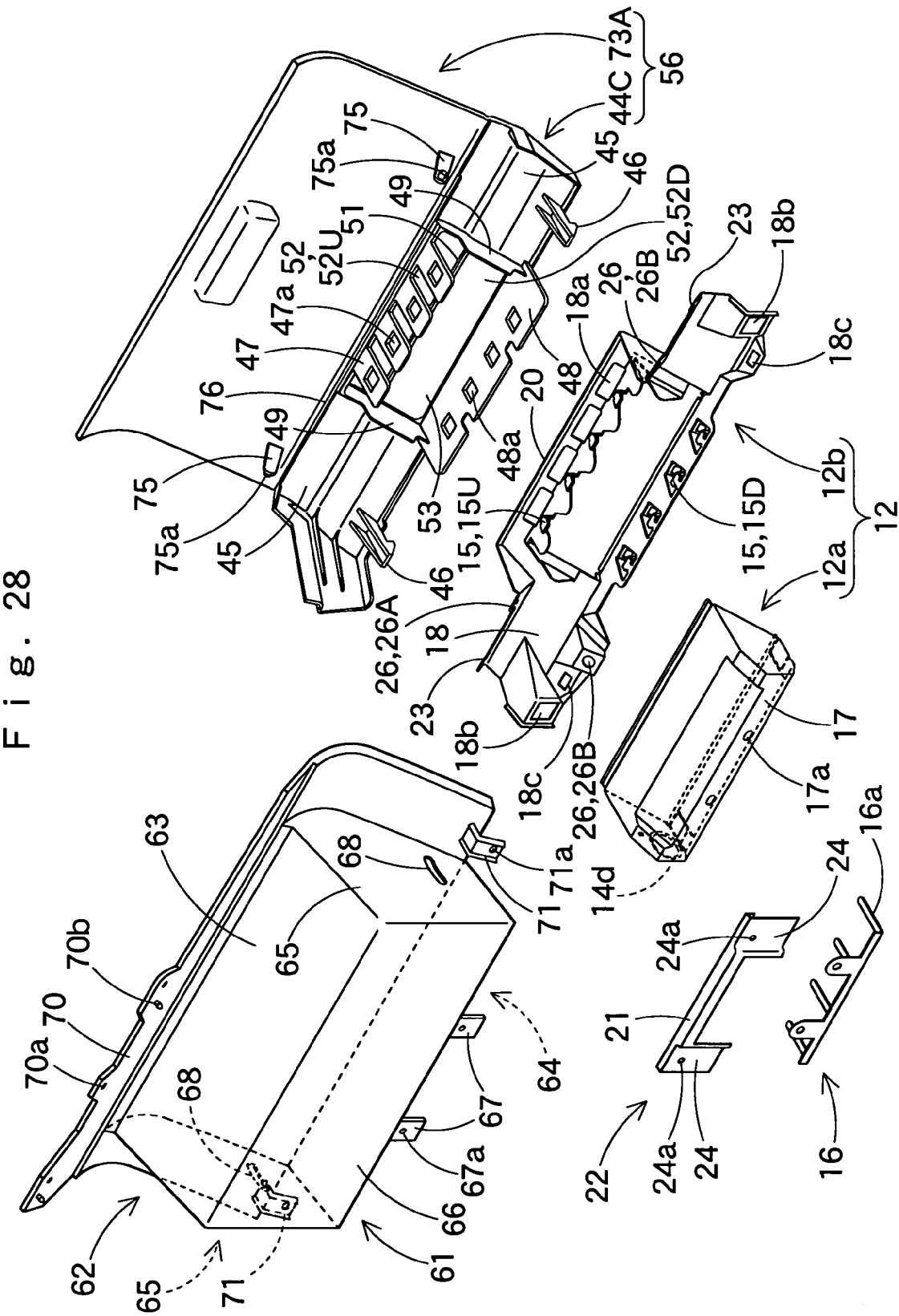
FIG. 28 is an exploded perspective view of a container box and a case of the knee-protecting airbag device in a mounting module of the sixth occupant protection device.

Referring to FIG. 25, airbag cover 44C is adapted to cover vehicle's rearward of a folded airbag 39 and a case 12, and joined with the case 12. The airbag cover 44C is a two-color part 56 integral with a lid 73A of a container box 60. Vicinities of two doors 52 (52U and 52D) covering an opening 13a of the case 12 at the vehicle's rear side and hinge line 76 of the lid 73A constitute a soft section 57, and remaining portions, or a general section 45 located left and rightward of the soft section 57 and a part of the lid 73A except the hinge line 76 constitute a hard section 58.

In the sixth embodiment, the soft section 57 of the two-color part 56 is made from thermoplastic elastomer of olefin, and the hard section 58 is made from hard polypropylene that is compatible to the soft section 57 and has shape-retaining property.

As in the first embodiment, the container box 60 includes a box body 61 opened rearward of the vehicle and the lid 73A for covering the opening 61a of the box body 61 in openable manner. The box body 61 is made from hard synthetic resin such as polypropylene, and is provided on left and right side walls 65 with guide holes 68 for guiding the lid 73A in opening and closing operation. Each of the guide holes 68 is punched through in arcuate shape. A pin 75a of later-described guide arm 75 of the lid 73A is slidably inserted into each of the guide holes 68. Moreover, each of the guide holes 68 is provided in inner circumference with a projection 68a for releasably stopping the pin 75a when the lid 73A closes the opening 61a.

The lid 73A is integrally molded with the airbag cover 44C so that its lower edge 73b is continuous from upper edge 44a of the airbag cover 44C, and has an integral hinge line 76 near border with the airbag cover 44C. When the lid 73A is opened, it is operated so that its upper edge 73a turns rearward around the hinge line 76. The lid 73A is provided at left and right edges toward the lower edge 73b in the vehicle's front surface with guide arms 75 protruding forward. Each of the guide arms 75 includes the pin 75a that is protruded outwardly in transverse direction and inserted into the guide hole 68 formed in the side wall 65 of the box body 61 for guiding the opening and closing of the lid 73A. Opening position and closing position of the lid 73A are determined by the guide holes 68. Here, although the hinge line 76 of the lid 73A is the soft section 57, remaining sections of the lid 73A including the guide arms 75 are constituted by the hard section 58.

The sixth occupant protection device S6 differs from the first device S1 in that the airbag cover 44C and the lid 73A are integrally formed as the two-color part 56, and in that the guide arms 75 of the lid 73A are connected to the box body 61. However, the sixth embodiment has similar construction to the first embodiment except those points, and therefore, the same portions and parts as the first embodiment will be designated common reference numerals, and the description will be omitted.

How to mount the occupant protection device S6 on the vehicle is now described. Firstly, the airbag device 11 and the container box 60 are assembled together to form a mounting module 10E. This is started by housing the airbag 39 and an inflator 31 in the case 12 of the knee-protecting airbag device 11, as in the first embodiment. More specifically, the inflator 31 preliminarily formed by attaching a diffuser 33 to an inflator body 32 is housed in the airbag 39, and the airbag 39 is folded, then wrapped by not-shown wrapping film. Then the inflator 31 is housed in the case 12 together with the folded airbag 39, so that individual bolts 33d of the inflator 31 are protruded from insert holes 17a of the case 12, and the end of the inflator body 32 is protruded from insert hole 14d of the case 12. By further fastening not-shown spring nuts with the individual bolts 33d from front side of case bottom wall 17, the inflator 31 and the airbag 39 are housed in and attached to the case 12.

Thereafter, lower surface 64a of lower wall 64 of the box body 61 is made to abut against individual support sections 20 and 21 of the case 12. Fixing holes 23a, 24a of individual fixers 23 and 24 are matched with corresponding fixing holes 67a and 71a of individual fixing pieces 67 and 71. By screwing bolts 25 into the fixing holes 23a and 24a through the fixing holes 71a and 67a, the box body 61 is secured to the case 12.

Figure 29A:
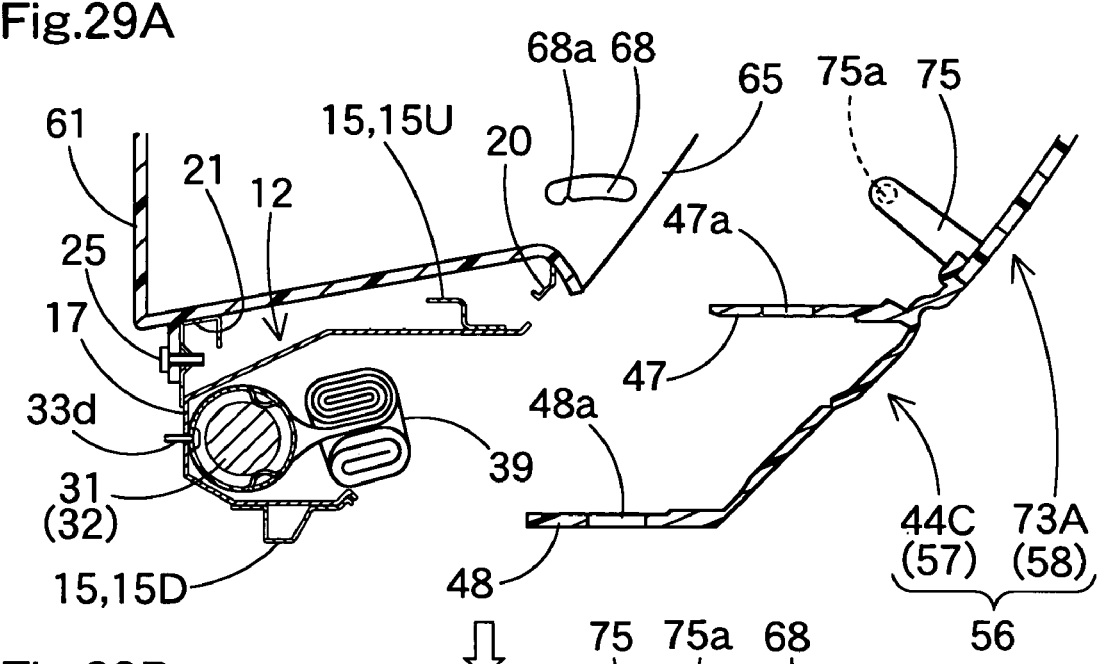
FIG. 29 illustrates assembling processes of an airbag cover to a case in the sixth occupant protection device.
Figure 29B:
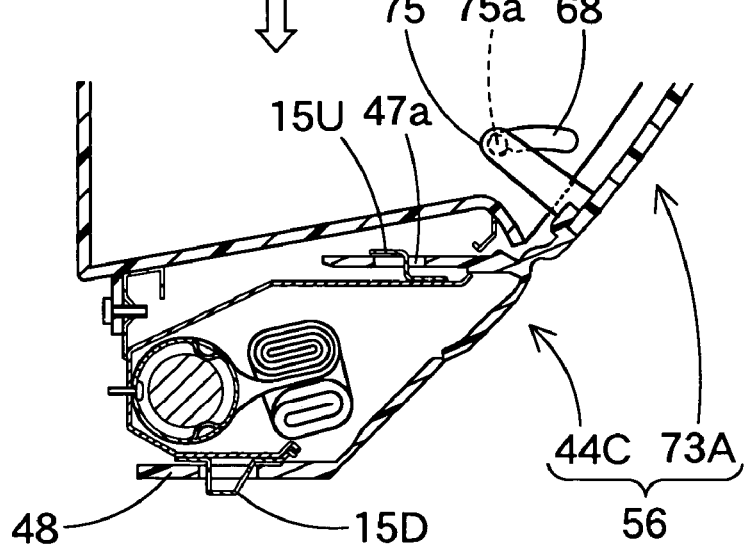
Figure 29C:
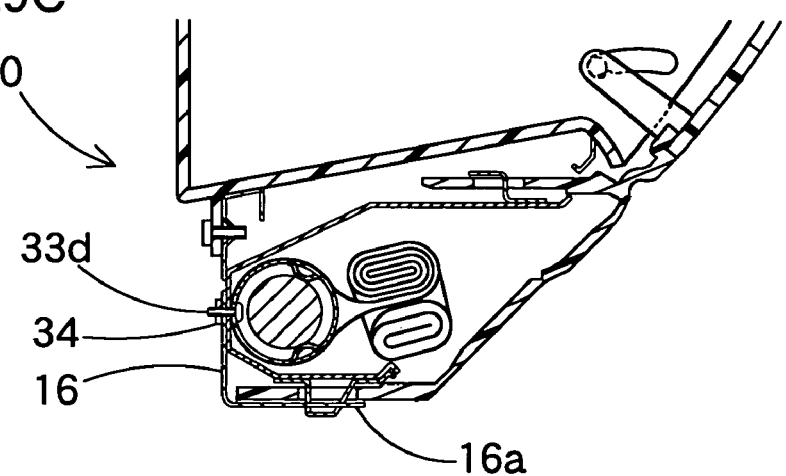

Subsequently, the airbag cover 44C integral with the lid 73A, or the two-color part 56 is assembled with the case 12. More specifically, individual walls 47, 48, and 49 of the airbag cover 44C are located around case circumferential wall portion 14 toward the opening 13a. As shown in FIGS. 29A and 29B, then, individual retaining hooks 15U are so inserted into retaining holes 47a of the upper joint wall 47 as to be retained at peripheries of the retaining holes 47a on upper surface of the upper joint wall 47. On the other hand, individual retaining projections 15D are inserted into retaining holes 48a of the lower joint wall 48. The individual guide arms 75 are so bended as to insert the pins 75a into the guide holes 68 of the box body 61, and retaining legs 46 are so inserted into apertures 18b as to be retained at the apertures 18b peripheries. Then as shown in FIG. 29C, bars 16a of locking member 16 are inserted between outer surface of the lower joint wall 48 and inner circumference of the individual projections 15D, individual bolts 33d of the inflator 31 are inserted through the locking member 16, and nuts 34 are fastened with the bolts 33d. Thus the airbag cover 44C integral with the lid 73A is assembled with the case 12, the knee-protecting airbag device 11 and the container box 60 are formed at one time, and the module 10E is completed.

The module 10E is then mounted on the vehicle as the module 10 in the first embodiment. Action of the knee-protecting airbag device 11 is the same as the first embodiment, too.

Since the airbag cover 44C of the knee-protecting airbag device 11 and the lid 73A of the container box 60 are formed of a single molded part 56 in the sixth occupant protection device S6, there appears no parting line in the border of the two sections, so that appearance in the front of front passenger's seat is improved. Especially, since the lid 73A opened and closed is continuous from the airbag cover 44C located therebelow and leaves no gap, good appearance is attained.

Of course, when the knee-protecting airbag device 11 is actuated, the airbag 39 inflates with inflation gas from the inflator 31, and pushes open the doors 52U and 52D of the airbag cover 44C to protrude from the case 12 for protecting the knees K of the occupant M.

In the sixth occupant protection device S6, therefore, although the container box 60 and the knee-protecting airbag device 11 for protecting the knees K of the occupant M seated in front passenger's seat are both mounted in front of front passenger's seat, good appearance of the front of front passenger's seat is retained.

Moreover, since the airbag cover 44C and the lid 73A are formed into a single molded part, number of constituent parts is reduced, and working processes and cost in mounting the device S6 on the vehicle are reduced.

The molded part 56 that integrates the airbag cover 44C and the lid 73A is a two-color part of soft material and hard material compatible to each other. The doors 52, the hinge lines 53, the breakable portion 51, and the joint walls 47, 48 of the airbag cover 44A, and the hinge line 76 of the lid 73A are formed as the soft section 57 made of the soft material, and remaining portions are formed as the hard section 58 made of the hard material.

In the molded part 56, when the doors 52 of the airbag cover 44C are pushed by the inflating airbag 39 and open while breaking the-breakable portion 51 disposed therearound, the doors 52 do not break although pushed, but are elastically deformed and smoothly open since they are the soft section 57. Moreover, the hinge lines 53 belonging to the soft section 57 easily bend, too. Consequently, the airbag 39 is able to deploy smoothly from an opening provided by smooth opening of the doors 52. Besides, since the joint walls 47 and 48 by which the airbag cover 44C is attached to the circumferential wall portion 14 of the case 12 also belong to the soft section 57, the walls 47 and 48 are elastically deformed and prevent peripheries of the retaining holes 47a and 48a holding the retainers 15U and 15D of the circumferential wall portion 14 from breaking even if subjected to strong tensile force when the doors 52 open. Besides, the hinge line 76 easily bends in opening/closing operation of the lid 73A of the container box 60, and helps the lid 73A to open and close smoothly.

Of course, since remaining portions such as the general section 45 of the airbag cover 44C apart from the doors 52 and the lid 73A except the hinge line 76 belong to the hard section 58 having rigidity, the two-color part 56 as a whole is able to keep a predetermined shape easily. Without taking high rigidity into account, the airbag cover 44C as a whole including the general section 45 may be made of the soft section 57, and further alternatively, the molded part 56 as a whole including the lid 73A may be made from soft synthetic resin such as thermo-plastic elastomer.

Furthermore, in the sixth occupant protection device S6, too, the knee-protecting airbag device 11 and the container box 60 are assembled together to form a module 10E in advance, so that the knee-protecting airbag device 11 and the container box 60 are mounted on the vehicle at one time by attaching the module 10E to the vehicle. Therefore, less working processes are needed compared with a case of mounting the knee-protecting airbag device 11 and the container box 60 separately on the vehicle, thereby reducing tact time per vehicle.

Without considering above working-effects, individual parts of the airbag device 11 and the container box 60 may be sequentially mounted on the vehicle.

In the sixth occupant protection device S6, too, the box body 61 is abutted on and supported at its lower surface 64a of the lower wall 64 by the support sections 20 and 21 protruded upward from the case 12. Since the support sections 20 and 21 support the box body 61 widely in transverse direction at front edge 64c side and rear edge 64d side, the box body 61 is stably supported.

Figure 30A:
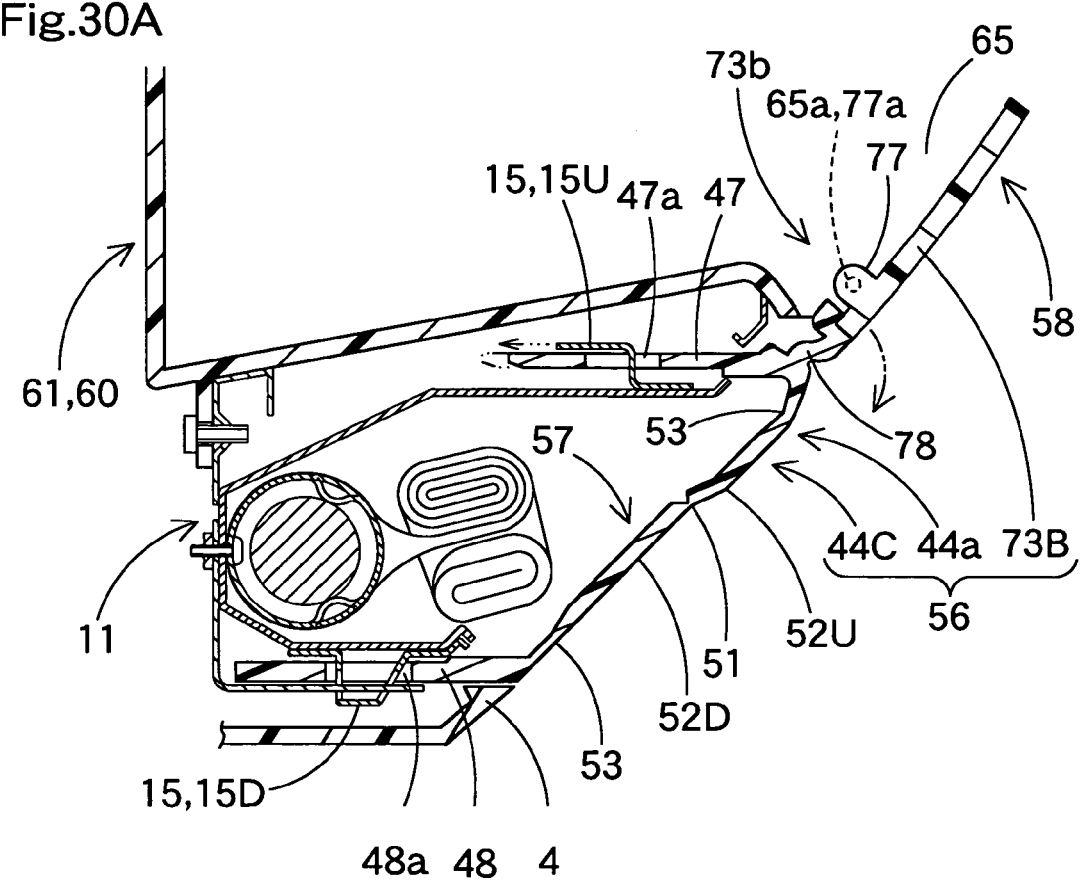
FIG. 30 are enlarged vertical sections sequentially showing opening conditions of a lid in a modification of the sixth occupant protection device.
Figure 30B:
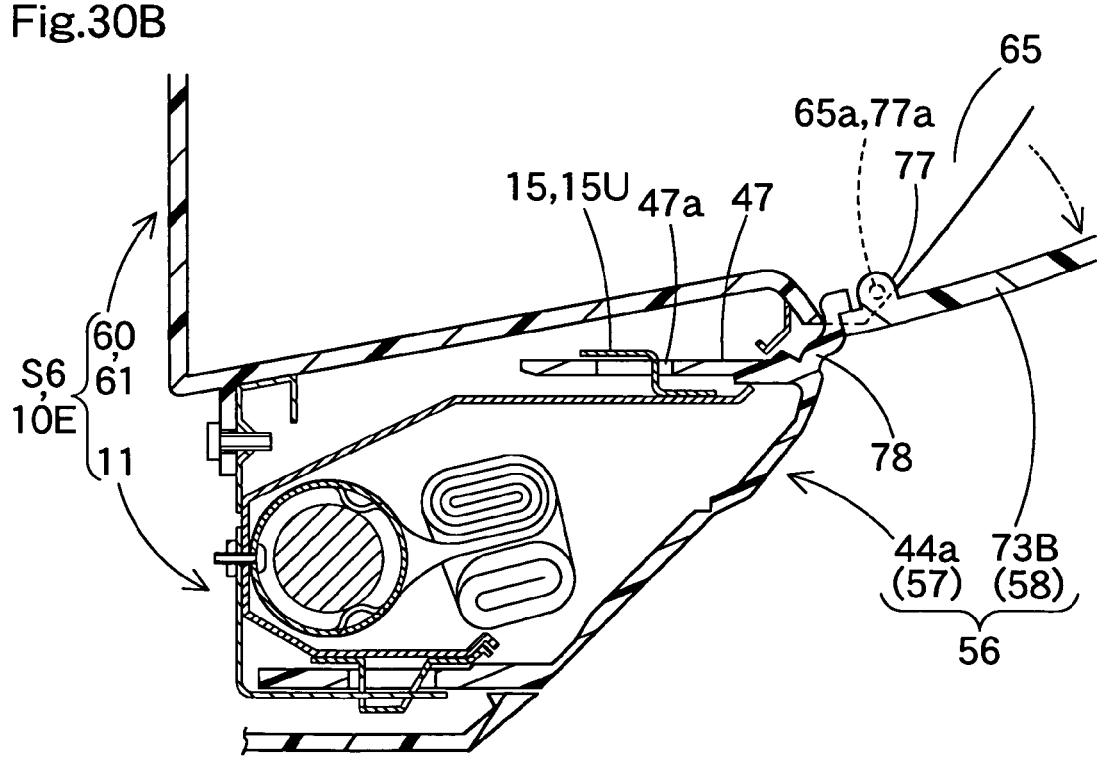
Figure 31:
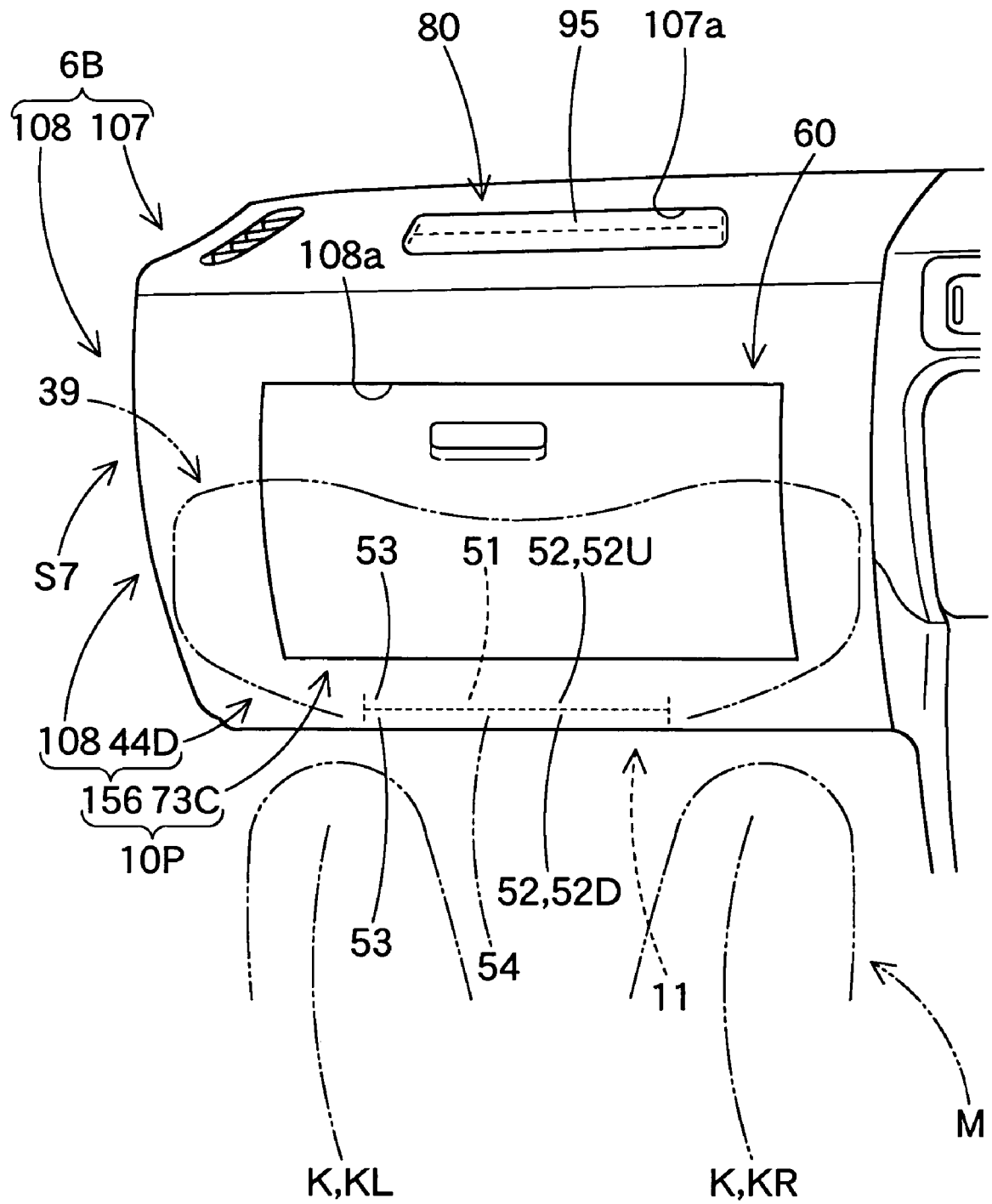
FIG. 31 is a front view of a seventh embodiment of the occupant protection device mounted on the vehicle, as viewed from rearward of the vehicle.
Figure 32:
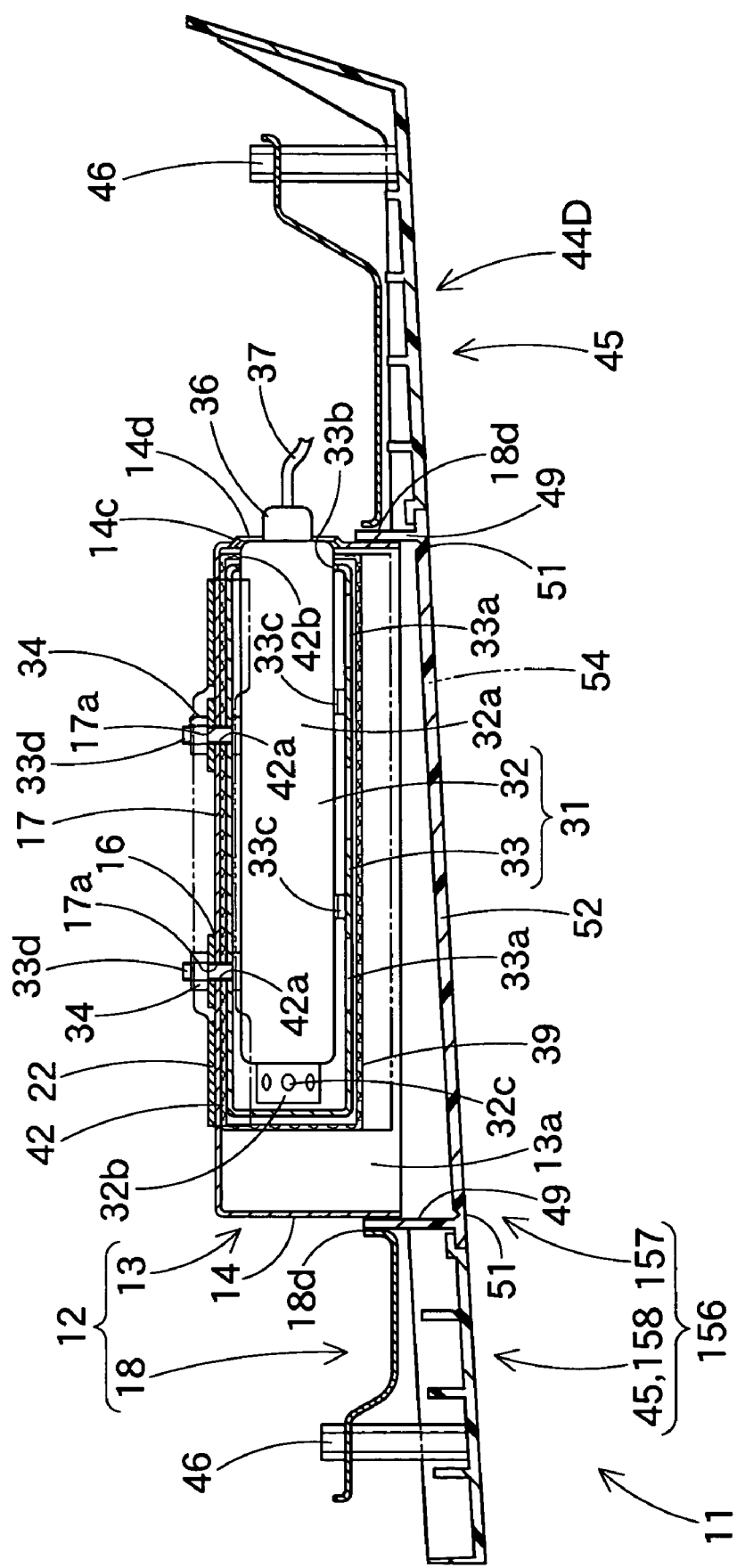
FIG. 32 is a schematic enlarged transverse section of a knee-protecting airbag device in the seventh occupant protection device.

Here in the sixth embodiment, the integral hinge line 76 is formed in vicinity of border of upper edge 44a of the airbag cover 44C and lower edge 73b of the lid 73A so that the lid 73A may turn around the hinge line 76 in opening/closing operation. However, following arrangement illustrated in FIGS. 30A and 30B will also be appreciated. Referring to FIGS. 30A and 30B, lid 73B is provided in hard section 58 in left and right edges near lower edge 73b with a hinge section 77 having a pivot section 77a. The pivot section 77a is pivotally supported at left and eight ends in holes 65a formed in left and right side walls of the box body 61. There is formed a deformable section 78 as a part of the soft section 57 near the border of the upper edge 44a of the airbag cover 44C and the lower edge 73b of the lid 73B. When the lid 73B opens and closes, the deformable section 78 elastically deforms and bends so that the lid 73B opens around the pivot section 77a. In this case, rotation of the lid 73B is stable since the pivot section 77a on which the lid 73B turns is made of the hard section 58. Here, when the lid 73B opens, the joint wall 47 as a part of the integral airbag cover 44C moves forward to help the lid 73B open.

Further alternatively, the occupant protection device of the present invention may include a knee-protecting airbag device 11, a container box 60 and a lower panel as interior decoration member as in a seventh embodiment S7 shown in FIGS. 31 to 34. The knee-protecting airbag device 11 is located in front of an occupant M seated in front passenger's seat for protecting knees K (KL and KR) of the occupant M upon collision of a vehicle. The container box 60 is located above the knee-protecting airbag device 11 for containing goods, and the lower panel 108 encircles the container box 60 at rear side.

Here in the seventh embodiment, a mounting module 10F to mount the container box 60 and the airbag device 11 on the vehicle at one time is composed of a box body 61D of the container box 60, a case 12 of the airbag device 11, an inflator 31, and an airbag 39. The module 10F does not include a lid 73C of the container box 60 and an airbag cover 44D of the airbag device 11. However, the lid 73C and the airbag cover 44D are assembled together with the lower panel 108 as a panel module 10P, and the panel module 10P is mounted on the vehicle after the module 10F is mounted on the vehicle.

The lower panel 108 constitutes an instrument panel 6B together with upper panel 107 located thereabove. The lower panel 108 includes a substantially rectangular opening 108a, and lid 73C of the container box 60 will be located in the opening 108a. The lower panel 108 is a part of a two-color molded part 156 which also includes the airbag cover 44D extended downward from the lower edge of the opening 108a. The airbag cover 44D is adapted to cover the folded airbag 39 of the knee-protecting airbag device 11, and is extended wider in transverse direction than the width of the opening 108a. In other words, the molded part 156 encloses the lid 73C of the container box 60 as a whole, by locating the airbag cover 44D part below the substantially rectangular opening 108a, and locating the lower panel 108 part above the airbag cover 44D to encircle the opening 108a.

Figure 33:
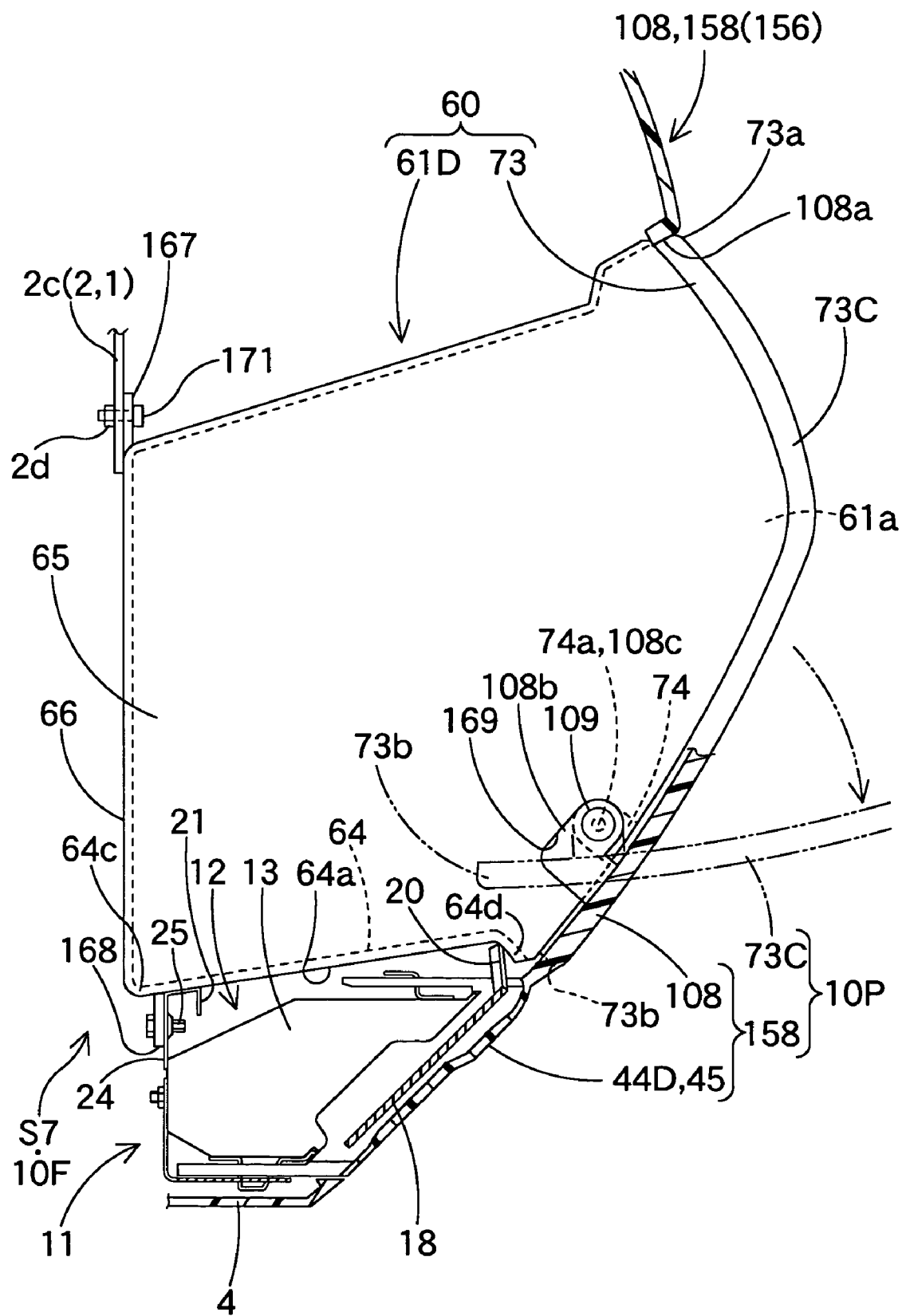
FIG. 33 is a schematic vertical section of the seventh occupant protection device.
Figure 34:
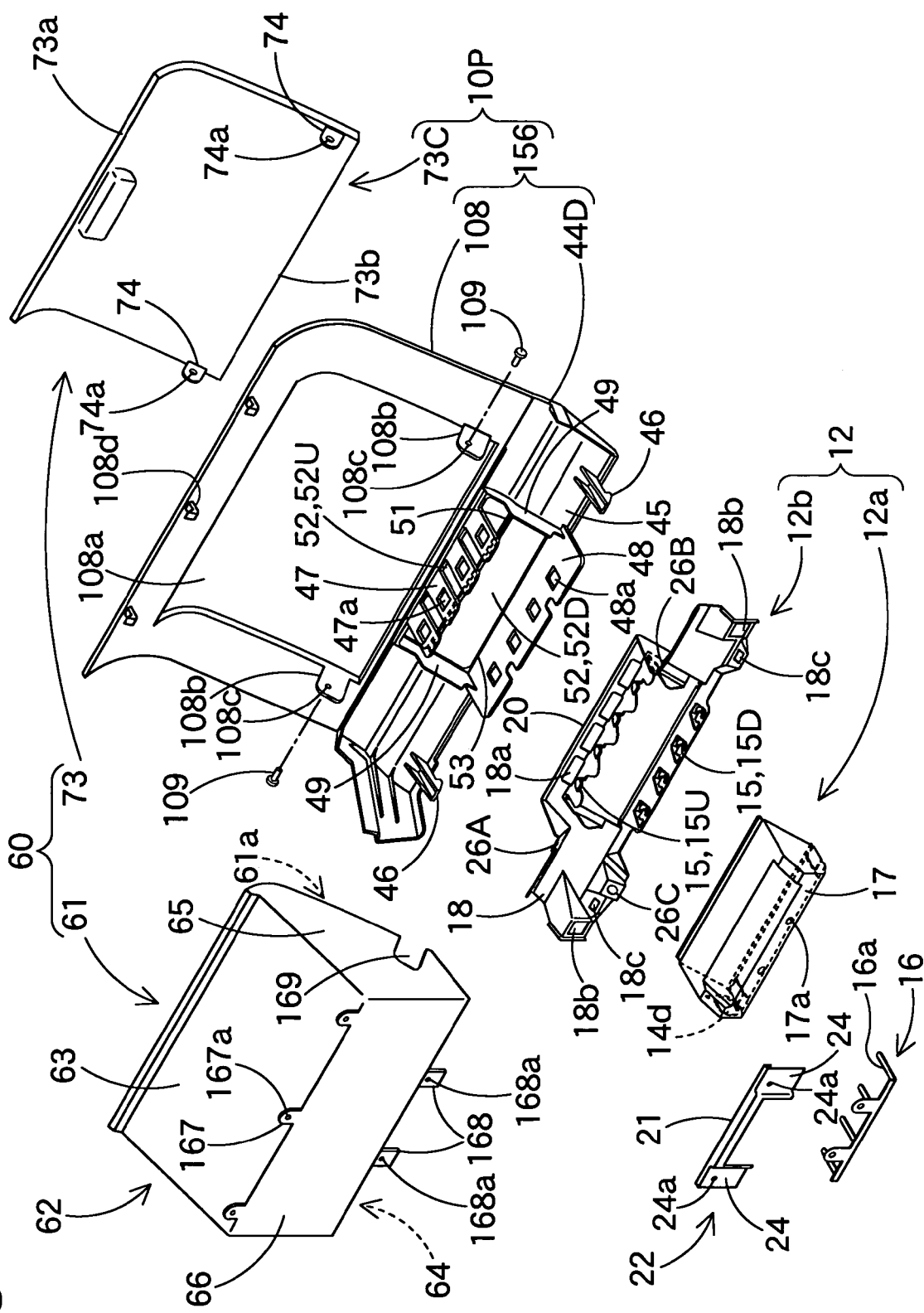
FIG. 34 is an exploded perspective view of a container box and a case of the knee-protecting airbag device in a mounting module of the seventh occupant protection device.

Referring to FIGS. 33 and 34, the lower panel 108 is provided at left and right edges in lower periphery of the opening 108a with pivot sections 108b for pivotally supporting the lid 73C when opened and closed. Each of the pivot sections 108b supports each of hinge arms 74 located in left and right sides of the lid lower edge 73b in a swingable manner by means of pins 109. Each of the pivot sections 108b is provided with a hole 108c for fitting the pin 109 in.

The lower panel 108 is further provided at front side in the upper periphery with a plurality of mounting portions 108b for joinder with the upper panel 107. The mounting portions in the seventh embodiment are retaining legs 108d to hook the upper panel 107 periphery.

In the seventh embodiment, too, there is provided an airbag device 80 for front passenger's seat as in the first embodiment in the upper panel 107 located in upper part of the dashboard 6B for protecting upper body of the occupant M such as breast upon frontal collision of the vehicle. Airbag cover 95 of the airbag device 80 is located to cover an opening 107a of the upper panel 107.

The knee-protecting airbag device 11 in the seventh occupant protection device S7 includes a folded airbag 39, an inflator 31 for feeding the airbag 39 with inflation gas, a case 12 opened rearward for containing the folded airbag 39 and the inflator 31, and an airbag cover 44D for covering the vehicle's rear side of the case 12.

The airbag cover 44D is joined to and supported by the case 12 for covering the vehicle's rear side of the folded airbag 39 and the case 12. The airbag cover 44D is integrally molded with the lower panel 108 as the two-color part 156. Vicinity of two doors 52 (52U and 52D) covering the vehicle's rear side of the opening 13a of the case 12 including joint walls 47 and 48 constitute soft section 157, and remaining portions such as general section 45 located right and leftwards of the soft section 157 and lower panel 108 constitute hard section 158.

In the seventh embodiment, the soft section 157 of the two-color part 156 is made from thermo-plastic elastomer of olefin, and the hard section 158 is made from hard polypropylene which is compatible to the soft section 157 and has shape retaining property.

The container box 60 includes a box body 61D opened rearward and a lid 73C for openably covering opening 61a of the box body 61D.

Referring to FIGS. 33 and 34, the box body 61D includes a bottom wall 66 positioned at the vehicle's front side and apart from the opening 61a, and a circumferential wall portion 62 extending rearward of the vehicle from the bottom wall 66 periphery in substantially square cylindrical shape. The circumferential wall portion 62 includes an upper wall 63 positioned in upper side, a lower wall 64 positioned in lower side, and left and right side walls 65 joining the upper and lower walls 63 and 64. From vicinities of left and right front edge of the lower wall 64 are protruded downward fixing pieces 168 to be fixed to fixing sections 24 of the case 12. Each of the fixing pieces 168 is provided with a fixing hole 168a for inserting through bolt 25. From front periphery of the upper wall 63 are protruded upward a plurality (three, in the seventh embodiment) of fixing pieces 167 each with a fixing holes 167a. The fixing pieces 167 is bolt 171 fixed to a bracket 2c of dashboard reinforcement 2. Nuts 2d are preliminarily fixed to the bracket 2c for engaging with the bolts 171.

As in the first embodiment, the lower wall 64 is further provided with a not-shown detachable cap 64b for putting in not-shown bolts 27 and fixtures used in bolt 27 fixing of joint sections 26A and 26B of the case 12 to not-shown bracket 3 of the vehicle body 1. Each of the left and right side walls 65 is provided with a recess 169 for housing the pivot section 108b of the lower panel 108.

The lid 73C is provided at its left and right lower edge in the vehicle's front side face with hinge arms 74 projected forward of the vehicle. The hinge arms 74 are joined with and supported by pivot sections 108b of the lower panel 108 in a swingable manner, such that the upper edge 73a of the lid 73C rotates in front-rear direction. The hinge arms 74 include a not-shown damper mechanism such that opening/closing action of the lid 73C may not be performed too rapidly. The lid 73C is position-restricted by abutting against rear end face of the circumferential wall portion 62 in the box body 61 when closed, and when opened, it is position-restricted by the not-shown damper mechanism.

In mounting the lid 73c on the vehicle, the lid 73C is mounted on the vehicle after being assembled with the molded part 156 integrating the lower panel 108 and the airbag cover 44D into the panel module 10P. To assemble the lid 73C with the molded part 156, the holes 74a in the individual hinge arms 74 are matched with corresponding holes 108c of the pivot sections 108b, and pins 109 are fitted in the holes 108a and 74a to join the lid 73C with the lower panel 108 in swingable manner. By attaching the not-shown damper mechanism thereto, the assemblage is complete.

Here, the seventh occupant protection device S7 differs from the first device S1 in that the lower panel 108 of the dashboard 6B and the airbag cover 44D are integrated as the two-color molded part 156, in that the lid 73C is joined to the lower panel 108 at its hinge arms 74, and in that the module 10F except the airbag cover 44D and the lid 73C is firstly mounted on the vehicle, and then the panel module 10P is mounted on the vehicle. However, remaining constituent parts have similar constructions to those of the first embodiment, and therefore, similar portions and parts to the first embodiment will be designated common reference numerals and their descriptions will be omitted.

To mount the occupant protection device S7 on the vehicle, the module 10F is firstly formed of the airbag device 11 and the container box 60. As in the first embodiment, more specifically, the folded airbag 39 with the inflator 31 inside is wrapped by not-shown wrapping film, and then housed in the case 12 of the knee-protecting airbag device 11.

Subsequently, individual fixing pieces 168 are applied to corresponding fixing sections 24, and tapping bolts 25 are fastened into fixing holes 24a via fixing holes 168a. Thus the box body 61D of the container box 60 is attached to the case 12 to form the module 10F. At this time, individual support sections 20 and 21 of the case 12 are abutted against and support the lower surface 64a of the lower wall 64 in the box body 61D.

Thereafter, individual joint sections 26 of the case 12 are secured to the vehicle body 1 by inserting not-shown bolts 27 into individual joint holes 26a and fastening the same with not-shown nuts 3a, while the individual fixing pieces 167 of the box body 61D are secured to the vehicle body 1 by fastening bolts 171 into the individual nuts 2d via fixing holes 167a. Thus the module 10F is mounted on the vehicle. End of lead wire 37 is connected to predetermined airbag actuating circuit. By the time of mounting the case 12 and so on on the vehicle, the upper panel 107 of the dashboard 6B and the airbag device 80 for front passenger's seat have been mounted on the vehicle in advance. The fixing of the bolts 27 in the joint sections 26A and 26B is done with not-shown cap 64b open. After fixing the bolts 27, the cap 64b is reclosed. In the joint section 26C, the bolt 27 is easily fixed since under cover 4 has not yet been mounted at this point.

Figure 35A:
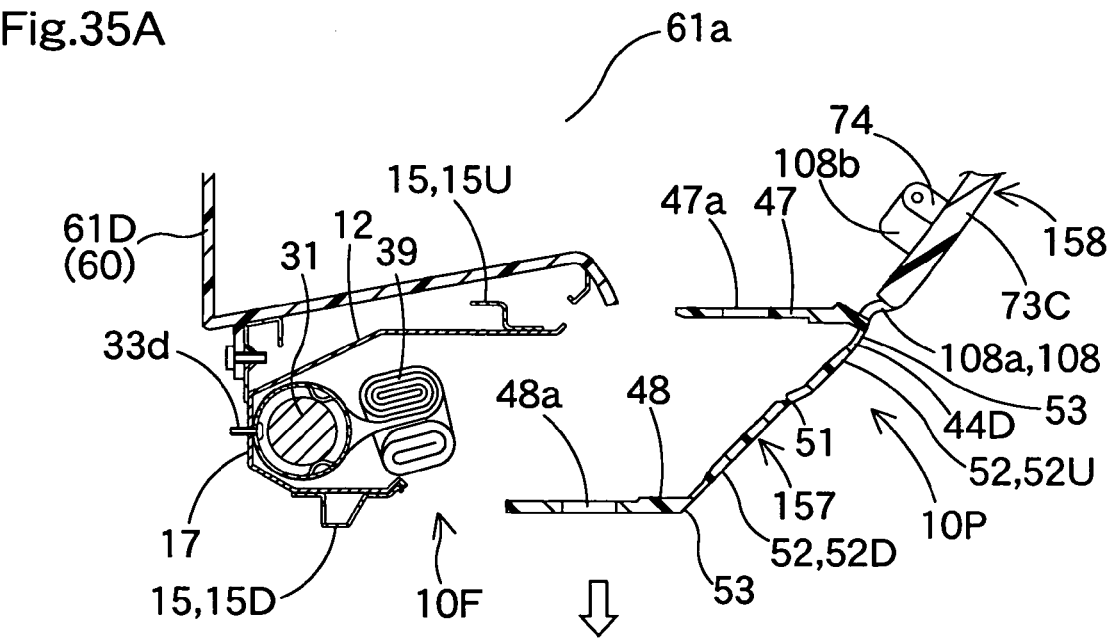
FIG. 35 illustrates assembling processes of an airbag cover to a case in the seventh occupant protection device.
Figure 35B:
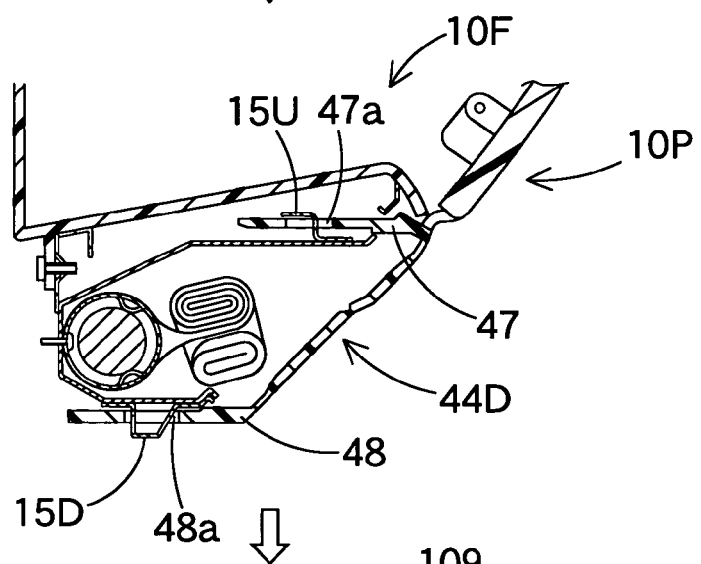

After the module 10F is mounted on the vehicle, the panel module 10P is attached to the vehicle. At this time, the airbag cover 44D integral with the lower panel 108 is assembled with the case 12. To assemble the airbag cover 44D with the case 12, walls 47, 48 and 49 of the airbag cover 44D are located around case circumferential wall portion 14 toward the opening 13a. At this time, as shown in FIGS. 35A and 35B, individual retaining hooks 15U are so inserted into retaining holes 47a of the upper joint wall 47 as to be retained at peripheries of the retaining holes 47a on upper surface of the upper joint wall 47. On the other hand, individual retaining projections 15D are inserted into retaining holes 48a of the lower joint wall 48, and retaining legs 46 are so inserted into apertures 18b as to be retained at apertures 18b peripheries. At this time, the left and right pivot sections 108b are housed in the recesses 169 of the box body 61D. Moreover, each of the retaining legs 108d is retained by lower peripheral edge of the upper panel 107.

Figure 35C:
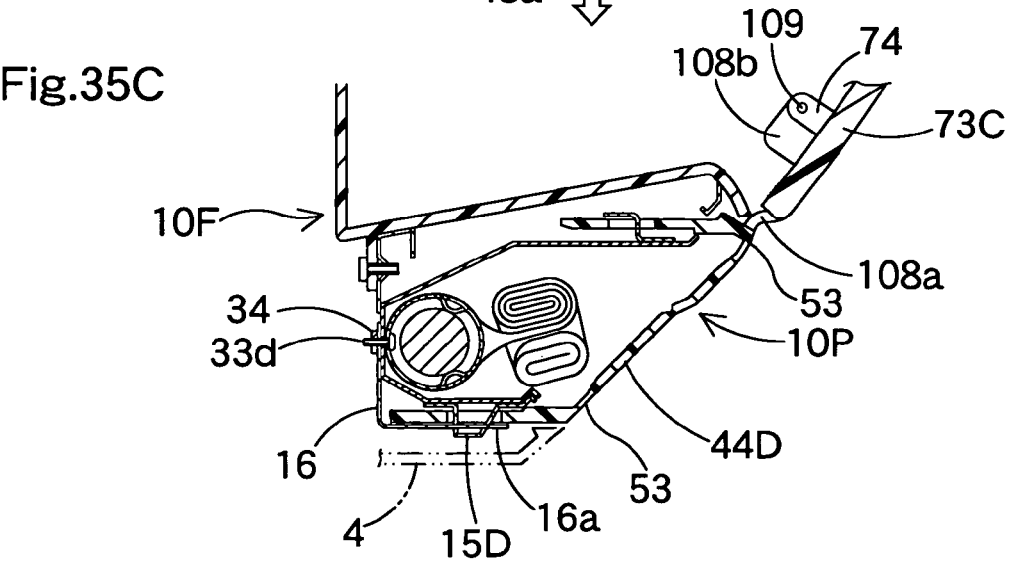

Then as shown in FIG. 35C, bars 16a of locking member 16 are inserted between outer surface of the lower joint wall 48 and inner circumference of the individual projections 15D, individual bolts 33d of the inflator 31 are inserted through the locking member 16, and nuts 34 are fastened with the bolts 33d. Thus the airbag cover 44D integral with the lower panel 108 is joined with the case 12 to mount the panel module 10P on the vehicle. Assemblage of the knee-protecting airbag device 11 is complete, too. If the under cover 4 is then attached to the case 12 by means of apertures 18c of the case 12, mounting of the knee-protecting airbag device 11 and the container box 60 on the vehicle is completed.

After mounting the knee-protecting airbag device 11 and the container box 60 on the vehicle, when an actuating signal is input to inflator body 32 via the lead wire 37, inflation gas is discharged from gas discharge ports 32c of the inflator 31, and flows into the airbag 39 via gas outlet ports 33a of diffuser 33. Then the airbag 39 inflates and breaks the not-shown wrapping film, push the doors 52 (52U and 52D) of the airbag cover 44D, and breaks breakable portion 51 to open the door 52U upward and door 52D downward, respectively around hinge lines 53. Subsequently, the airbag 39 protrudes rearward from an opening 54 provided by the opening of the doors 52U and 52D, and further protrudes upward along the rear surface of the lid 73C while expanding and inflating. Accordingly, even if the occupant M seated in front passenger's seat advances, the inflated airbag 39 is able to protect the knees K properly. In the seventh occupant protection device S7, too, since the airbag device 80 for front passenger's seat is also actuated, airbag of the airbag device 80 protrudes from the dashboard 6B to protect upper body of the occupant M.

In the seventh occupant protection device S7, since the lower panel 108 as an interior decoration member located around the container box 60 and the airbag cover 44D of the knee-protecting airbag device 11 are formed of a single molded part 156 except the lid 73C opened/closed when the container box 60 is used, there appears no parting line in border of the two sections, so that appearance in the front of front passenger's seat is improved. Of course, since the lid 73C is independent of the lower panel 108 around the container box 60 and the airbag cover 44D, the lid 73C is able to separate from the lower panel 108 and the airbag cover 44D and swing easily in opening/closing operation of the opening 61a of the container box body 61D, as indicated by double-dotted lines in FIG. 33.

In the seventh occupant protection device S7, therefore, although the container box 60 and the knee-protecting airbag device 11 for protecting the knees K of the occupant M seated in front passenger's seat are both mounted in front of front passenger's seat, good appearance of the front of front passenger's seat is retained.

Moreover, since the lower panel 108 located around the container box 60 and the airbag cover 44D of the knee-protecting airbag device 11 are formed of a single molded part, number of constituent parts is reduced, and working processes and cost in mounting the device S7 on the vehicle are reduced.

In the seventh occupant protection device S7, the lid 73C of the container box 60 is assembled with the molded part 156 constituting the lower panel 108 and the airbag cover 44D to form the panel module 10P, and the lid 73C is mounted on the vehicle by attaching the panel module 10P on the vehicle.

With this arrangement, since the lid 73C is assembled with the molded part 156 constituting the lower panel 108 and the airbag cover 44D in advance, good appearance in parting line between the lid 73C and the lower panel 108 and the airbag cover 44D therearound is easily retained. Consequently, appearance of the front of front passenger's seat is improved. Especially, the panel module 10P constitutes a major part of the front side of front passenger's seat. Since a great part like this is preliminarily assembled before being mounted on the vehicle, good appearance in the front of front passenger's seat is easily retained.

Without considering above working-effects, the hinge arms 74 of the lid 73C may be pivotally joined with the case 12 or the like.

In the seventh occupant protection device S7, the molded part 156 that integrates the lower panel 108 and the airbag cover 44D is a two-color part of soft material and hard material compatible to each other. The doors 52, the hinge lines 53, the breakable portion 51, and the joint walls 47, 48 of the airbag cover 44D are formed as the soft section 157 made of the soft material, and remaining portions are formed as the hard section 158 made of the hard material.

In the molded part 156 like this, when the doors 52 of the airbag cover 44D are pushed by the inflating airbag 39 and open while breaking the breakable portion 51 disposed therearound, the doors 52 do not break although pushed, but are elastically deformed and smoothly open since they are the soft section 157. Moreover, the hinge lines 53 belonging to the soft section 157 easily bend, too. Consequently, the airbag 39 is able to deploy smoothly from an opening provided by smooth opening of the doors 52. Besides, since the joint walls 47 and 48 by which the airbag cover 44D is attached to the circumferential wall portion 14 of the case 12 also belong to the soft section 157, the walls 4 and 48 are elastically deformed and prevent peripheries of retaining holes 47a and 48a holding the retainers 15U and 15D of the circumferential wall portion 14 from breaking even if subjected to strong tensile force when the doors 52 open. Of course, since remaining portions such as the general section 45 of the airbag cover 44D apart from the doors 52 and the lower panel 108 belong to the hard section 158 having rigidity, the two-color part 156 as a whole is able to keep a predetermined shape easily. Without taking high rigidity into account, the airbag cover 44D as a whole including the general section 45 may be made of the soft section 157, and further alternatively, the molded part 156 as a whole may be made from soft synthetic resin such as thermo-plastic elastomer.

Furthermore, in the seventh occupant protection device S7, too, the case 12 housing the inflator 31 and the airbag 39 of the knee-protecting airbag device 11, and the box body 61D of the container box 60 are assembled together to form the module 10F in advance, so that major parts of the knee-protecting airbag device 11 and the container box 60 are mounted on the vehicle at one time by attaching the module 10F to the vehicle. Therefore, less working processes are required compared with a case of mounting the case 12 of the knee-protecting airbag device 11 and the box body 61D of the container box 60 separately on the vehicle, thereby reducing tact time per vehicle.

Of course, without considering the above working-effects, the case 12 housing the inflator 31 and the airbag 39 of the knee-protecting airbag device 11, and the box body 61D of the container box 60 may be sequentially mounted on the vehicle.

In the seventh embodiment, too, moreover, since the support sections 20 and 21 extending upward from the case 12 support the lower surface 64a of the lower wall 64 of the box body 61D widely in transverse direction at front edge 64c side and rear edge 64d side, the box body 61D is stably supported.

Figure 36:
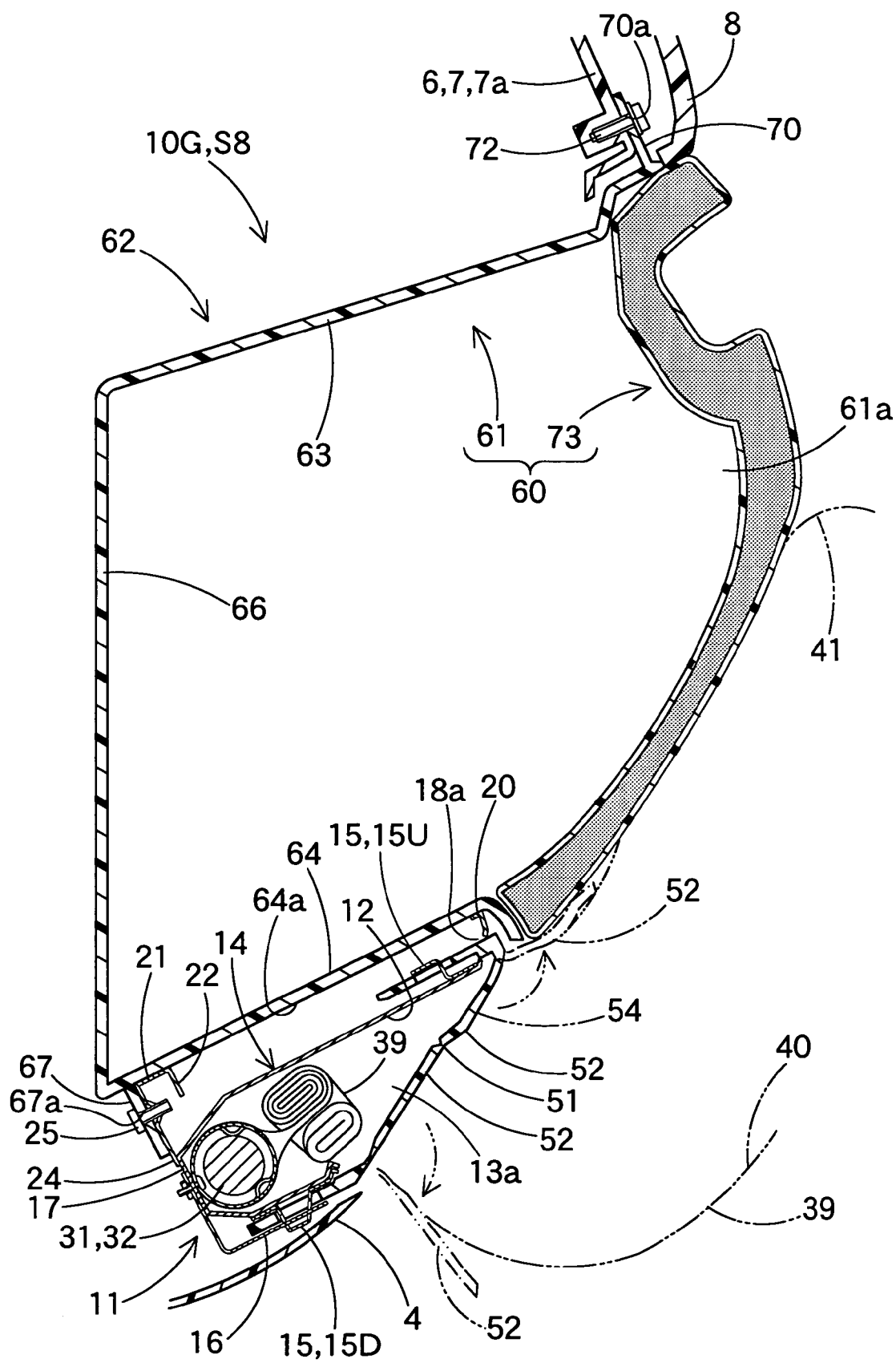
FIG. 36 is a schematic vertical section of an eighth embodiment of the occupant protection device.

In the foregoing embodiments, the case 12 is arranged so that the circumferential wall portion 14 of the case 12 in the knee-protecting airbag device 11 may extend in substantially horizontal direction from the bottom wall 17. However, as in eighth occupant protection device S8 shown in FIG. 36, the case 12 may be located obliquely such that the circumferential wall portion 14 of the case 12 has its opening 13a plane at the rear end directed upward while locating the lower wall 64 of the box body 61D in the container box 60 as a part of a mounting module 10G correspondingly.

Although the eighth embodiment differs from the first embodiment in that the lower wall 64 of the box body 61 and the circumferential wall portion 14 of the case 12 have their rear sides in upper level, remaining constructions are similar to the first embodiment.

What is claimed is:

1. An occupant protection device comprising a knee-protecting airbag device located in front of a front passenger's seat for protecting the occupant's knees upon collision of the vehicle, and a container box located above the knee-protecting airbag device for housing goods, the knee-protecting airbag device comprising an airbag inflatable for protecting the occupant's knees, an inflator for supplying inflation gas to the airbag, a case for housing the folded airbag and the inflator, the case being opened rearward, and an airbag cover for covering the opening of the case, the airbag cover being attached to the case and openable upon inflation of the airbag, the container box comprising a box body opened rearward and a lid for openably covering the opening of the box body, the lid being located above the airbag cover;

wherein the airbag cover and the lid are independent entities, whereby the airbag cover and the lid are separately openable, wherein the lid is openable without displacing the airbag cover, and before being mounted on the vehicle, the case of the knee-protecting airbag device having the airbag and the inflator housed therein and the box body of the container box are assembled into a mounting module in advance, whereby, by mounting the module on the vehicle, the knee-protecting airbag device and the container box are mounted on the vehicle.

2. The occupant protection device according to claim 1, wherein the airbag cover and the lid are also assembled into the mounting module.

3. The occupant protection device according to claim 2, the device further comprising an airbag device for front passenger's seat having an airbag for protecting upper body of the occupant, the airbag device for front passenger's seat being assembled into the mounting module.

4. The occupant protection device according to claim 2, the device further comprising an interior decoration member located in front of front passenger's seat, the decoration member being assembled into the mounting module.

5. The occupant protection device according to claim 2, wherein the box body and the airbag cover are formed of an integral molded part of synthetic resin.

6. The occupant protection device according to claim 5, wherein:

the case comprises a circumferential wall portion located around the case opening for covering the folded airbag;

the circumferential wall portion comprises a retainer protruded outward for attachment to the airbag cover;

the airbag cover comprises: a door openable when pushed by the inflating airbag; a thinned breakable portion located in periphery of the door and breakable when pushed by the airbag to help open the door; a hinge line located in periphery of the door, and bended upon opening of the door; and a joint wall portion to be attached to the case circumferential wall portion by having the case retainer inserted therein and thus being held by the case retainer; and the molded part integrating the box body and the airbag cover is a two-color part of soft material and hard material each of which is compatible to each other, and at least the doors, the hinge line, and the joint wall portion of the airbag cover are soft section made from the soft material, and remaining portions are hard section made from the hard material.

7. The occupant protection device according to claim 2, wherein the airbag cover and the lid are formed of an integral molded part.

8. The occupant protection device according to claim 7, wherein:

the case comprises a circumferential wall portion located around the case opening for covering the folded airbag;

the circumferential wall portion comprises a retainer protruded outward for attachment to the airbag cover;

the airbag cover comprises: a door openable when pushed by the inflating airbag; a thinned breakable portion located in periphery of the door and breakable when pushed by the airbag to help open the door; a hinge line located in periphery of the door, and bended upon opening of the door; and a joint wall portion to be attached to the case circumferential wall portion by having the case retainer inserted therein and thus being held by the case retainer; and the molded part integrating the airbag cover and the lid is a two-color part of soft material and hard material each of which is compatible to each other, and at least the doors, the hinge line, the joint wall portion of the airbag cover and a portion in the vicinity of border of upper edge of the airbag cover and lower edge of the lid are soft section made from the soft material, and remaining portions are hard section made from the hard material.

9. The occupant protection device according to claim 1, wherein the box body is supported at lower surface thereof by a support section formed in the case.

10. The occupant protection device according to claim 1, wherein:

the case comprises a joint section to be joined with vehicle body; and the box body is secured to the vehicle body by being joined to the case.

11. The occupant protection device according to claim 1, the device further comprising an interior decoration member located around a rear side face of the container box, wherein the airbag cover and a portion of the decoration member immediately around the container box are formed of an integral molded part.

12. The occupant protection device according to claim 11, wherein:

the case comprises a circumferential wall portion located around the case opening for covering the folded airbag;

the circumferential wall portion comprises a retainer protruded outward for attachment to the airbag cover;

the airbag cover comprises: a door openable when pushed by the inflating airbag; a thinned breakable portion located in the periphery of the door and breakable when pushed by the airbag to help open the door; a hinge line located in the periphery of the door, and bended upon opening of the door; and a joint wall portion to be attached to the case circumferential wall portion by having the case retainer inserted therein and thus being held by the case retainer; and the molded part integrating the portion of the decoration member around the container box and the airbag cover is a two-color part of soft material and hard material each of which is compatible to each other, and at least the doors, the hinge line, and the joint wall portion of the airbag cover are soft sections made from the soft material, and remaining portions are hard sections made from the hard material.

13. An occupant protection device comprising a knee-protecting airbag device located in front of an occupant seated in a front passenger's seat for protecting the occupant's knees upon collision of the vehicle, a container box located above the knee-protecting airbag device for housing goods, and an interior decoration member located around rear side face of the container box, the knee-protecting airbag device comprising an airbag inflatable for protecting the occupant's knees, an inflator for supplying inflation gas to the airbag, a case for housing the folded airbag and the inflator, the case being opened rearward, and an airbag cover for covering the opening of the case, the airbag cover being openable upon inflation of the airbag, the container box comprising a box body opened rearward and a lid for openably covering the opening of the box body, the lid being located above the airbag cover;

wherein the airbag cover and the lid are independent entities, whereby the airbag cover and the lid are separately openable, wherein the lid is openable without displacing the airbag cover, and a portion of the interior decoration member around the container box and the airbag cover being formed of an integral molded part.

14. The occupant protection device according to claim 13, wherein:

the case comprises a circumferential wall portion located around the case opening for covering the folded airbag;

the circumferential wall portion comprises a retainer protruded outward for attachment to the airbag cover;

the airbag cover comprises: a door openable when pushed by the inflating airbag; a thinned breakable portion located in the periphery of the door and breakable when pushed by the airbag to help open the door; a hinge line located in the periphery of the door, and bended upon opening of the door; and a joint wall portion to be attached to the case circumferential wall portion by having the case retainer inserted therein and thus being held by the case retainer; and the molded part integrating the portion of the decoration member around the container box and the airbag cover is a two-color part of soft material and hard material each of which is compatible to each other, and at least the doors, the hinge line, and the joint wall portion of the airbag cover are soft sections made from the soft material, and remaining portions are hard sections made from the hard material.

15. The occupant protection device according to claim 14, wherein the lid of the container box is assembled with the molded part to form a panel module, and the lid is mounted on the vehicle by attaching the panel module to the vehicle.

* * * * *